(12) United States Patent
Schneider

(10) Patent No.: US 7,188,138 B1
(45) Date of Patent: Mar. 6, 2007

(54) METHOD, PRODUCT, AND APPARATUS FOR RESOURCE IDENTIFIER REGISTRATION AND AFTERMARKET SERVICES

(76) Inventor: Eric Schneider, 13944 Cedar Rd. #258, University Heights, OH (US) 44118

( * ) Notice: Subject to any disclaimer, the term of this patent is extended or adjusted under 35 U.S.C. 154(b) by 328 days.

(21) Appl. No.: 10/604,626

(22) Filed: Aug. 5, 2003

Related U.S. Application Data

(63) Continuation of application No. 09/683,481, filed on Jan. 5, 2002, now abandoned.

(51) Int. Cl.
*G06F 15/16* (2006.01)

(52) U.S. Cl. ...................... 709/203; 709/224

(58) Field of Classification Search ........ 709/200–203, 709/217–220, 223–227
See application file for complete search history.

(56) References Cited

U.S. PATENT DOCUMENTS

| | | | |
|---|---|---|---|
| 5,778,367 A * | 7/1998 | Wesinger et al. ............. 707/10 |
| 5,978,817 A | 11/1999 | Giannandrea et al. ... 715/501.1 |
| 5,987,464 A | 11/1999 | Schneider ..................... 707/10 |
| 6,009,459 A | 12/1999 | Belfiore et al. ............. 709/203 |
| 6,041,324 A | 3/2000 | Earl et al. ........................ 707/9 |
| 6,182,227 B1 * | 1/2001 | Blair et al. .................. 713/201 |
| 6,298,341 B1 * | 10/2001 | Mann et al. ..................... 707/3 |
| 6,324,538 B1 * | 11/2001 | Wesinger et al. ............. 707/10 |
| 6,442,549 B1 | 8/2002 | Schneider ..................... 707/10 |
| 6,560,634 B1 * | 5/2003 | Broadhurst .................. 709/203 |
| 6,691,105 B1 * | 2/2004 | Virdy ............................. 707/3 |
| 6,850,940 B2 * | 2/2005 | Wesinger et al. ............. 707/10 |
| 6,880,007 B1 * | 4/2005 | Gardos et al. ............... 709/225 |
| 6,895,430 B1 | 5/2005 | Schneider .................... 709/217 |
| 6,901,436 B1 | 5/2005 | Schneider .................... 709/219 |
| 7,000,028 B1 * | 2/2006 | Broadhurst et al. ......... 709/245 |
| 7,039,697 B2 | 5/2006 | Bayles ......................... 709/223 |
| 7,069,323 B2 * | 6/2006 | Gardos et al. ............... 709/225 |
| 2002/0065903 A1 * | 5/2002 | Fellman ....................... 709/220 |
| 2002/0091827 A1 | 7/2002 | King et al. .................. 709/226 |
| 2005/0102354 A1 * | 5/2005 | Hollenbeck et al. ........ 709/203 |

OTHER PUBLICATIONS

Donaghy, Melanie, Sep. 1997, Wines & Vines, v78, n9, p. 39(6).*

* cited by examiner

*Primary Examiner*—Moustafa M. Meky

(57) ABSTRACT

When a network resource request having a domain name is received, it is determined whether the network resource can be accessed from the domain name. Rather than, or in addition to, displaying an error message or processing a search request in response to determining that a network resource can not be accessed, the domain name can instead be redirected to a registration service where the domain name can be automatically used to perform a registration request and determine domain name availability. When the domain name is not available for registration, domain name registrant information is provided. However, when the domain name is determined available, a registration form is provided. For example, such a domain name may be redirected from the autosearch feature of a web browser to a service, which determines that the domain name is available for registration enabling a potential registrant to register the available domain name by selecting a domain name registration provider from a list of domain name registration providers.

13 Claims, 42 Drawing Sheets

*Prior Art*
*Fig. 2d*

From 242 or 250 or 260
Network resource
accessible? - No

↓ 410

Process registration
request from at least
a portion of identifier

↓

End

*Fig. 4a*

From 242 or 250 or 260
Network resource
accessible? - No

↓ 415

Present as part of a search page and/or error page, a user interface element adapted to perform at least one non-search request from at least a portion of the identifier and/or any variant, related, associated, or similar identifiers: at least one of an advertising request, commerce request, navigation request, identifier auction/aftermarket/appraisal/bid/ back-order request, a FDN search/registration/ resolution request, identifier generation/availability request, WHOIS request, and/or registration request

↓

End

*Fig. 4b*

From 242 or 250 or 260
Network resource
accessible? - No

↓ 416

Contemporaneously
process a search request
and registration request

↓

End

*Fig. 4c*

We can't find "zipnames.com".

Click Go to try your address again.

| zipnames.com | Go | 274

Or, correct the spelling of your address above and click Go.

Did you intend to go to one of these similar Web addresses?
- www.surnames.com
- www.iname.com See more results for "zipnames.com" at MSN Search Get help.
See technical details.

Powered by: MSN Search

Banner Ad:
Register zipnames.com right now!    438

Try navigating to a more specific resource within zipnames.com:
www.zipnames.com     440
ftp.zipnames.com
sitemap.zipnames.com Click here to see if zipnames.com is available for registration — 442

The following names are available for registration as well:    444
zipnames   namezip.com   getzipname.com   zapnames.org Try registering or navigating to the fictitious domain namezip.names — 446

Click here to see if zipnames.com is available in other namespaces and naming systems.    448

Click here to learn more about any aftermarket information for — 450
zipnames.com including appraisal, monitoring, auctions, and preordering.

Zipnames.com is registered to ACME, Inc. Navigate to other ACME links
acmenames.com   zipproducts.com   zapservices.com — 452

Address: http://auto.search.msn.com/results.asp?cfg=DNSERROR&FORM=DNSERR&v=1&q=216%2E555%2E1234

(i) We can't find "216.555.1234".

Click Go to try your address again.
[216.555.1234] [Go] — 274
*Or, correct the spelling of your address above and click Go.*

See more results for "216.555.1234" at MSN Search

Get help.
See technical details.

Powered by: MSN Search

Banner Ad: — 458
Register your ENUM Today!

Contact 216.555.1234 via phone   460   Login to MYENUM and
Contact 216.555.1234 via fax            access phone bill or manage
Contact 216.555.1234 via pager   461   subscription services such as
Contact 216.555.1234 via cell           forwarding, voice mail, etc.

You can contact the party of 216.555.1212 at ICQ# 3141592653  462
or can reach the party of 216.555.1212 at IM Handle zipname The following ENUM names are available for registration as well: 464
216.555.1233   330.555.1235   216.505.1234   800.555.1234

466
Try registering or navigating to the fictitious domain namezip.names

468
Click here to see if 216.555.1234 is available in other naming systems
or click to register the e-mail address: 216.555.1234@zipnames.com 470
Click here to learn more about any aftermarket information for
216.555.1234 including appraisal, monitoring, auctions, and backordering.

216.555.1234 is registered to ACME, Inc. Navigate to other ACME links
acmenames.com   216.555.2345   330.555.1234    472

Configuration Settings ⌐174

Select Redirection Method

○ Least Cost Registration Provider
○ Select Registration Provider from list
○ Random Registration Provider
● Default Registration Provider
  licensedregistrar.com General Features ⌐510

[X] Enable Metalinks

[X] Enable keyword and subdomain generation

[X] Enable many identifiers across many naming systems

[X] Enable both search and registration features

[X] Enable fictitious domain name processing

| Registration Provider | Price/Cost |
|---|---|
| reg1.com | $35 |
| reg2.com | $30 |
| reg3.com | $32 |

UNames Identifier Registration Form

Congratulations!! example.com is available for registration.    930
Please provide your Registrant information by clicking here!

Below is a list of other identifiers that are currently available.
Please select which identifiers that you would like to register.

X     example.com
          example.sitemap
    X     example.44106
          example.news        935
    X     exampleco
          216.555.2345

Please provide any keywords or descriptors that you would like to put in your watch list so that we may be able to inform you of any available identifiers that may become available in the future.

By using the watch list you may also stay current on what identifiers your competition may be registering.

Enter the identifiers that are registered by your competitors and enter any geographic, psychographic, and/or demographic information here including any keywords of interest for yourself and your competition.

_____
_____        940
_____
          News
          Stories

945

Click here to receive any suggested identifiers based on your registrant information and/or any selected categories of interest to help make your watch list selection.

( Submit )  ( Reset )

*Fig.9b*

```
<html><body>
<pre>
Registrant:
Internet Assigned Numbers Authority (<A href="whois?EXAMPLE-DOM">EXAMPLE-DOM</A>)
4676 Admiralty Way, Suite 330                                              965
Marina del Rey, CA <a href="http://tlda.com/cgi-bin/map.cgi?zip=90292">90292</a>
US
                                                      960
Domain Name: <a href="http://www.example.com">EXAMPLE.COM</a>

Administrative Contact, Technical Contact, Zone Contact:
   Internet Assigned Numbers Authority  (<A href="whois?IANA">IANA</A>)  iana@IANA.ORG
   <a href="tel:+13108239358">310-823-9358</a>       970
   <a href="fax:+13108238649">Fax- 310-823-8649</a>

Record last updated on 14-Jun-99.
Record created on 14-Aug-95.
Database last updated on 11-Aug-99 03:52:52 EDT.

Domain servers in listed order:
VENERA.ISI.EDU          <A href="whois?128.9.176.32">128.9.176.32</A>
NS.ISI.EDU              <A href="whois?128.9.128.127">128.9.128.127</A>
                                                                  980
</pre>
<a href="http://tlda.com/cgi-bin/monitor.cgi?dn=example.com">Put EXAMPLE.COM in Watch List</A><BR>
<a href="http://tlda.com/cgi-bin/auction.cgi?dn=example.com">Aftermarket information for EXAMPLE.COM</A>
</body></html>                                                    975
```

*Fig. 9c*

; The use of the Data contained in Network Solutions' aggregated
; .com, .org, and .net top-level domain zone files (including the checksum
; files) is subject to the restrictions described in the access Agreement
; with Network Solutions.

NET. IN   SOA   A.ROOT-SERVERS.NET. hostmaster.nsiregistry.net. (
          2000090600 ;serial
          1800 ;refresh every 30 min
          900 ;retry every 15 min
          604800 ;expire after a week
          86400 ;minimum of a day
          )
NET. 518400 IN NS A.ROOT-SERVERS.NET.
NET. 518400 IN NS E.GTLD-SERVERS.NET.
NET. 518400 IN NS F.GTLD-SERVERS.NET.
NET. 518400 IN NS F.ROOT-SERVERS.NET.
A.ROOT-SERVERS.NET. 518400 IN A 198.41.0.4
E.GTLD-SERVERS.NET. 518400 IN A 207.200.81.69
F.GTLD-SERVERS.NET. 518400 IN A 198.17.208.67
F.ROOT-SERVERS.NET. 518400 IN A 192.5.5.241
GLOBALMAILING.NET. 172800 IN NS NS.DANDY.NET.
GLOBALMAILING.NET. 172800 IN NS NS.WJSE.COM.
DIFFERANCE-ENGINE.NET. 172800 IN NS NAPLES.NETWIDE.NET.
DIFFERANCE-ENGINE.NET. 172800 IN NS ROME.NETWIDE.NET.
YOUTHPIECE.NET. 172800 IN NS NS1.AOSOFT.COM.
YOUTHPIECE.NET. 172800 IN NS NS2.AOSOFT.COM.

; Add wildcards to redirect all otherwise unresolvable .NET Names
; to a market driven registration site such as REGISTRARPORTAL.COM
; use 2 lines to point to a DN and glue record for IP address

*. 172800 IN NS REGISTRARPORTAL.COM.
REGISTRARPORTAL.COM. 172800 IN A 123.45.67.89
; or could simply have one line
; *. 172800 IN A 123.45.67.89
; or
; * 172800 IN A 123.45.67.89

*Fig. 11b*

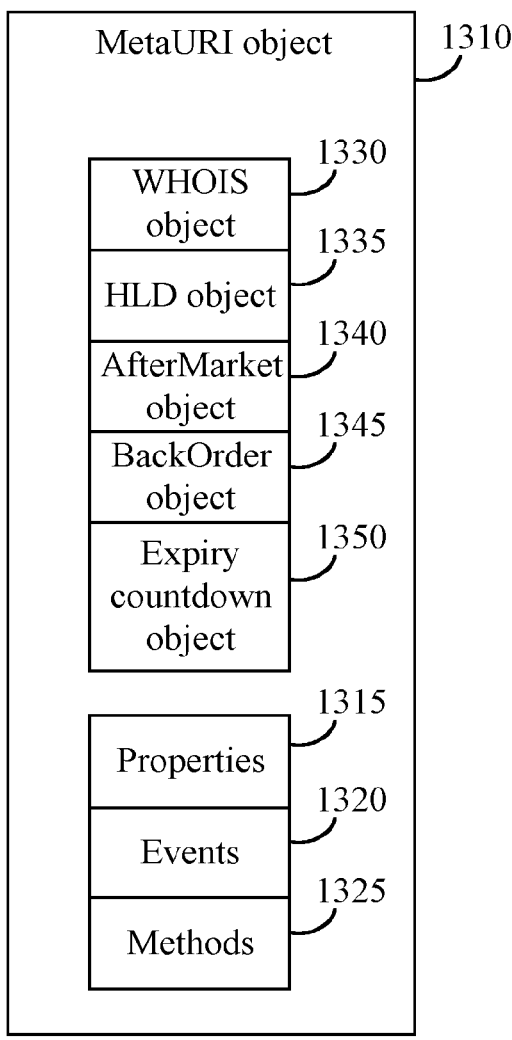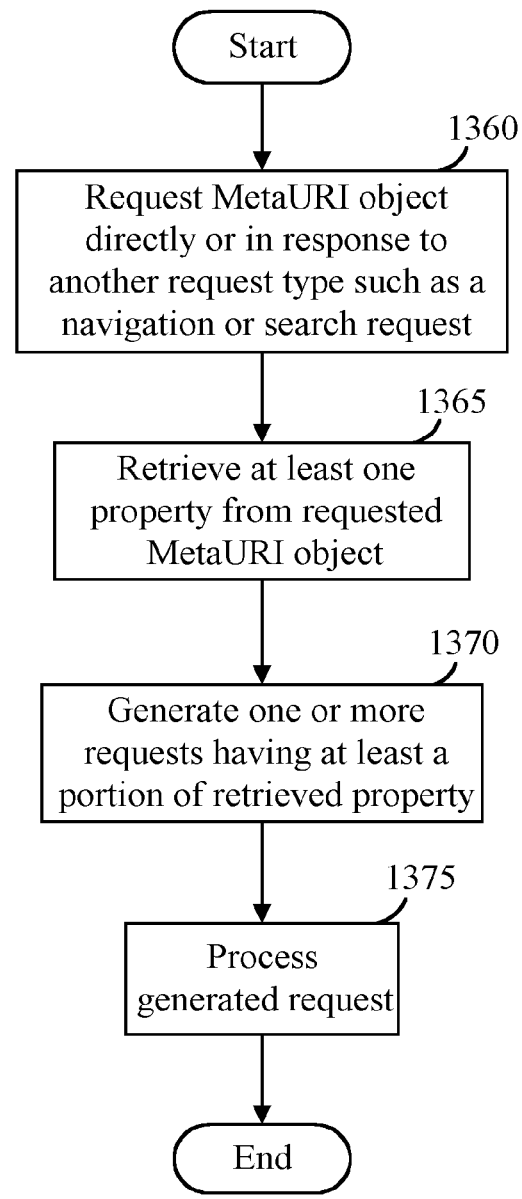
Fig. 13a                                    Fig. 13b

Results for "software patent"
1 - 4 next >>

1810

1. SoftwarePatent.com : Software Patent Resources.
SoftwarePatent.com provides resources and links for: patent searching, laws, case, intellectual property organizations. All links are software, internet and computer patent related
99%  9/16/99  http://www.softwarepatent.com/

2. Software Patent Resource has moved to http://www.softwarepatent.com
Software Patent Resource has moved to http://www.softwarepatent.com
98%  9/15/99  http://www.longest.com/spn/spn.shtml 3. Patent Explorer / Software Subset
Rapid Patent, in association with Electronic Data Systems (EDS), has developed a single CD-ROM which holds all previously inaccessible software patent data. There are over 7,000 software patents covering 20 years from 1972. Full text searchable
98%  9/4/99  http://law.cd-rom-directory.com/cdprod1/cdhrec/002/509.shtml 4. Recent Software Patent Developments In The United States
Recent Software Patent Developments In The United States John V. Swinson* Abstract This article examines recent U.S. developments in patent law concerning computer software. The cases discussed are appellate decisions of the Court of Appeals..
98%  9/24/99  http://www.comlaw.utas.edu.au/law/jlis/patents.html

*Prior Art*
*Fig. 18a*

Results for "software patent"
1 - 4 next >>

1. SoftwarePatent.com : Software Patent Resources.
WHOIS
SoftwarePatent.com provides resources and links for: patent searching, laws, case, intellectual property organizations. All links are software, internet and computer patent related
99% 9/16/99 http://www.softwarepatent.com/

2. Software Patent Resource has moved to http://www.softwarepatent.com  1820
WHOIS    Homepage    Send E-mail    Dial Registrant    Map/Directions
Software Patent Resource has moved to http://www.softwarepatent.com
98% 9/15/99 http://www.longest.com/spn/spn.shtml 3. Patent Explorer / Software Subset    1830
Monitoring    Bid    Auction    Back-Order    After Market Status
Rapid Patent, in association with Electronic Data Systems (EDS), has developed a single CD-ROM which holds all previously inaccessible software patent data. There are over 7,000 software patents covering 20 years from 1972. Full text searchable
98% 9/4/99 http://law.cd-rom-directory.com/cdprod1/cdhrec/002/509.shtml 4. Recent Software Patent Developments In The United States    1825
WHOIS    Homepage    Sitemap    MetaTag Info    Page Source
Recent Software Patent Developments In The United States John V. Swinson* Abstract This article examines recent U.S. developments in patent law concerning computer software. The cases discussed are appellate decisions of the Court of Appeals..
98% 9/24/99 http://www.comlaw.utas.edu.au/law/jlis/patents.html

*Fig. 18b*

METHOD, PRODUCT, AND APPARATUS FOR RESOURCE IDENTIFIER REGISTRATION AND AFTERMARKET SERVICES

CROSS REFERENCE TO RELATED APPLICATIONS

This application is a continuation application of U.S. patent application Ser. No. 09/683,481 filed Jan. 5, 2002, by Schneider, now abandoned, which also claims the benefit of U.S. patent application Ser. No. 09/682,351 filed Aug. 23, 2001, by Schneider, now abandoned, which claims the benefit of U.S. patent application Ser. No. 09/682,133 filed Jul. 25, 2001, by Schneider, still pending, which claims the benefit of U.S. patent application Ser. No. 09/525,350 filed Mar. 15, 2000, by Schneider, now U.S. Pat. No. 6,338,082, and claims the benefit of U.S. patent application Ser. No. 09/653,100 filed Aug. 31, 2000, by Schneider, now U.S. Pat. No. 6,760,746, and claims the benefit of U.S. patent application Ser. No. 09/650,827 filed Aug. 30, 2000, by Schneider, now U.S. Pat. No. 6,901,436, and claims the benefit of U.S. patent application Ser. No. 09/598,134 filed Jun. 21, 2000, by Schneider, now U.S. Pat. No. 6,895,430 and claims the benefit of U.S. patent application Ser. No. 09/532,500 filed Mar. 21, 2000, by Schneider, still pending, which claims the benefit of U.S. patent application Ser. No. 09/525,350 filed Mar. 15, 2000, by Schneider, now U.S. Pat. No. 6,338,082 which claims the benefit of U.S. Provisional Application Ser. No. 60/175,825 filed Jan. 13, 2000, by Schneider, now abandoned, U.S. Provisional Application Ser. No. 60/160,125 filed Oct. 18, 1999, by Schneider, now abandoned, U.S. Provisional Application Ser. No. 60/157,075 filed Oct. 1, 1999, by Schneider, now abandoned, U.S. Provisional Application Ser. No. 60/130,136 filed Apr. 20, 1999, by Schneider, now abandoned, and U.S. Provisional Application Ser. No. 60/125,531 filed Mar. 22, 1999, by Schneider, now abandoned.

BACKGROUND OF INVENTION

1. Field of the Invention

This invention generally relates to processing a request from a resource identifier, and more specifically relates to a method, product, and apparatus for resource identifier of name servers that the registrar has registered.

2. Description of the Related Art

The Internet is a vast computer network having many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may provide data and a client computer may display or process it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Web browsers, such as Microsoft Internet Explorer (MSIE), Netscape Navigator, and NeoPlanet provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side web browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which can be used as a query to access a database server and generate an HTML web page with customized data results as output that is passed back to the client browser for display.

There are many network access devices and program products that primarily serve as a navigation tool allowing a user to request network resources from resource identifiers. Navigating to a different network resource could happen as a result of external automation, internal automation from a script, the user clicking a hyperlink or typing in the address bar or location field of web browser, for example. All too often, such navigation tools can not always successfully access a network resource from an identifier for many reasons. Some reasons may include: domain name can not be translated into an IP address, invalid syntax, access denied, payment required, request forbidden, object not found, method is not allowed, no response acceptable to client found, proxy authentication required, server timed out waiting for request, user should resubmit with more info, resource is no longer available, server refused to accept request without a length, precondition given in request failed, network resource identifier is too long, unsupported media type, retry after doing the appropriate action, internal server error, server does not support the functionality required to fulfill the request, error response received from gateway, temporarily overloaded, timed out waiting for gateway, attempt to redirect the navigation failed, and HTTP version not supported. In any event, a status message is usually displayed indicating that the network resource request has failed.

A network resource identifier such as a Uniform Resource Identifier (URI) is a compact string of characters for identifying an abstract or physical resource such as a network resource. URIs are the generic set of all names and addresses that refer to objects on the Internet. URIs that refer to objects accessed with existing protocols are known as Uniform Resource Locators (URLs). A URL is the address of a file accessible on the Internet. The URL includes the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use e-mail and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and can contain subdomains. Domains and subdomains are grouped into zones to allow for distributed administration of the name space.

The DNS provides a mechanism so backup databases can be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Resolvers query the DNS by directing queries at name servers, which contain parts of the distributed database that is accessed by using the DNS protocols to translate domain names into IP addresses needed for transmission of information across the network. The function of translating a domain name into an IP address is known as name resolution. Name resolution is performed by a distributed system of name servers having resolvers to fulfill the resource request of the client by the successive hierarchical querying of the resource records from zone files.

The Berkeley Internet Name Domain (BIND) implements an Internet name server for the UNIX operating system. The BIND includes a name server and a resolver library. BIND is fully integrated into UNIX network programs for use in storing and retrieving host names and addresses by calling a routine from the resolver library called gethostbyname( ) which returns the IP address corresponding to a given Internet host name. Error return status from gethostbyname( ) is indicated by return of a NULL pointer.

At the heart of Netscape client products lies the Netscape Network Library (NETLIB). A necessity of any network based client browser application is to send and receive data over a connection. This is accomplished in NETLIB by making a call to NET_GetURL( ). In order to resolve host names, NETLIB uses a standard DNS lookup mechanism. NET_FindAddress( ) makes the gethostbyname( ) call to lookup the IP address for the specified host from a DNS database stored on a DNS server, and is called from NET_BeginConnect( ). If a numeric IP address is passed into NET_FindAddress( ), it is passed directly into the gethostbyname( ) call which returns a success when an IP address is passed in. NET_FindAddress( ) is actually called repeatedly until it returns success or failure. Similarly, MSIE browser include objects such as WebBrowser Object and InternetExplorer Object, which contains events, methods, and properties. One event, called the Navigate Event navigates to a resource identified by a URL.

A domain name includes two parts: a host and a domain. Technically, the letters to the right of the "dot" (e.g., tlda.com) are referred to as Top Level Domains (TLDs), while hosts, computers with assigned IP addresses that are listed in specific TLD registries are known as second-level domains (SLDs). The domain name, "tlda.com", ".com" is the TLD, and "tlda" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "news.tlda.com", are subsidiary to TLDs in the hierarchy of the Internet's DNS.

There are two types of top-level domains, generic and country code. Generic top-level domains (gTLDs) are used to allocate resources to the growing community of institutional networks, while country code top-level domains (ccTLDs) are used use by each individual country, as deemed necessary. More than 240 national, or country-code TLDs (e.g., United States (.us), Japan (.jp), Germany (.de), etc.) are administered by their corresponding governments. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

Incorporated and headquartered in California, the Internet Corporation for Assigned Names and Numbers (ICANN) is the non-profit corporation that was formed to take over responsibility for the IP address space allocation, protocol parameter assignment, domain name system management, and root server system management functions now performed under U.S. Government contract by Internet Assigned Numbers Authority (IANA) and other entities. The IANA, also headquartered in California, is the overall authority for day-to-day administration of the DNS. IANA staff carry out administrative responsibilities for the assignment of IP Addresses, Autonomous System Numbers, TLDs, and other unique parameters of the DNS and its protocols.

By Jun. 1, 1999, Network Solutions (NSI) Registry (now VeriSign) had implemented a shared registration system (SRS) to support multiple licensed, accredited registrars offering registration services. NSI and other domain name registrars function as retailers of domain name registration services through NSI's SRS. To date, more than 30,000,000 domain names, or SLDs, in ".com", ".net", ".org", and ".edu" have been registered.

VeriSign Global Registry Services (GRS) is the leading provider of domain name registry services and DNS support to the Internet and is responsible for the infrastructure that propagates this information throughout the Internet and responds to over 1.5 billion DNS look-ups daily. The Registry stores information about registered domain names and associated name servers. A domain name's data includes its name, name servers, registrar, registration expiration date, and status. A name server's data includes its server name, IP addresses, and registrar.

As explained in S. Hollenbeck, et. al, "Informational RFC (Request for Comment) 2832: NSI Registry Registrar Protocol (RRP) Version 1.1.0", Internet Engineering Task Force (IETF), May 2000, "http://www.faqs.org/rfcs/rfc2832.html" and in S. Hollenbeck, "Informational Draft: Extensible Provisioning Protocol (EPP)", Internet Engineering Task Force (IETF), Oct. 2, 2001, "http://www.ietf.org/internet-drafts/draft-ietf-provreg-e pp-05.txt", VeriSign GRS has developed a registration protocol for use within the SRS. Internet domain name registration typically involves three entities: a registrant who wishes to register a domain name, a registrar who provides services to the registrant, and a registry that provides services to the registrar while serving as the authoritative repository of all functional information required to resolve names registered in the registry's TLDs. EPP is an XML protocol that can be layered over multiple transport protocols and provides four basic service elements: service discovery, commands, responses, and an extension framework that supports definition of managed objects and the relationship of protocol requests and responses to those objects.

A Registrar may access the Registry via RRP or EPP to perform registration service procedures such as determining if a domain name has been registered, registering a domain name, renewing the registration of a domain name, canceling the registration of a domain name, updating the name servers of a domain name, transferring a domain name from another registrar, examining or modifying the status of domain names that the registrar has registered, determining if a name server has been registered, registering a name server, updating the IP addresses of a name server, deleting a name server, and examining the status of name servers that the registrar has registered.

Domain name registration for a given NIC authority can be accessed by a TCP/IP application called WHOIS, which queries a NIC database to find the name of network and system administrators, system and network points-of-contact, and other individuals who are registered in appropriate databases. Domain names are identifiers used for both accessing a resource and retrieving contact information of the registrant or domain name holder of that resource. The availability of a domain name from a NIC authority for a given TLD is determined by submitting a WHOIS request. If there are no matches in the database then the domain name may be available for registration. Regional WHOIS registries are maintained by NSI and ARIN (American Registry for Internet Numbers) located in the U.S., APNIC (Asia-Pacific Network Information Center) located in Australia, and RIPE NCC located in the Netherlands. Domain name resolution is determined by resolving a query in the DNS and domain name availability is determined by using the RRP, EPP, or WHOIS service to query an appropriate NIC database.

U.S. patent application Ser. No. 09/440,606 filed Nov. 15, 1999, by Schneider, now U.S. Pat. No. 6,442,549, and U.S. patent application Ser. No. 09/598,134 filed Jun. 21, 2000, now U.S. Pat. No. 6,895,430 by Schneider able may be distributed in advance to a user so that domain names of interest may be selected and reserved in a preordering queue on either the client or server side. Registration information is completed and a registration form is submitted to or by a registrar when the soon to be available domain name that is selected does become available for registration. The date of the first domain name to ever become newly available to the public due to failure to pay a renewal fee was in September 1997. However, U.S. Pat. No. 5,987,464 filed Jul. 25, 1997 by Schneider (parent application to Ser. No. 09/440,606) states that delivery and updating methods are applicable to the renewed availability of domain name related information solving a need several months before the need became evident.

There are more than 30 million domain names that have been registered under .com, .net, and .org. Only about ten percent of these are in active use. Registrations for the remaining millions of names, many of which are highly valuable, are returning to availability at the rate of more than 800,000 per month. Currently, Snapnames.com, Inc. whether registrant information and/or aftermarket status from at least a portion of the identifier is to be retrieved. If so, then registrant information and/or aftermarket information including identifier status can be retrieved/received in step 835 from at least a portion and/or variant of the identifier. It can then be determined in step 840 whether results are provided from the received information. When results are not provided, such received information can be stored, cached, archived, and/or forwarded in step 845. When results are provided (step 840), then such results can be combined in step 850 with content accessed from the network resource.

Snapnames, Inc. provided a proposal, entitled, "Parallel Registries: A Solution for Deleting Names that Best Serves Customers, Registrars, and gTLD Registries Alike", Sep. 21, 2001, "http://www.byte.org/rc-deletes", in response to the request from VeriSign Global Registry Services for solutions regarding the domain name expiration problem. The proposal describes the need for all registries to implement back-order services for deleting names as a value-add service for their registrar channels, building the service into their infrastructures so that registration of deleted names operates exactly like first-time registrations. Registrars would implement registry-provided APIs and provide their own resellers with registrar APIs.

On Jan. 4, 2002, VeriSign published a press release, entitled, "SnapNames and VeriSign Global Registry Services Agree to Develop Domain Name Wait Listing Service" that can be accessed from the URL, "http://corporate.verisign.com/news/2002/pr_20020104.html". The service would allow parties to be next in line to register a domain name once it is deleted from the registry. Current wait listing services, implemented at the registrar level, must compete for a domain name when it becomes available. Implementation at the registry level would provide equal access to all registrars and would result in a higher efficacy rate for applicants, as the registration is virtually assured, should the current domain name registration be deleted.

The Parallel Registry is the only scaleable method for all registrars to participate in the market demand not only for all now-deleting names, but, because the Parallel Registry allows back-orders on all names at any point in time, for all names ever registered. For this reason, the Parallel Registry brings the registrars far more revenue than an uncooperative free-for-all, while vastly improving the customer experience. Though the parallel back-order registry in communication with a TLD registry provides an acceptable solution to the problem of domain name expiration, the back-order system allows a maximum of only one back-order at any given time for each domain name. Further unforeseen advantage can be taken by creating value added services around such a back-ordering mechanism.

WIPO Patent Application WO9909726A1 published on Feb. 25, 1999 by Broadhurst, entitled, "Method of determining unavailability of Internet domain names" discloses an improved query server that overcomes the shortcomings of existing domain name searching techniques by performing a multitude of searches simultaneously, transparent to the user. Specifically, the improved query server searches for existing domain name records in various domains and then displays the results in a formatted manner, thus eliminating the need for a user to perform individual searches. However, such improvements do not consider the integration of services other than that of domain name registration.

URLs are used in media, documents, e-mail, and data files, etc. as a means to make reference to accessible on-line content that can express the context of ideas may wish to communicate. URLs are generally written in an abbreviated manner as partial URLs or domain names (e.g., "http://www.example.com" is the URL, "www.example.com" is the FQDN, and "example.com" is the domain name). During early stages of commercialization of the Internet, businesses displayed the full URL when advertising a commercial or display ad as a means to locate the resources of the business on the Internet. Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example.com" or "www.example.com" instead of the URL "http://www.example.com".

The "www" in "www.example.com" has become the de facto standard for web server software to connect with hosts on the World Wide Web portion of the Internet. However, in an effort to shorten the URL length both in advertising and as a means of input, a DNS resource record has been used to create aliases for the actual FQDN. The CNAME Record are sometimes called "aliases" but are technically referred to as "Canonical Name" (CNAME) entries. These records enable the use of pointing more than one domain name to a single host. Using canonical names makes it easy to host both an FTP server and a Web server on the same machine. The CNAME record "example.com. IN CNAME www.example.com." enables a domain name to become an alias of a FQDN. This alias allows resolvers to process input such as "http://example.com" to resolve to a web server corresponding to the URI "http://www.example.com".

As explained in P. Mockapetris, "Informational RFC (Request for Comment) 1034: DOMAIN NAMES—CONCEPTS AND FACILITIES", Internet Engineering Task Force (IETF), November 1987, "http://www.faqs.org/rfcs/rfc1034.html", the principal activity of name servers is to answer standard queries. Both the query and its response are carried in a standard message format. A domain name identifies a node. Each node has a set of resource information, which may be empty. The set of resource information associated with a particular name is composed of separate resource records (RRs). The order of RRs in a set is not significant, and need not be preserved by name servers, resolvers, or other parts of the DNS.

RRs with owner names starting with the label "*" are called wildcard resource records. Wildcard RRs can be thought of as instructions for synthesizing RRs. When the appropriate conditions are met, the name server creates RRs with an owner name equal to the query name and contents taken from the wildcard RRs. The only example of wildcard RR usage in RFC 1034 is that of e-mail aliasing. Recently, ccTLD registries have used wildcard RRs to redirect a resolvable domain name back to the registrar component of the registry to perform registration requests. Performing this technique in a gTLD zone file would cause conflict enabling the Registry to bypass competition among multiple registrars in this very public component of the Internet's underlying technology. As a result a wildcard RR has never been used in a gTLD zone file.

The main use of a web browser location field is for resolving URLs to locate and access resources. Entering a URL into the location field of a web browser serves as a means to access a network resource corresponding to that URL. Because the location field is essential for accessing resources, the design of such location fields have rivaled much competition and innovation between existing web browser products from companies such as Netscape and Microsoft. Improvements to better track and organize sites of URLs that users have visited such as Bookmark folders, URL history, and the personal toolbar are all examples of functionality designed to help users navigate. Other improvements include spell checking and an autocomplete feature from the URL history as text is entered into the location field.

URLs can be removed or made temporarily unavailable for numerous reasons. When a file is removed from a directory, the URL that represents the file location no longer exists and therefore can not be found. It is quite common for users to modify a URL by deleting the file portion as an attempt to access the default "index.html" file from the same directory path. For instance, the URL "http://example.com/first/second/file.html" is not found, leaving the user to remove "file.html" to try to access the modified URL, "http://example.com/first/second/". If the modified URL is still not found, then the user manually repeats such steps with the hope that some level of access to the computer resource is successful.

Another location field improvement includes a reverse autocomplete feature to help automate the process of systematically attempting to access a related resource similar to that of the original requested resource. U.S. Pat. No. 6,041,324 issued on Mar. 21, 2000 by Earl, et al., entitled, "System and method for identifying valid portion of computer resource identifier" discloses a method for receiving and validating user input for a computer resource entered into a computing system or network, and distinguishing valid and invalid portions of the user input. The most specific portion of the invalid resource identifier is removed from the invalid resource identifier to create a modified resource identifier, wherein the modified resource identifier is used to attempt to access a higher-level computer resource. The fields corresponding to the most specific portion of the resource identifier are removed until the modified resource identifier proves to be a valid resource identifier, which can access a computer resource.

The '324 patent processes all input determined to be invalid as an error or mistake without consideration to the benefits of intentionally receiving invalid input for the purpose of resource location. Though the '324 patent distinguishes a valid resource identifier from within an invalid resource identifier entered by the user, no consideration is given to further using the invalid portion of the resource identifier for other purposes. The '324 patent treats the invalid identifier as if it was at one time valid. Modification of the resource identifier is only path specific and does not contemplate modifying the domain level or server portion of the resource identifier. Furthermore, such modification techniques are applied in only one direction which is to successively generate a higher level computer resource through truncation, and does not contemplate successively generating lower level computer resources through prepend or append procedures.

U.S. Pat. No. 5,978,817 issued on Nov. 2, 1999 by Giannandrea, et al., entitled, "Browser having automatic URL generation" discloses a method for accessing a remote server over a network using a browser from a URL that contains a protocol portion and a server portion. A front-end module of the browser allows a viewer to type in a host name and it can supply the complete URL address to locate the corresponding file from a remote server. For example, when a viewer types in "www.foo.com", the module causes NETLIB to open a connection using the following URL name: "http://www.foo.com/". Similarly, when a viewer types in "ftp.foo.com", "news.foo.com", or "gopher.foo.com", the module causes NETLIB to a open a connection using "ftp://ftp.foo.com", "news://news.foo.com/", or "gopher://gopher.foo.com/", respectively. This feature reduces the amount of typing by a viewer, thereby making the browser easier to use. Though the protocol portion that corresponds to the typed-in server portion is determined in response to the typed-in server portion, there is no mention of how to prepend lower level domains to a domain name in response to failing to access a network resource corresponding to the domain name.

A more recent feature called Smart Browsing is integrated into Netscape Navigator that uses Internet Keywords so users can streamline the use of URLs and get fast access to web sites using the browser's location field. Any single or multiword strings typed into the browser's location field that does not include a "." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "." versus " " is a key factor in determining what services are used. The detection of a "." implies a domain name for name resolution services whereas the detection of a " " implies a search request for directory services depending on context.

The autosearch feature of MSIE is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL cannot be constructed, the browser then automatically formats a search engine query using the user-entered text and forwards the query to an Internet search engine. In an alternative embodiment of the '459 patent, the passing of search terms to the search engine is not triggered by an improper URL being entered but rather is triggered by the failure to resolve the URL to a web site within a certain time frame due to a heavily used page that cannot be readily accessed.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo! search engine to be called is "http://msie.yahoo.com/autosearch?%s". The % s is filled in with information regarding the search terms.

RealNames Corporation provides a registry of registered keywords and phrases as an alternate means of resource location. Recently, Microsoft in alliance with RealNames has configured MSIE AutoSearch feature to redirect to a RealNames resolver/server in an attempt to find any registered keywords or phrases that match the search input entered into the browser. Currently, RealNames resolvers/servers do not perform the step of determining domain name availability nor the step of processing input in response to a DNS resolution error, but is used instead only as an alternative navigational tool in response to search requests.

On Sep. 5, 2001, CINET published an article, entitled, "Microsoft gives error pages new direction" can be accessed from the URL, "http://news.cnet.com/news/0-1005-200-7056749.html". For the first time, Microsoft now provides search results in response to a DNS resolution/query error. Previously the Autosearch, redirected to a navigation error message. Now the Autosearch, redirects to a Microsoft Network (MSN) search page which further includes the navigation error (see FIG. 2d). This search page does not include advertising of any kind. Included in this new web page is a text box object 274, which prompts a user to correct the spelling of the location field input, a list of hyperlinks of similar web addresses 278 to navigate to, and a hyperlink of user input that will further provide more detailed search results 280 from MSN network. Though Microsoft's new search page/error page provides more detailed information to the user, such results provide only basic assistance to further navigation and searching. There is no indication of further assistance by providing more precise navigation and search requests and other request types such as advertising requests, WHOIS requests, registration requests, subscription requests, dialing requests, messaging requests, conferencing requests, vendor requests, service requests, login requests, authorization requests, reference requests and the like to the user.

Each day hundreds of thousands of users are connecting to the Internet for the first time. First time users are already familiar with the concept of a domain name or web address such as "example.com" or a URL such as "http://www.example.com/index.html" because of their contact with the myriad of advertisements in print, radio, and television. Because the navigation of network resources is left up to the user, it is quite often that a user may enter a descriptive word and concatenate a TLD such as ".com" to it, forming a domain name with the hope of finding information relating to the descriptive word. When a resource such as a web page can not be accessed after entering a web address or URL in the command line of a device or location field of a web browser, novice users of the Internet may assume that the resource does not exist and that the domain name of such a resource is available to the user for registration. This is a common mistake. The domain name may be registered but has no corresponding web site. Availability of the domain name remains unclear until a separate domain name availability request such as a WHOIS, RRP or EPP request is performed. To date, there is know known system for using the location field of a web browser as a registration tool in addition to a navigation tool and search tool.

To date, navigation services, search services, primary market services such as identifier availability services, WHOIS services, and identifier registration services, and secondary market services also known as aftermarket services such as identifier monitoring and back-order services, identifier listing services for auction, appraisal, rent, sale, or lease and the like have remained separate services. Additional advantages can be obtained by integrating these separate services into a unified service. Accordingly, in light of the above, there is a strong need in the art for integrating these services with a method, product, and apparatus for resource identifier registration and aftermarket services.

SUMMARY OF INVENTION

The present invention enables the seamless integration between resource identification, name resolution, and registration services. The invention allows for the extended utility of the command line of a device or location field of a client browser for determining domain name availability to streamline the registration process. The present invention helps novice Internet users to more readily understand the difference between resource location and domain name availability. The invention may use zone file caching and advanced domain name translation lookups to reduce extra bandwidth required by relying on client name resolution services or WHOIS lookups only. The present invention enables various methods of registration provider selection by a user or at random each time a browser redirects to registration services, assuring that business is distributed to other registrars. The invention may use a template of the MSIE autosearch feature for the purposes of registration rather than purpose of searching in lieu of making browser modifications resulting in the savings of distribution costs for software updates.

The present invention may use a wildcard resource record having an IP address corresponding to a network resource adapted to determine which domain name registration provider of a plurality of domain name registration providers can process the registration request when it is determined that a domain name is available for registration. The invention can attempt to access a network resource by generating a resolvable subdomain from the initial domain name before potentially processing a registration request. The present invention may generate many identifiers such as keywords, fictitious domain names and the like in response to initiating a registration request from a network resource that can not be accessed/located or from an unresolvable domain name. The invention enables an autosearch to process any request other than that of a search request.

The present invention can instantiate or call a MetaURI type object such as a WHOIS object to obtain meta-information at any given time during a user's navigation experience. The invention provides a WHOIS object, aftermarket object and/or back-order object that is adapted to extract a domain name from the current URI property either before, during or in response to an event such as a reference request, search request, navigation request, and the like. The present invention provides an expiry countdown parameter of a MetaURI type object to determine the difference between the expiration date and current date of the registration record, aftermarket record, or back-order record of an identifier such as a domain name.

The invention enables the integration of metalinks as part of search results and registration results. The present invention enables the use of identifier prefixes as a command language. The invention enables a user to edit, list, obtain the status and history, select, renew, transfer, escrow, auction, bid, valuate, purchase, sell, lease, redirect, lock, web host, incorporate, trademark, locate, dial, and back-order or "snap" a domain name. The present invention detects and/or generates identifiers in response to real-time data streams from input sources such as instant messaging, chat rooms, web conferencing, interactive television, or from any broadcast. The invention provides the user with the ability to create a profile or identifier watch list while registering an available or back-ordered identifier. The present invention detects and provides resolution, registration, monitoring, and back-ordering processing of fictitious domain names such as telephone numerical domain names (NDNs).

In general, in accordance with the present invention a method for processing a network resource request from an identifier having a first domain name includes the steps of determining that the network resource can not be accessed, and processing one of a search request, aftermarket status request, and registration request having at least a portion of the identifier.

In accordance with an aspect of the present invention, a method for requesting a network resource from an identifier having a valid domain name includes the steps of determining whether the network resource can be located, requesting the network resource from the identifier in response to determining that the network resource can be located, and processing a registration request in response to determining that the network resource can not be located.

In accordance with another aspect of the present invention, a method for locating a network resource from an identifier having a valid domain name includes the steps of determining whether the valid domain name is resolvable, resolving the identifier in response to determining that the valid domain name is resolvable, and processing a registration request in response to determining that the valid domain name is not resolvable.

In accordance with yet another aspect of the present invention, a method for processing an autosearch includes the steps of receiving a first request having an identifier, determining that at least a portion of the first request can not be processed, and processing a second request having at least a portion of the identifier from the autosearch wherein the second request is any request other than that of a search request (e.g., non-search request such as navigation request, resolution request, and registration request).

In accordance with an additional aspect of the present invention, a method for processing input having an identifier includes determining that the identifier is back-ordered, and determining whether to provide notification when the identifier is no longer back-ordered or soon to be no longer back-ordered.

In accordance with another aspect of the present invention, a method for processing input having an identifier includes obtaining a MetaURI type object having at least one property corresponding to the identifier, generating a request from the at least one property of the MetaURI type object, and processing the generated request.

In accordance with yet another aspect of the present invention, a method for processing input having an identifier includes determining that the identifier includes a numerical domain name (NDN), and determining whether the NDN is available for registration.

In accordance with an additional aspect of the present invention, a method for processing an autosearch includes receiving a first request having an identifier, determining that at least a portion of the first request can not be processed, and processing with the autosearch, a second request having at least a portion of the identifier wherein the second request is a not a search request.

In accordance with other additional aspects of the present invention, an apparatus, device, system, and computer program product may be used to perform substantially the same methods as those described above are provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF DRAWINGS

FIG. 2d is a diagram illustrating a prior art system for presenting results in response to a DNS resolution request error.

FIG. 5a is a diagram depicting an exemplary configuration settings interface in accordance with the present invention for selecting URI redirection.

FIG. 5b presents an exemplary table in accordance with the present invention illustrating the minimum data structure of a registration provider database.

FIG. 9b is a flowchart illustrating an identifier registration form in accordance with the present invention.

FIG. 9c illustrates the page source of modified WHOIS output in accordance with the present invention.

FIG. 11b presents an exemplary table in accordance with the present invention of a zone file having a wildcard resource record.

FIG. 13a is a block diagram illustrating the components of a MetaURI object in accordance with the present invention.

FIG. 13b is a flowchart illustrating the steps performed for retrieving MetaURI object information in accordance with the present invention.

FIG. 18a is an illustration of prior art for the typical output of a search request.

FIG. 18b is an illustration of modifications to the output of the search request to extend the functionality of the search results in accordance with the present invention.

DETAILED DESCRIPTION

Figure 1A:
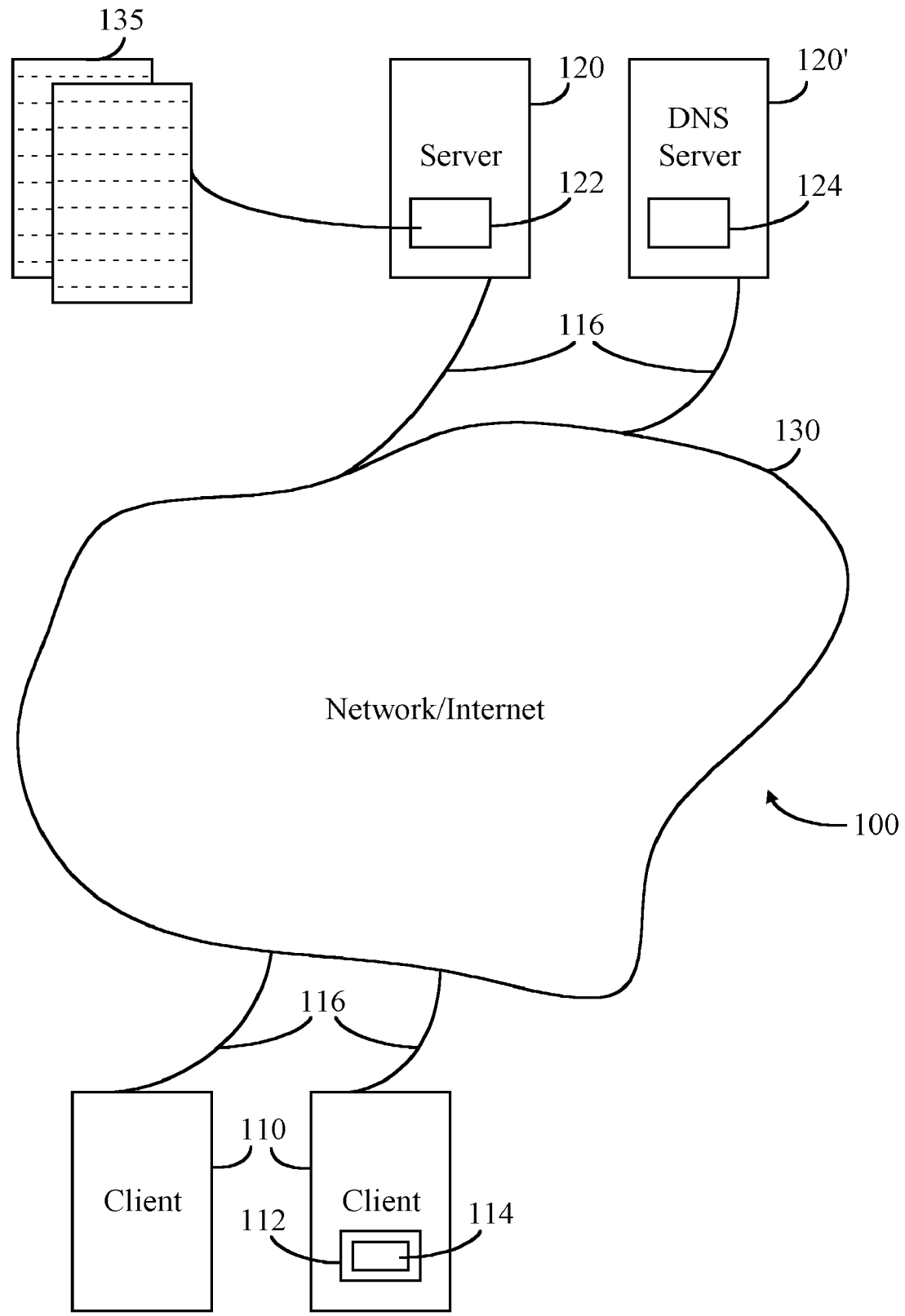
FIG. 1a is a block diagram of an exemplary distributed computer system in accordance with the present invention.

The present invention will now be described with reference to the drawings, wherein like reference numerals are used to refer to like elements throughout.

FIG. 1a illustrates an exemplary system for providing a distributed computer system 100 in accordance with one aspect of the present invention and may include client computers or any network access apparatus 110 connected to server computers 120 via a network 130. The distributed system 100 may include client computers or any network access apparatus 110 connected to server computers 120 via a network 130. The network 130 may use Internet communications protocols (IP) to allow clients 110 to communicate with servers 120. The communication device of a network access apparatus 110 may include a transceiver, a modem, a network interface card, or other interface devices to communicate with the electronic network 130. The network access apparatus 110 may be operationally coupled to and/or include a Global Positioning System (GPS) receiver. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may be accessed via an on-line service, an Internet service provider, a local area network service, a wide area network service, a cable television service, a wireless data service, an intranet, a virtual private network, a peer-to-peer network, a satellite service, or the like.

Client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors 150, memories 154, and input/output devices 156. An input device may be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touch-screen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. One aspect of the present invention includes a specific type of server system 120 called a DNS server system 120' which stores in memory a DNS database 124 having DNS records that translate domain names into IP addresses and vice versa. The DNS server system 120' is connected 116 to a network 130.

The DNS is a distributed database (of mappings) 124 implemented in a hierarchy of DNS servers (name servers) 120' and an application-layer protocol that allows hosts and name servers to communicate in order to provide the translation service. Name servers 120' are usually UNIX machines running BIND software. In order to deal with an issue of scale of the Internet, the DNS uses a large number of name servers 120', organized in a hierarchical fashion and distributed around the world. No single name server 120' has all of the mappings 124 for all of the hosts in the Internet. Instead, the mappings 124 are distributed across many name servers 120'.

Although the client computers 110 are shown separate from the server computers 120, it should be understood that a single computer may perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally in distributed environments in which a client computer requests resources from a server computer.

During operation of the distributed system 100, users of the clients 110 may desire to access information records 122 stored by the servers 120 while utilizing, for example, the Web. The records of information 122 can be in the form of Web pages 135. The pages 135 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 135. The browser programs 112 enable users to enter addresses of specific Web pages 135 to be retrieved. Typically, the address of a Web page is specified as a Uniform Resource Identifier (URI) or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

A client of the DNS is called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a browser program 112 (e.g., an HTTP client), running on a user's machine, requests a URL having a resolvable domain name, in order for the user's machine to be able to send an HTTP request message to a server 120, the user's machine must obtain the IP address of the domain name. The user machine then runs the resolver 114 (DNS client) on the client-side of the DNS application. The browser 112 extracts the domain name from the URL and passes the domain name to the resolver 114 on the client-side of the DNS application. As part of a DNS query message, the DNS client 114 sends the domain name to a DNS server system 120' connected to the Internet. The DNS client 114 eventually receives a reply, which includes the IP address for the domain name. The browser then opens a TCP connection 116 to the HTTP server process 120 located at the IP address.

Figure 1B:
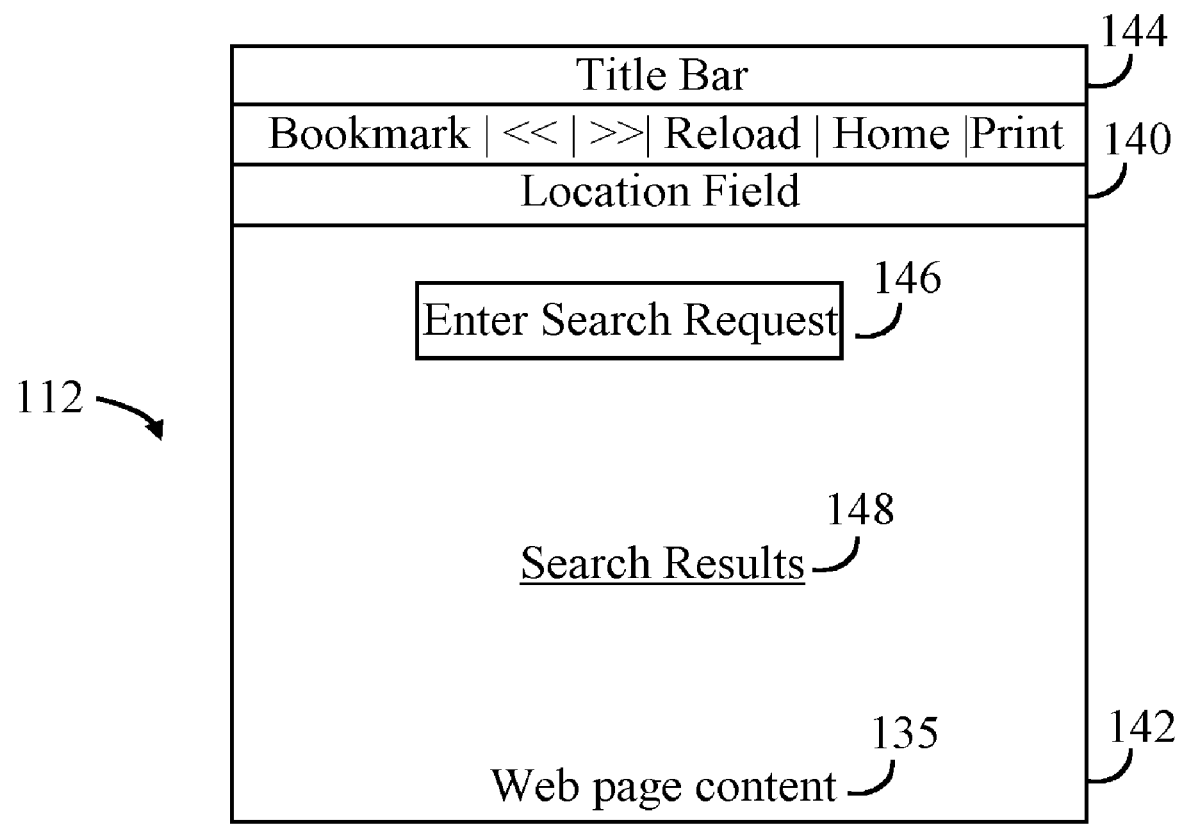
FIG. 1b is a diagram depicting the location field used in a conventional web browser.

FIG. 1b more specifically illustrates an exemplary selection of common operative components of a web browser program 112. The web browser 112 enables a user to access a particular web page 135 by typing the URL for the web page 135 in the location field 140. The web page 135 content corresponding to the URL from the location field 140 may be displayed within the client area of the web browser display window 142, for example. Title information from the web page 135 may be displayed in the title bar 144 of the web browser 112. The web page 135 content may further include a user interface element such as that of an input text box 146 for inputting search requests and, in turn, search results having identifiers 148 such as a hyperlink or URL.

Figure 1C:
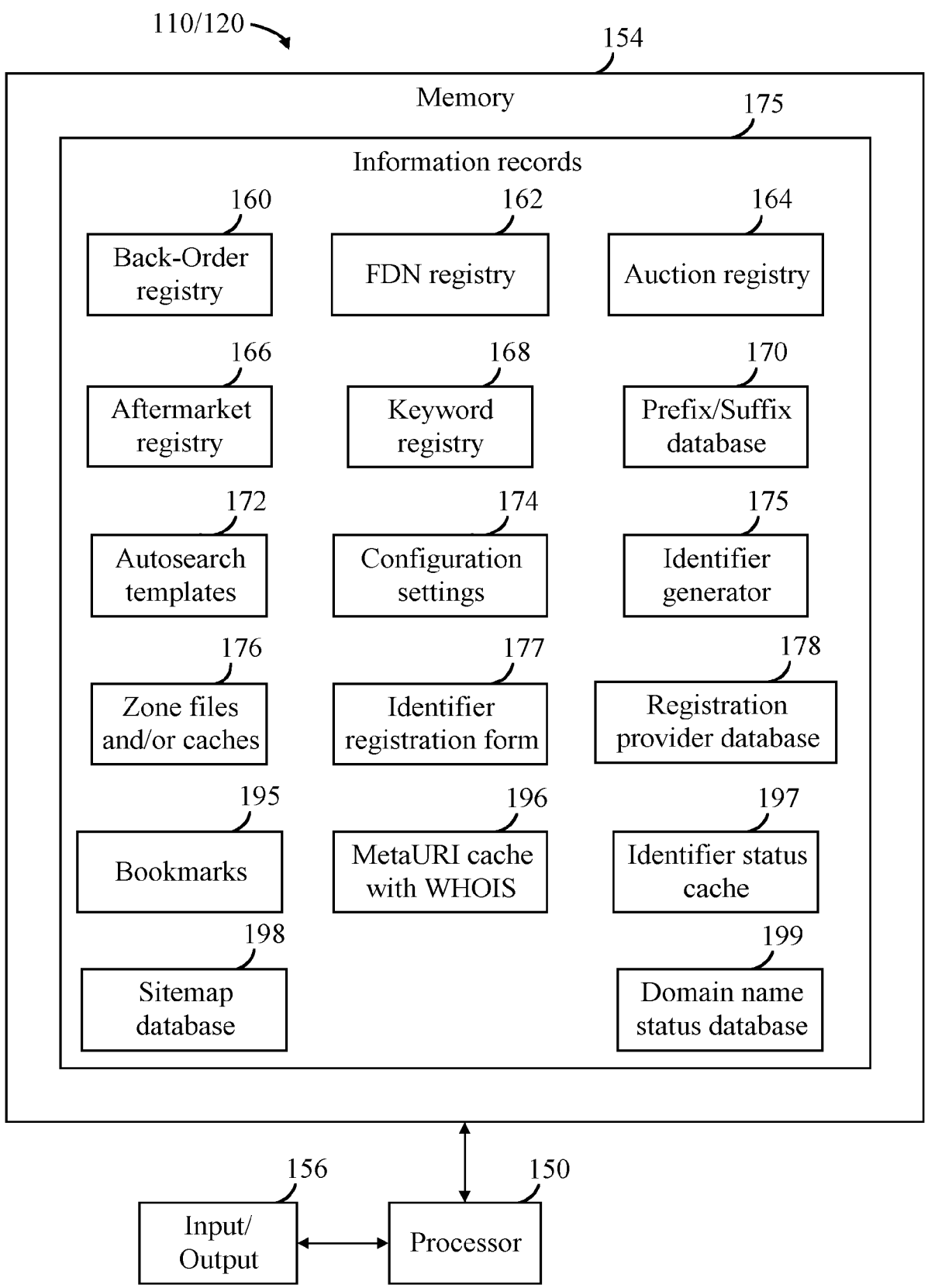
FIG. 1c is a block diagram illustrating exemplary information records stored in memory in accordance with the present invention.

FIG. 1c illustrates a block diagram of a storage device such as memory 154 in operative association with a processor 150. The processor 150 is operatively coupled to input/output devices 156 in any combination of client 110 and/or server 120 computing systems. Stored in memory 154 may be programs, scripts, and information records 122 having any combination of exemplary content such as lists, files, and databases. Such records may include for example: back-order registry 160, FDN registry 162 (including NDNs), auction registry 164, aftermarket registry 166, keyword registry 168, prefix/suffix database 170, autosearch templates 172, configuration setting information 174, identifier generator 175, zone files/zone file caches 176, identifier registration form 177, registration provider database 178, bookmarks 195, MetaURI cache 196, identifier status cache 197, sitemap database 198, and domain name status database 199. These information records 122 are further introduced and may be discussed in more detail throughout the disclosure of this invention.

Figure 1D:
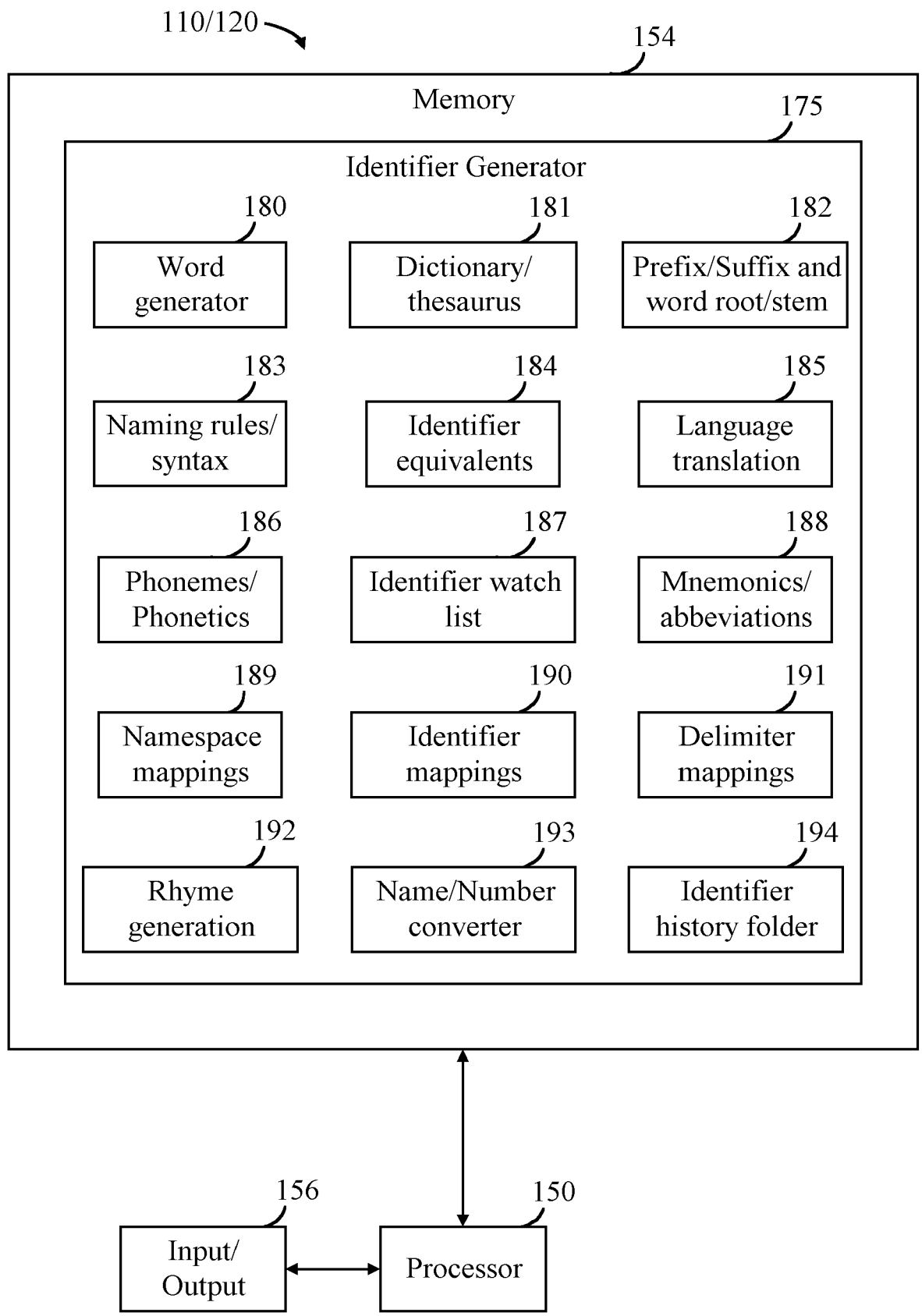
FIG. 1d is a block diagram illustrating identifier generator components and other exemplary information records stored in memory in accordance with the present invention.

FIG. 1d illustrates a block diagram of a storage device such as memory 154 in operative association with a processor 150. The processor 150 is operatively coupled to input/output devices 156 in any combination of client 110 and/or server 120 computing systems. Stored in memory 154 are records including elements/components of an identifier generator 175. Such components may include for example: word generation methods 180, dictionary/thesaurus 181, prefix/suffix and word root/stem 182, set of heuristic naming rules/namespace syntax 183, identifier equivalents 184, language translation 185, phonetics/phonemes (e.g., misspelling) 186, identifier watch list 187 (e.g., list of desirable descriptors, personal identifier portfolio, competitor identifier portfolio), mnemonics/abbreviations 188, namespace mappings 189, identifier mapping 190, delimiter mapping 191, rhyme generation 192, name/number conversion 193, and identifier history 194. These identifier generator components 175 may be further introduced and discussed in more detail throughout the disclosure of the present invention.

Figure 2A:
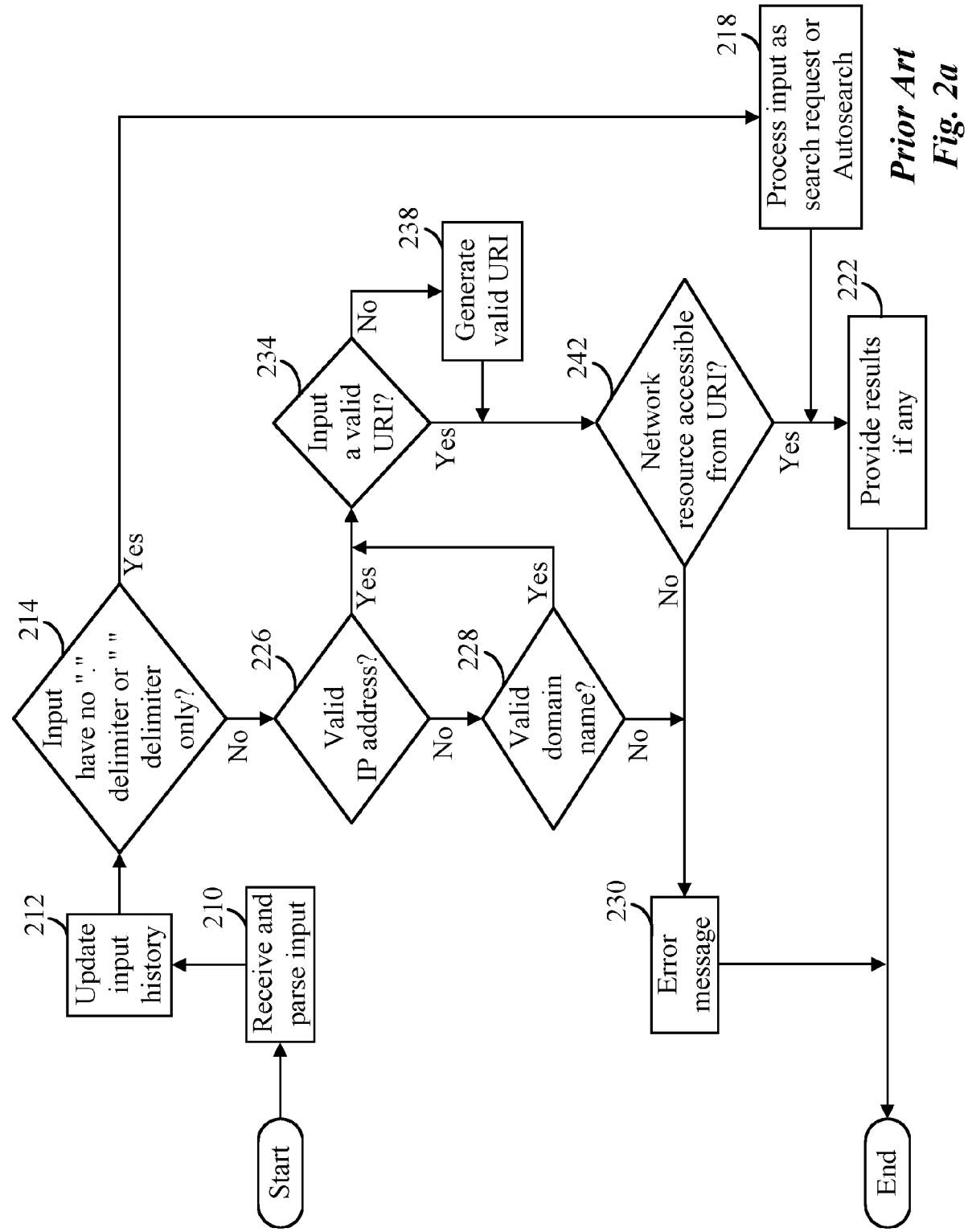
FIG. 2a is a top-level flowchart illustrating the steps performed by a prior art system for accessing a network resource from a navigation or resource location request.

FIG. 2a is a top level flowchart illustrating the steps of an exemplary prior art system for accessing a network resource from a navigation or resource location request. A device such as a network access apparatus 110, servlet, applet, stand-alone executable program, or user interface element such as a text box object, command line, speech to text interface, location field 140 of a web browser 112, may receive and parse input such as text or voice in step 210 and input history 196 is updated in step 212. Tests are then performed to determine how to process the received input 210. For instance, when it is determined in step 214 that input 210 has no "." delimiters or " " delimiters only, it becomes clear that there is no domain name or IP address present and input 210 may be processed as a search request (e.g., AutoSearch feature) in step 218. Results if any, are then provided (e.g., notified, accessed, and/or displayed) in step 222. When the presence of the "." delimiter is determined in step 214, the input may include either an IP address or a domain name (e.g., input includes one or more "." delimiters only). When it is determined in step 226 that input does not include a valid IP address and determined in step 228 that input does not include a valid domain name, a browser error message may be displayed in step 230.

When input includes a valid IP address (step 226) or when input includes a valid domain name (step 228), it may then be further determined in step 234 whether input 210 includes a valid URI. If there is no valid URI, then a valid URI may be generated in step 238 from input 210. For instance, if a scheme/protocol is missing, the web browser may add the prefix "http://" to the text or another scheme prefix. After performing input validity tests, the steps of domain name resolvability may be performed. When a received (step 234) or generated (step 238) valid URI is determined accessible in step 242, then results, if any, may then be provided in step 222. However, when a valid URI is determined not accessible (step 242), an error message may be displayed in step 230.

One example of such a system is when a domain name (e.g., "example.com") is entered into a location field 140 of a web browser program such as MSIE. The MSIE browser generates a URI (e.g., "http://www.example.com") from the domain name. If the domain name is resolvable (e.g., the domain name is successfully translated into its corresponding IP address) then the web browser attempts to access content from a web server corresponding to the URI. If the domain name is not resolvable, then input 210 may be passed and the following URI is generated:

"http://auto.search.msn.com/response.asp?MT=example.com&srch=3&prov=&utf8"

The "." is a delimiter of the DNS system whereas the " " is a delimiter of plain text language. When a keyword search is provided as input, (e.g., "search example") it may be determined that DNS name resolution is unnecessary and input 210 may be immediately redirected to the Microsoft Network (MSN) AutoSearch feature. In effect, all input that can not be successfully resolved/located/accessed may be redirected to the server at "auto.search.msn.com" and processed accordingly as either an error message or search request. The Netscape Navigator browser program does not provide additional processing when a domain name is not resolvable, and instead, displays the following error message: "Browser is unable to locate the server: example.com The server does not have a DNS entry. Check the server name in the Location (URL) and try again."

Figure 2B:
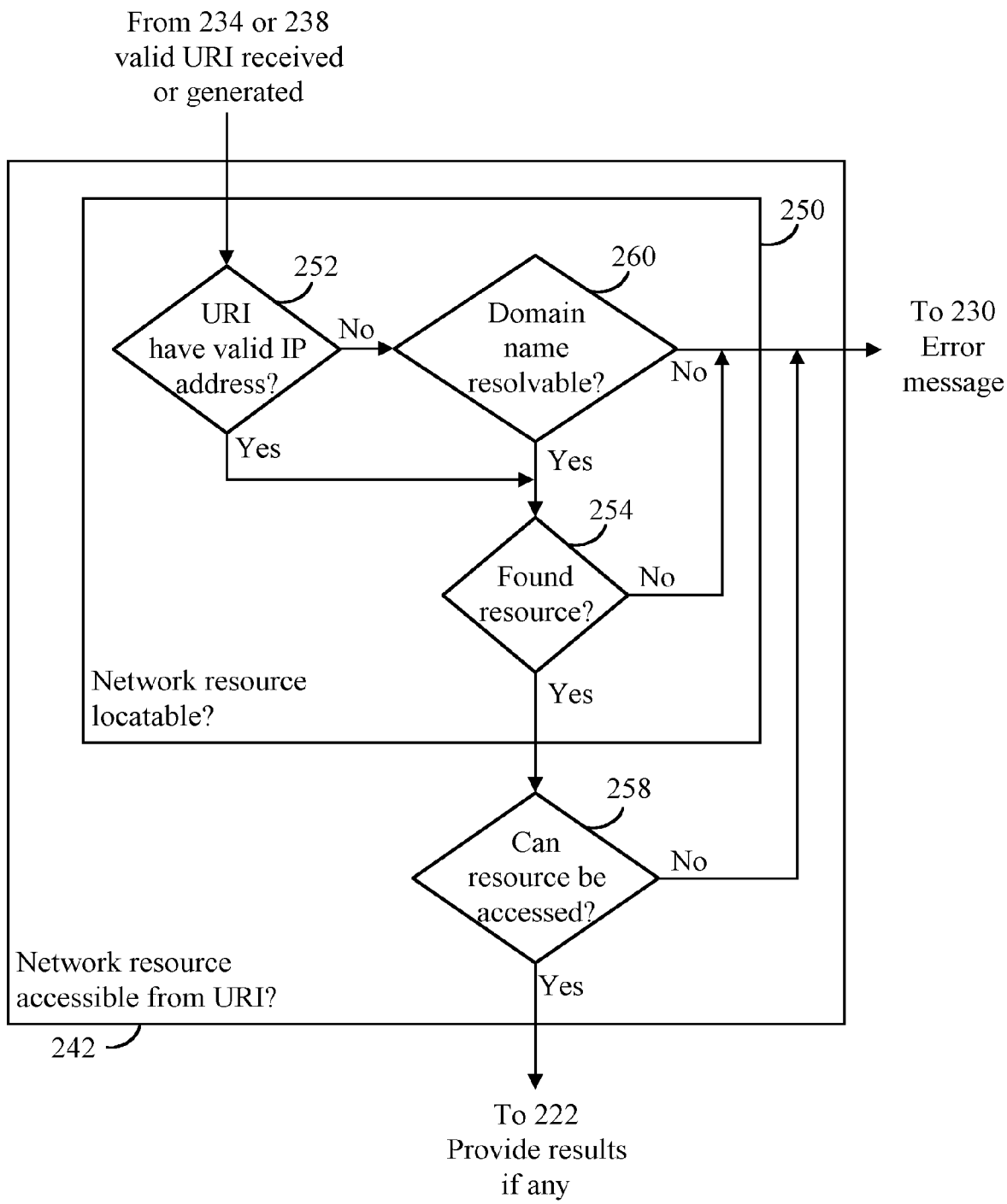
FIG. 2b is a flowchart illustrating the steps performed by a prior art system for determining whether a URI is accessible.

FIG. 2b more specifically illustrates steps that are performed for determining whether the URI is accessible (step 242). It is first determined in step 250 whether a network resource can be located from the received (step 234) or generated (step 238) valid URI. When the URI is determined in step 252 to not include a valid IP address, and instead includes a domain name, it is then determined in step 260 whether the domain name is resolvable. Domain name resolution is explained in P. Mockapetris, "Informational RFC (Request for Comment) 1035: Domain Names Implementation and Specification", Internet Engineering Task Force (IETF), November 1987, "http://www.faqs.org/rfcs/rfc1035.html".

When the domain name is determined resolvable (step 260) or when the URI includes a valid IP address (step 252) it is further determined in step 254 whether a network resource such as a web page or web server can be located or found from the URI. If so, then the network resource can be located (step 250) and it is determined in step 258 whether the network resource can be accessed. When content, for example, can be accessed from the web server (network resource) then the network resource is accessible from URI (step 242) and results, if any, may then be provided in step 222. When the domain name is determined not resolvable (step 260) or when the resource can not be found (step 254) or when the resource can not be accessed (step 258) then an error message is displayed in step 230.

MSIE browser may redirect such input to the autosearch feature, but is configured to prompt the client browser to display an error message. The domain name that is not valid or not resolvable has never been further processed by the autosearch or routed to another naming service/resolution provider or registration provider for further processing. For example, such input is not routed to a RealNames server and/or resolver for domain name resolution or registration.

Figure 2C:
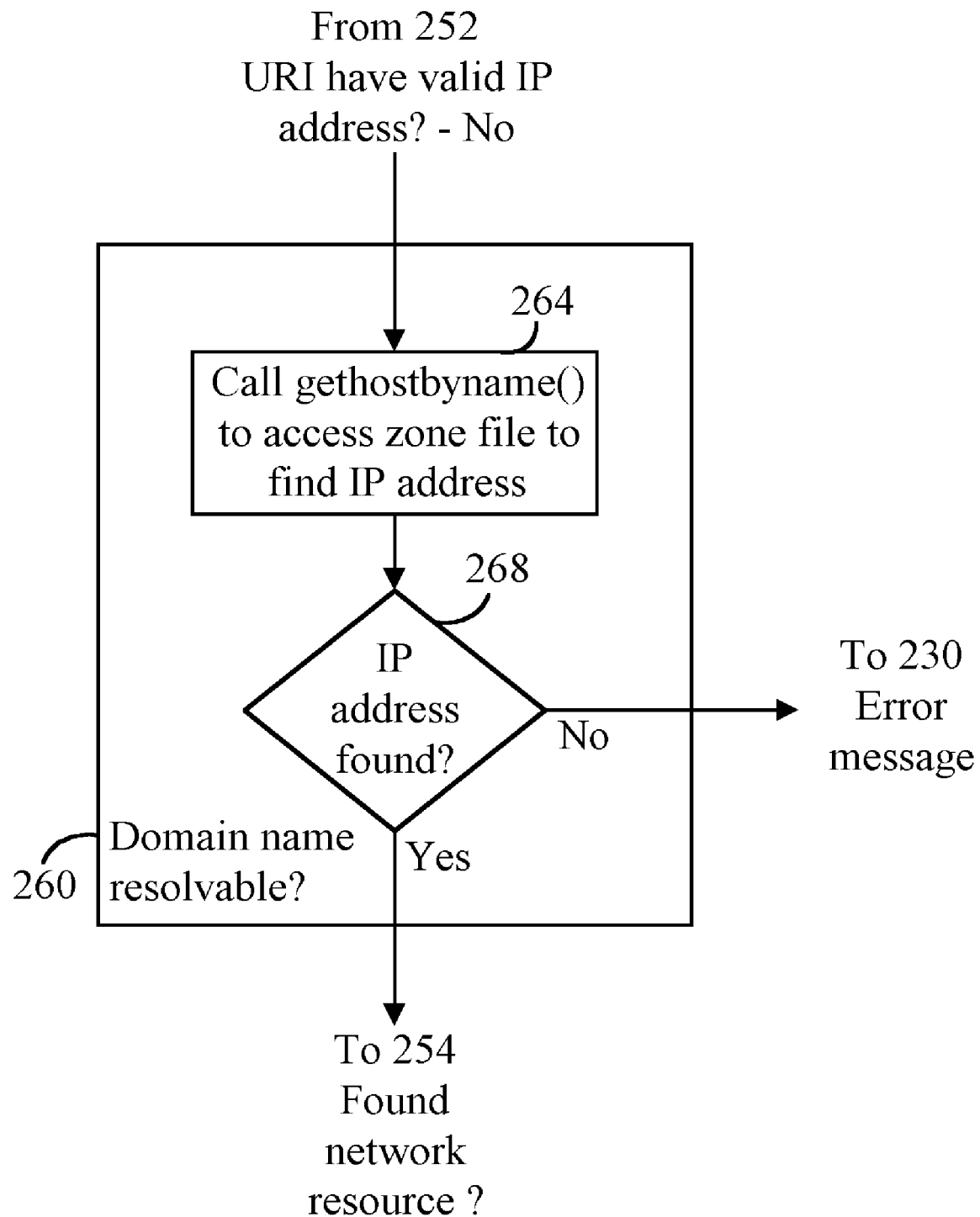
FIG. 2c is a flowchart illustrating the steps of an exemplary prior art system for determining domain name resolvability.

FIG. 2c is a flowchart illustrating the steps of an exemplary prior art system for determining domain name resolvability. Specific steps for the determination of domain name resolvability (step 260) include issuing a function call in step 264 from the web browser 112 to gethostbyname( ) from the resolver library 114 to translate the domain name into its corresponding IP address from the DNS database 124 of a DNS server system 120'. When gethostbyname( ) returns a NULL pointer in step 264, then it is determined in step 268 that no IP address is found and an error message is displayed in step 230. However, when an IP address is found in step 268, then a request is submitted to find (step 254) and access (step 254) the network resource located at the IP address.

FIG. 2d is a block diagram illustrating a prior art system for presenting results in response to a DNS resolution request error. A search result page 148 and/or error message page 230 includes a text box object 274, which prompts a user to correct the spelling of the location field input, a list of hyperlinks of similar web addresses 278 to navigate to, and a hyperlink of user input that will further provide more detailed search results 280 from MSN network. Though Microsoft's new search page/error page provides more information to the user than an error message, such results provide only basic assistance to further navigation and searching and does not contemplate offering yet more detailed assistance by providing more precise navigation and search requests, and other request types such as advertising requests, WHOIS requests, registration requests, subscription requests, dialing requests, messaging requests, conferencing requests, vendor requests, service requests, login requests, authorization requests, reference requests and the like to the user.

For example, when processing an input identifier such as "zipnames.com", the following URI is constructed from the autosearch feature:

"http://auto.search.msn.com/response.asp?MT=zipnames.com&srch=3&prov=&utf8"

The autosearch no longer prompts the client browser to present an error message, but instead is now configured to redirect to a new component of MSN search to provide a server side error message with added search results represented by the URI:

"http://auto.search.msn.com/results.asp?cfg=DNSERROR &q=zipnames%2Ecom"

As discussed, domain names are primarily processed by either name resolution or resource location services and also processed by registration services as well. When a domain name is received as input to a registration service, the availability of the domain name is determined. If the domain name is not available, registrant information is returned and the client is notified that the domain name in question is not available and provides the further option of checking the availability of other domain names. When the domain name is available, the user is presented with the choice of registering the domain name. Upon completion of registration, another domain name can be checked for availability.

Figure 3A:
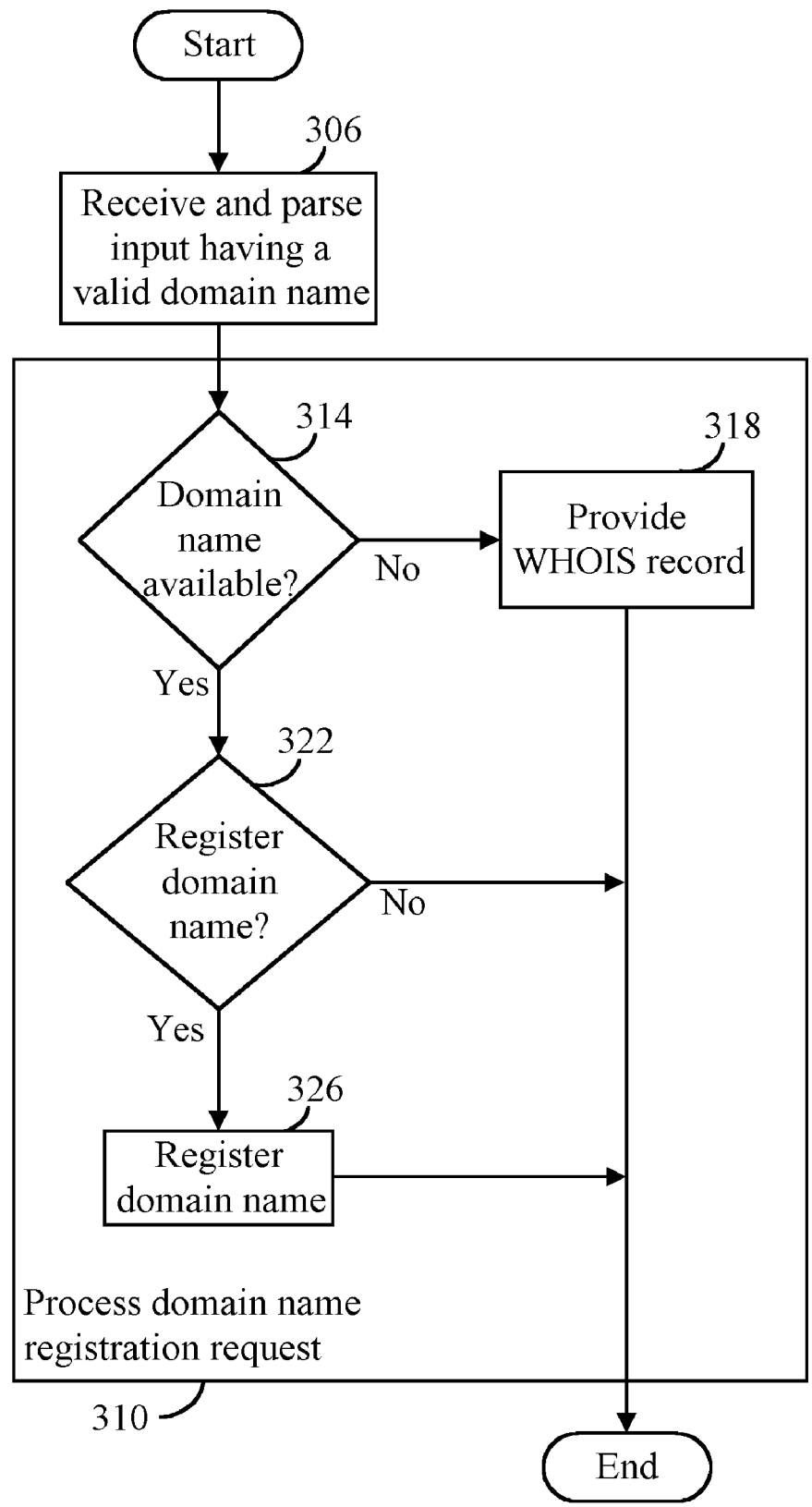
FIG. 3a is a flowchart illustrating the steps performed by a prior art system for processing a domain name registration request.

FIG. 3a illustrates such a registration service. A device, network access apparatus 110, servlet, applet, stand-alone executable program, or a user interface element such as a text box object, receives and parses input having a valid domain name in step 306. The valid domain name is then processed as a registration request in step 310. To process such a request, availability of the domain name 306 is determined in step 314. If the domain name 306 is determined to be not available in step 314, then a record from a corresponding WHOIS database is retrieved and provided in step 318. However, when the domain name 306 is determined available in step 314, then such information is presented accordingly, prompting the user in step 322 to register the domain name. When it is determined in step 322 that the user would like to register the domain name 306, further information is presented to assist the user in registering the domain name in step 326. Specification of the WHOIS protocol is provided in K. Harrenstien, M. Stahl, and E. Feinler, "Informational RFC (Request for Comment) 954: NICNAME/WHOIS".

Figure 3B:
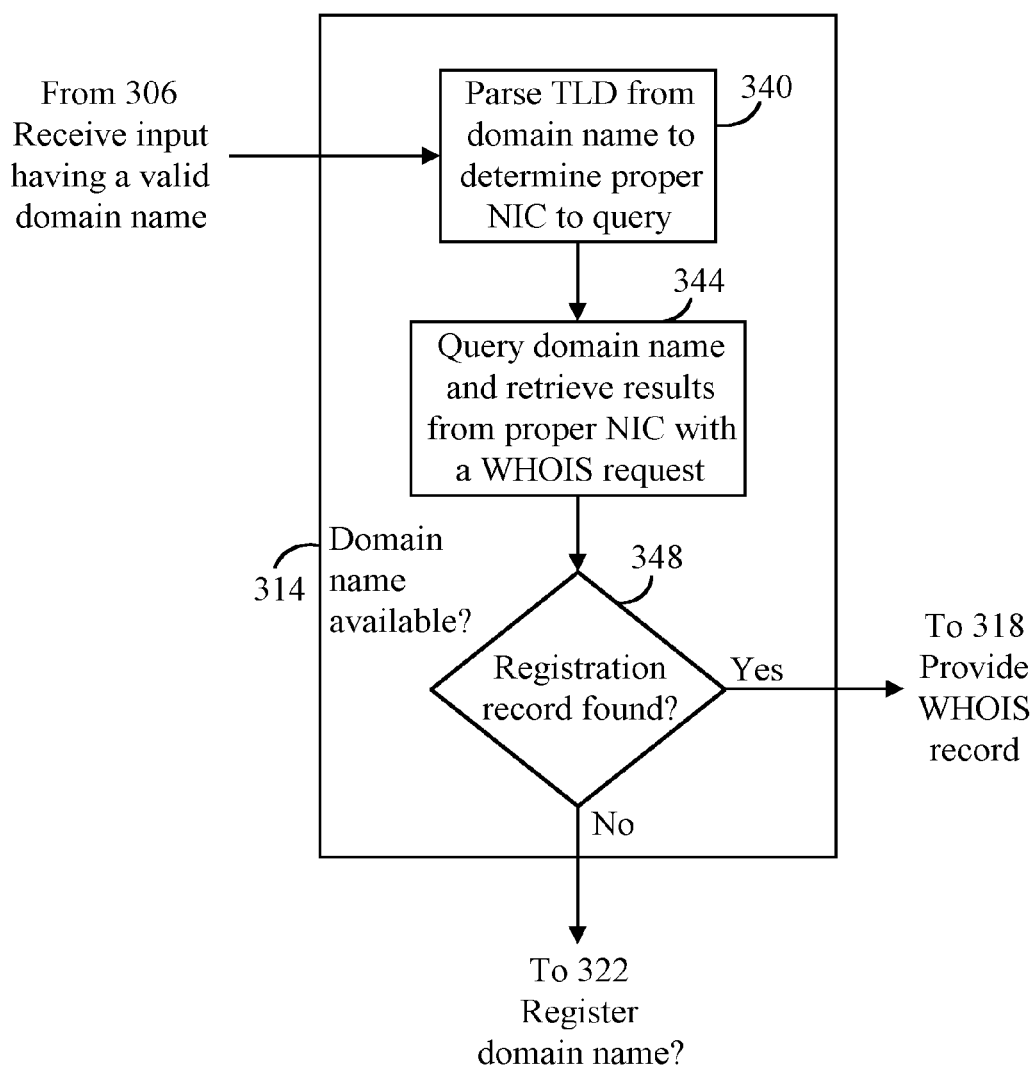
FIG. 3b is a flowchart illustrating the steps performed by a prior art system for determining domain name availability.
Figure 3C:
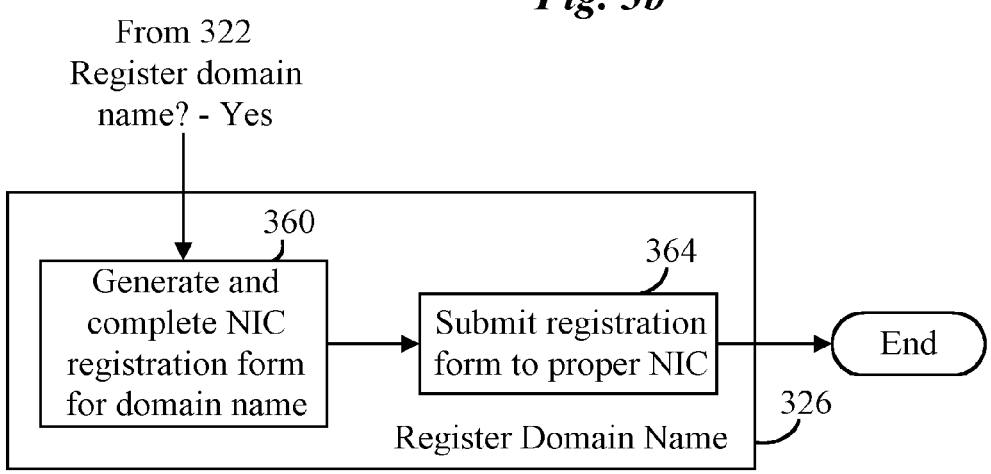
FIG. 3c is a flowchart illustrating the steps performed by a prior art system for registering a domain name.

FIG. 3b more specifically illustrates the steps performed for determining domain name availability (step 314). A TLD is parsed in step 340 from the valid domain name 306 to determine which NIC to query. A WHOIS, EPP, or RRP request of the domain name 306 is submitted in step 344 to the proper NIC or Registry and query results are retrieved. When a registration record is found in step 348, the record is displayed in step 318 from the WHOIS database, otherwise the user is prompted in step 322 to register the domain name. FIG. 3c more specifically illustrates the steps performed for registering (step 326) the domain name. When it is determined in step 322 that the user would like to register the domain name, the user completes a NIC registration form in step 360. The form is then submitted in step 364 to the proper NIC authority for processing.

FIG. 4a is a top-level flowchart illustrating a new combination of steps in accordance with the present invention for the processing of resource location services. As discussed in FIG. 2a, when a valid URI having a valid domain name is generated (step 238) or received (step 234), the accessibility of the URI is then determined in step 242. As previously explained and shown in FIG. 2b, one step in determining URI accessibility is the determination of domain name resolvability (step 260). Rather than, or in addition to, displaying an error message (step 230) or processing a search request (step 218) in response to determining that a network resource can not be accessed (step 242), can not be located (step 250), or that a domain name can not be resolved (step 260), at least a portion of the URI is instead redirected to registration services and processed in step 410 as a registration request (discussed in more detail in conjunction with FIG. 7a).

FIG. 4b is a top-level flowchart illustrating the step performed of presenting results as part of a search page and/or error page in response to the determination that a network resource can not be accessed or located or that a domain name is unresolvable in accordance with the present invention. As discussed in FIG. 2a, when a valid URI having a valid domain name is generated (step 238) or received (step 234), the accessibility of the URI is then determined in step 242. As previously explained and shown in FIG. 2b, one step in determining URI accessibility is the determination of domain name resolvability (step 260). Rather than, or in addition to, automatically processing a registration request (step 410) or processing a search request (step 218) in response to determining that a network resource can not be accessed (step 242), can not be located (step 250), or that a domain name can not be resolved (step 260), in an alternative embodiment of the present invention, part of a web page 135 and/or error page (step 230) is provided in step 415 and can include a user interface element adapted to perform at least one non-search request from at least a portion of the identifier and/or any variant, related, associated, or similar identifiers. Such requests can include more precise navigation and search requests and other request types such as advertising requests, WHOIS requests, registration requests, subscription requests, dialing requests, messaging requests, conferencing requests, vendor requests, service requests, login requests, authorization requests, reference requests and the like to the user.

For example, a user interface element can include an advertisement that pertains to any of the above request types such as an ad for registering, appraising, auctioning and/or pre-ordering a domain name or an ad that provides a more specific search and/or navigation function based on the processed input. The user interface can include a hyperlink which can be used to access the above listed request types such as a link that when activated that can perform a WHOIS, EPP, or RRP request (step 344) on the domain name and/or process the registration request (step 410). Such links may also include the ability to provide aftermarket information on the identifier (in this case a domain name). For instance, a link for auctioning, appraising, or pre-ordering a domain name would be an example of a registration request type link. In addition, links of similar generated domain names or identifiers in other namespaces that are available for registration can be included. Furthermore, user interface elements for identifiers such as fictitious domain names (FDNs) can be used for any request type, and in particular for search requests, registration requests, and additional resolution requests.

Such a web page 135 or error message (step 230) having at least one hyperlink may be provided when a domain name or IP address is determined not valid (step 266 or step 228) and does not rely upon having to determine domain name resolvability (step 260) as a prerequisite step. In addition, further options such as performing a search request (step 218) or modifying configuration settings 174 may also be included as hyperlinks in such a resulting web page 135 or error message (step 230).

FIG. 4c is a top-level flowchart illustrating the step performed of contemporaneously processing a search request and registration request in response to the determination that a network resource can not be accessed or located or that a domain name is unresolvable in accordance with the present invention. Rather than, or in addition to, automatically processing a registration request (step 410) in response to determining that a network resource can not be accessed (step 242), can not be located (step 250), or that a domain name can not be resolved (step 260), in an alternative embodiment of the present invention, both a registration request (step 410) and search request (step 218) can be contemporaneously processed in step 416. Results of both request types can be combined and integrated into a web page 135 or error message (step 230).

Figure 4D:
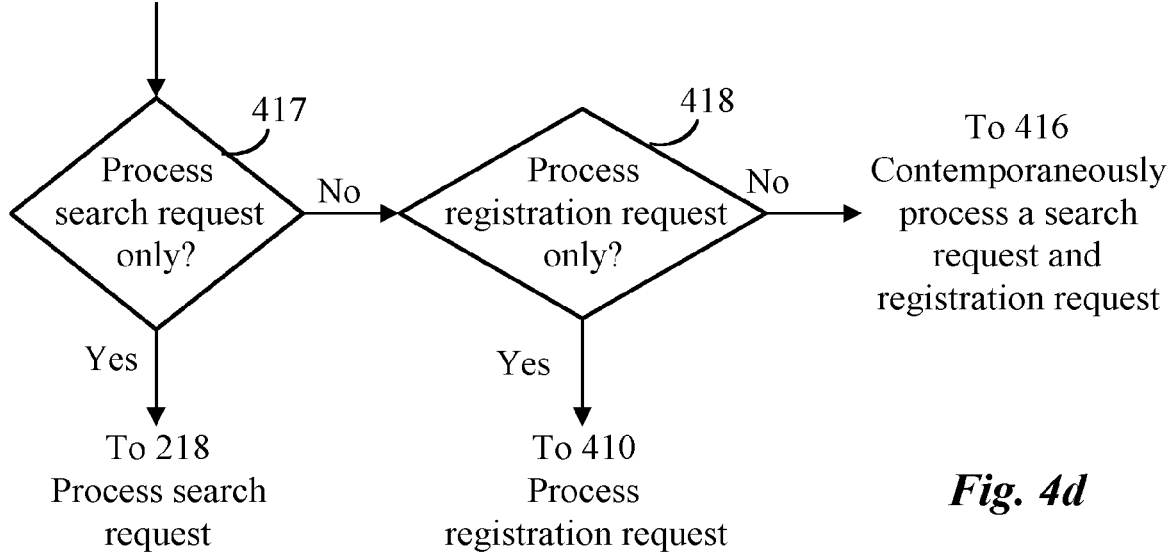
FIG. 4d is a top-level flowchart illustrating the steps performed of determining whether to process a search request, a registration request, or both requests in response to the determination that a network resource can not be accessed or located or that a domain name is unresolvable in accordance with the present invention.

FIG. 4d is a top-level flowchart illustrating the steps performed of determining whether to process a search request, a registration request, or both requests in response to the determination that a network resource can not be accessed or located or that a domain name is unresolvable in accordance with the present invention. Rather than automatically processing a registration request (step 410) in response to determining that a network resource can not be accessed (step 242), can not be located (step 250), or that a domain name can not be resolved (step 260), in an alternative embodiment of the present invention, it is determined in step 417 whether to process a search request only. If so, then a search request is processed (step 218). When a search request only is not processed then it is determined in step 418 whether to process a registration request only. If so, then a registration request is processed (step 410). However, when a registration request only is not processed then both a registration request and search request can be contemporaneously processed (step 416). Other request types such as advertising, commerce, and resolution requests can all be configured separately or in any combination and integrated into a specified configuration for operation to the above requests.

Figure 4E:
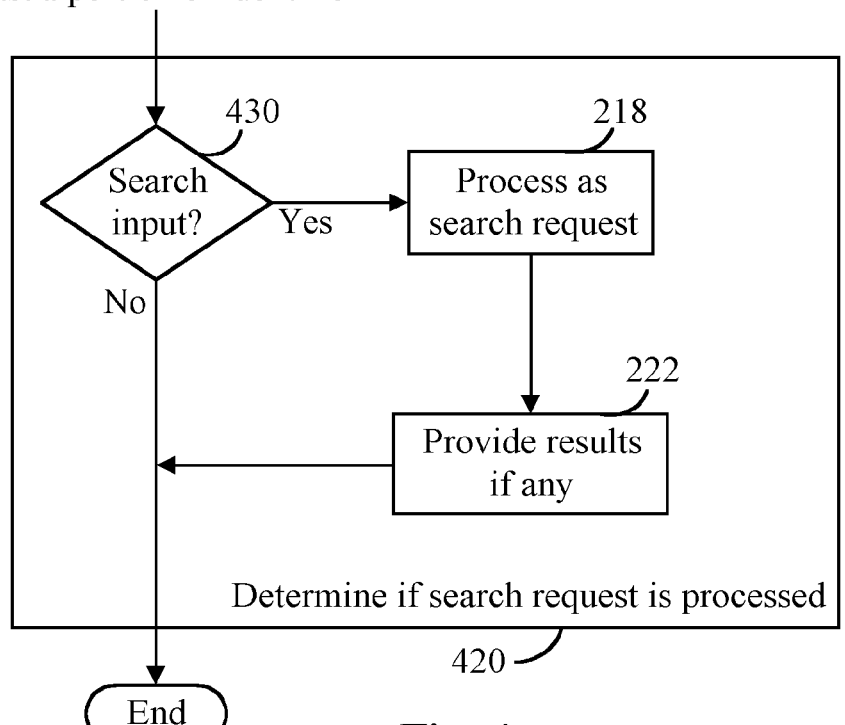
FIG. 4e is a flowchart illustrating the steps performed for further integrating registration services with resource location services and search services in accordance with the present invention.

FIG. 4e is a flowchart illustrating the steps performed for further integrating registration services with resource location services and search services. After the registration request is processed in step 410, it is determined in step 420 whether a search request is processed. More specifically, it is further determined in step 430 whether received input 210 is to be processed as a search request (step 218). When this is the case, a search request is constructed from the identifier (e.g., domain name) and processed in step 218 and results if any, are then provided in step 222.

FIG. 4f is a diagram illustrating a broader range of results in response to a DNS resolution request error in accordance with the present invention. A web page having additional results is presented when it is determined that a network resource can not be accessed from the input 274 "zipnames.com". A banner ad 438 corresponding to the input is presented. Hyperlinks 440 for more specific navigation within the input identifier is provided. For instance, a web server can not be accessed from "zipnames.com", but can be accessed from "www.zipnames.com" or "ftp.zipnames.com". A hyperlink 442 to determine whether the identifier is available for registration can be presented as well as hyperlinks of similar identifiers 444 that may also be available for registration and/or further navigation.

FDN identifiers 446 such as "zip.names" that may correspond to the input are presented as a means for further searching, navigation, advertising, and/or registration as well a presenting a hyperlink or like element 448 to determine whether the identifier or any similar variation there of is available across other namespaces and naming systems. In addition, hyperlinks can be presented 450 that pertain to current status and/or aftermarket information such as auctions, bidding, appraisals, watch list/monitoring, and backordering the input identifier and/or any identifier in any naming system generated from at least a portion of the input identifier. Furthermore, links 452 can be provided of other identifiers that have the same registrant/owner as the input identifier. For instance, "zipnames.com" is registered to ACME, Inc., which also has registered "acmenames.com", "zipproducts.com", and the like.

FIG. 4g is a diagram illustrating results in response to processing a numerical domain name (NDN) in accordance with the present invention. A web page having additional results is presented when it is determined that a network resource can not be accessed from a fictitious domain name (FDN) such as input numerical domain name 274 (NDN), "216.555.1234". A banner ad 458 corresponding to the input is presented. Hyperlinks 460 can be used for contacting the recipient of the NDN. Links 461 can be used for logging into an ENUM and/or phone bill account to access and make payments to a phone bill or similar telecommunication services account. Furthermore, subscription services such as call-forwarding, voice mail, conference calling, call privacy, redirection parameters such as NAPTR resource records and the like can be managed from such links and any corresponding forms and user element interfaces. Links 462 can be presented to correspond ENUM and NDN identifiers with messaging identifiers such as AIM and ICQ to contact users. A hyperlink (not shown) to determine whether the NDN is available for registration can be presented as well as hyperlinks of similar identifiers 464 that may also be available for registration and/or further navigation (Navigation and registration of NDNs are further discussed in conjunction with FIGS. 15a and 15b).

FDN identifiers 466 such as "zip.names" that may correspond to the input are presented as a means for further searching, navigation, advertising, and/or registration as well a presenting a hyperlink or like element 468 to determine whether the identifier or any similar variation there of is available across other namespaces and naming systems including the ability for the user to use the NDN as a e-mail handle and create an e-mail account for forwarding and the like. In addition, hyperlinks can be presented 470 that pertain to current status and/or aftermarket information such as auctions, bidding, appraisals, watch list/monitoring, and pre-ordering/back-ordering the ENUM/NDN identifier and/or any identifier in any naming system generated from at least a portion of the ENUM/NDN identifier. Furthermore, links 472 can be provided of other identifiers that have the same registrant/owner as the input identifier. For instance, "acmenames.com" is registered to ACME, Inc., which also has registered "216.555.2345", "330.555.1234", and the like.

Figure 4H:
FIG. 4a is a top-level flowchart illustrating the step performed of processing a registration request in response to the determination that a network resource can not be accessed or located or that a domain name is unresolvable in the preferred embodiment of the present invention.
FIG. 4b is a top-level flowchart illustrating the step performed of presenting results as part of a search page and/or error page in response to the determination that a network resource can not be accessed or located or that a domain name is unresolvable in accordance with the present invention.
FIG. 4c is a top-level flowchart illustrating the step performed of contemporaneously processing a search request and registration request in response to the determination that a network resource can not be accessed or located or that a domain name is unresolvable in accordance with the present invention.
FIG. 4f is a diagram illustrating a broader range of results in response to a DNS resolution request error in accordance with the present invention.
FIG. 4g is a diagram illustrating results in response to processing a numerical domain name (NDN) in accordance with the present invention.

FIG. 4h is a diagram illustrating results in response to processing a fictitious domain name (FDN) in accordance with the present invention. A web page having additional results is presented when it is determined that a network resource can not be accessed from the input 274 "name.game". A banner ad 478 corresponding to at least a portion and/or variation of the FDN is presented. A hyperlink 480 to determine whether the identifier is available for registration can be presented as well as hyperlinks of similar identifiers 482 that may also be available for registration and/or further navigation.

Real or valid domain names 484 such as "namegame.com" that may correspond to the input are presented as a means for further searching, navigation, advertising, and/or registration as well a presenting a hyperlink or like element 486 to determine whether the identifier or any similar variation there of is available across other namespaces and naming systems. In addition, hyperlinks can be presented 488 that pertain to current status and/or aftermarket information such as auctions, bidding, appraisals, watch list/monitoring, and backordering the input identifier and/or any identifier in any naming system generated from at least a portion of the input identifier. Furthermore, links 492 can be provided of other identifiers that have the same registrant/owner as the input identifier. For instance, "name.game" is registered to a registrant/entity called ACME, Inc., which also has registered "acmenames.com", "namegameworld.com", and the like.

FIG. 5a illustrates user modifiable configuration settings 174, which may be accessed by the browser for selecting the user preferred URI redirection in response to determining that a network resource can not be accessed (step 242), can not be located (step 250), or that a domain name can not be resolved (step 260). Configuration settings 174 may allow choice of URI redirection to either a least cost registration provider (discussed in conjunction with FIG. 5b), a list of registration providers that can be selected at the time of redirection, the selection of a random registration provider, or the redirection of a predetermined or default registration provider. Offering such selection features can assure that the redirection to registration services are better distributed to those participating registration providers such as accredited domain name registrars using the SRS. Also included, are general features 510 such as enabling metalinks (discussed in conjunction with FIG. 9c), enabling keyword and subdomain generation (discussed in conjunction with FIG. 7a), enabling multiple identifiers across multiple naming systems (discussed in conjunction with FIGS. 9a and 9b), enabling both search and registration features, and enabling fictitious domain name processing.

FIG. 5b illustrates the minimum data structure of a registration provider database 178 including registration provider 524 and price/cost 528. When least cost registration provider is chosen from configuration settings 174, consulting from a table of registration cost information is performed by accessing the registration provider database to select one or more records indicating the lowest price for the purchase of a domain name and/or keyword and the like. Additional table entries may be included such as rates, time and expiration date (e.g., length of purchase time before renewal), quantity, and customized discount methods, etc. Real-time price changes, may be provided to the registration provider database for price updates based upon surveys, bidding, bulk discounts, purchasing more time, offers, rebates, supply and demand, etc. In the case, where more than one record is selected (e.g., many registration providers competing for the same lowest price), the client machine is redirected at random to those qualifying registration providers. In addition, when select registration provider is chosen from configuration settings 174, a list box is generated from the registration provider database 178 at the time of redirection for the user to select a registration provider from.

Figure 5C:
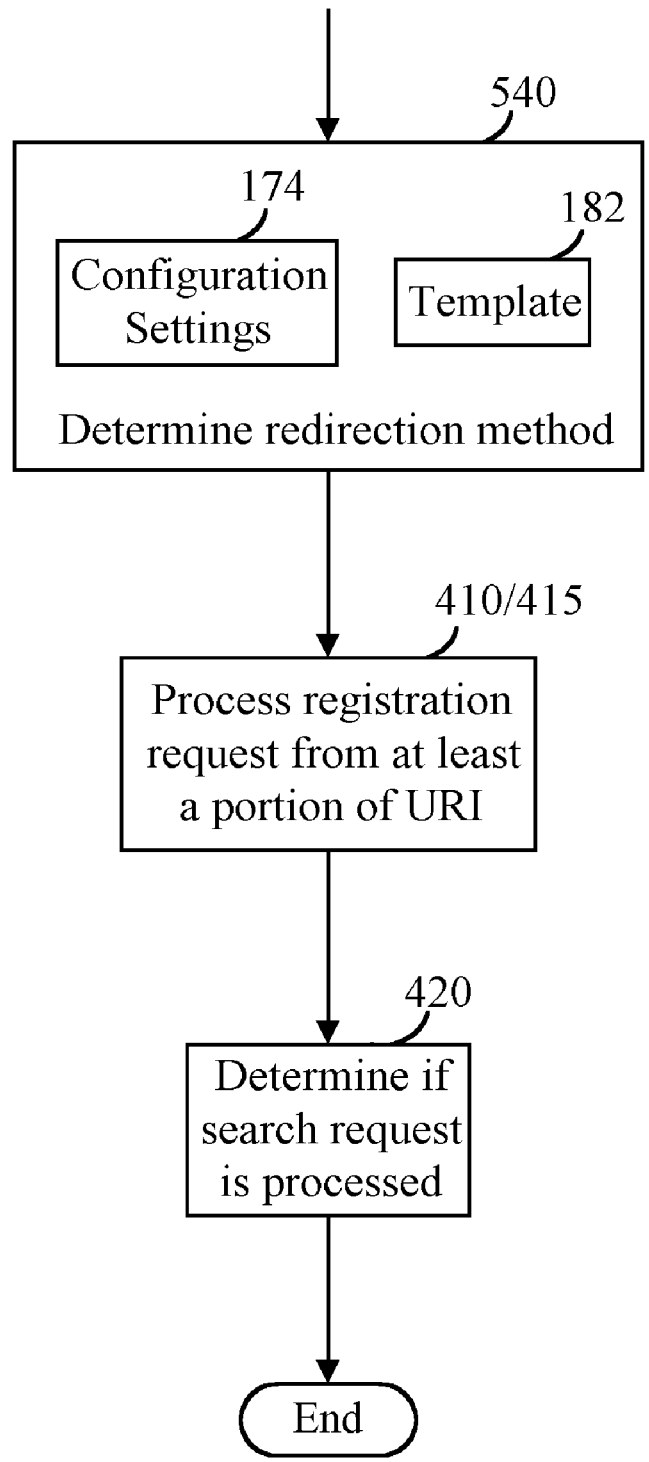
FIG. 5c is a flowchart illustrating the step performed of determining which registration provider may process a registration request in response to the determination that a network resource can not be accessed or located or that a domain name is unresolvable in accordance with the present invention.

FIG. 5c illustrates the additional optional step of determining a redirection method (step 540). Redirection can be determined in step 540 by retrieving configuration settings 174 in response to determining that a network resource can not be accessed (step 242), can not be located (step 250), or that a domain name can not be resolved (step 260), and before a registration request is processed (step 410/step 415). Redirection can also be determined in step 540 by accessing a template 172 from the MSIE autosearch feature either in response to retrieving a redirection method or in response to determining that a network resource can not be accessed (step 242), can not be located (step 250), or that a domain name can not be resolved (step 260). The template is used to generate a valid URI for redirecting the client (e.g., web browser) to a registration provider for processing a registration request (step 410/step 415). Furthermore, after the registration request is processed in step 410/step 415, it is determined in step 420 whether a search request is processed.

Figure 6A:
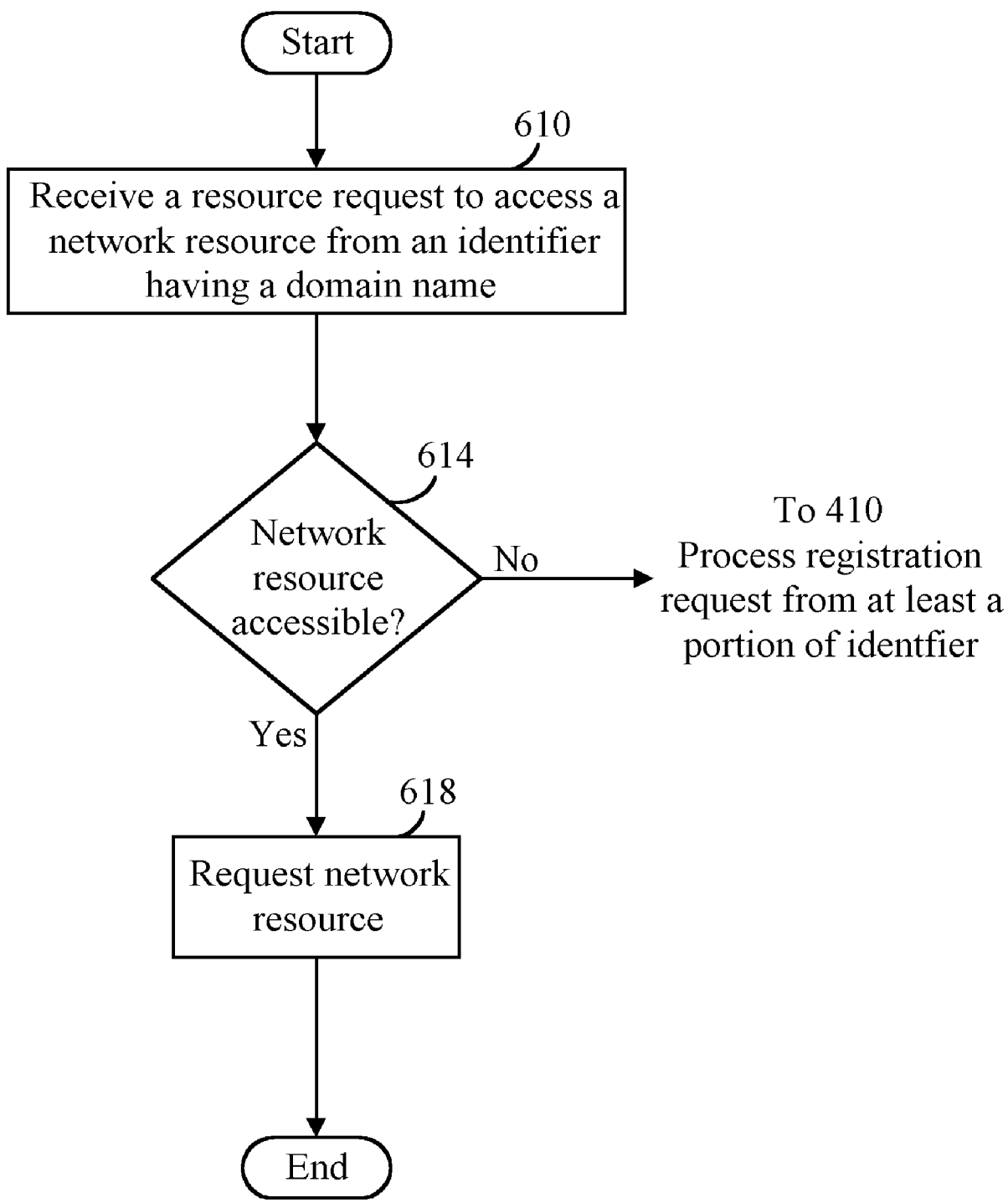
FIG. 6a is a top-level flowchart illustrating the steps for accessing a network resource in accordance with the present invention.
Figure 6B:
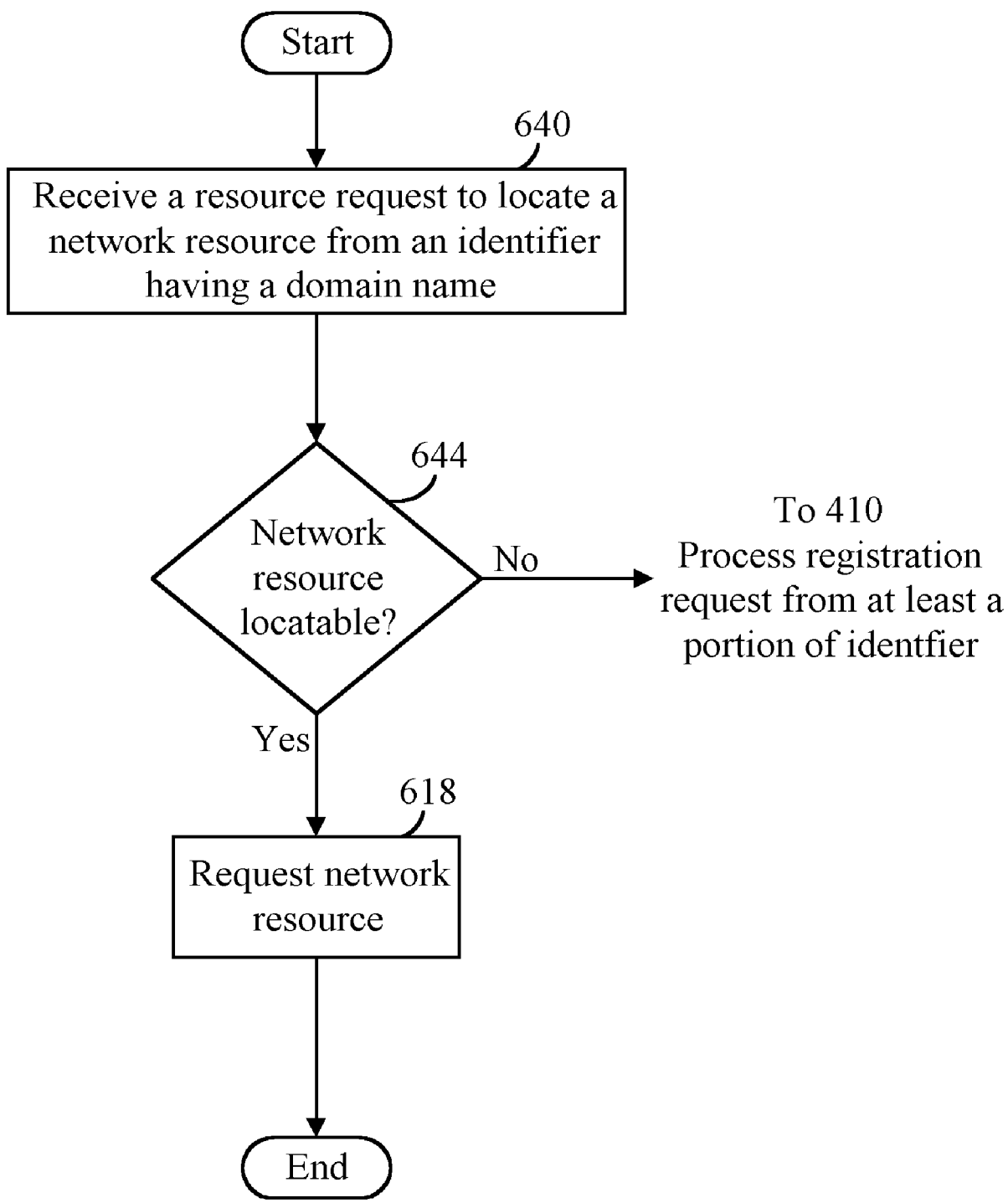
FIG. 6b is a top-level flowchart illustrating the steps for locating a network resource in accordance with the present invention.

FIG. 6a is a top-level flowchart illustrating the steps for accessing a network resource. A resource request to access a network resource from an identifier having a domain name is received in step 610 and determined in step 614 whether the network resource is accessible. The network resource is requested in step 618 when the network resource can be accessed (step 614) otherwise a registration request from at least a portion of identifier may be processed in step 410. FIG. 6b is a top-level flowchart illustrating the steps for locating a network resource. A resource request to locate a network resource from an identifier having a domain name is received in step 640 and determined in step 644 whether the network resource can be located. The network resource is requested in step 618 when the network resource can be located (step 644) otherwise a registration request from at least a portion of identifier may be processed in step 410.

There are many web hosting providers who have neglected to take advantage of the CNAME resource record to create an alias domain name corresponding to a FQDN. For instance, the CNAME record is used to make "example.com" an alias for the FQDN, "www.example.com". When "example.com" is received from an HTTP request and there is no corresponding CNAME record, a network resource may not be accessed and an error message displayed as a result. As explained in U.S. Provisional Application Ser. No. 60/160,125 filed Oct. 18, 1999, by Schneider, entitled "Method and system for integrating resource location, search services, and registration services", now abandoned, a subdomain such as "www" may be prepended to a domain such as "example.com" in response to determining that a network resource can not be accessed from the URI "http://example.com". Rather than providing an error message, further steps are taken to determine whether a network resource can be accessed from "http://www.example.com" instead.

Figure 7A:
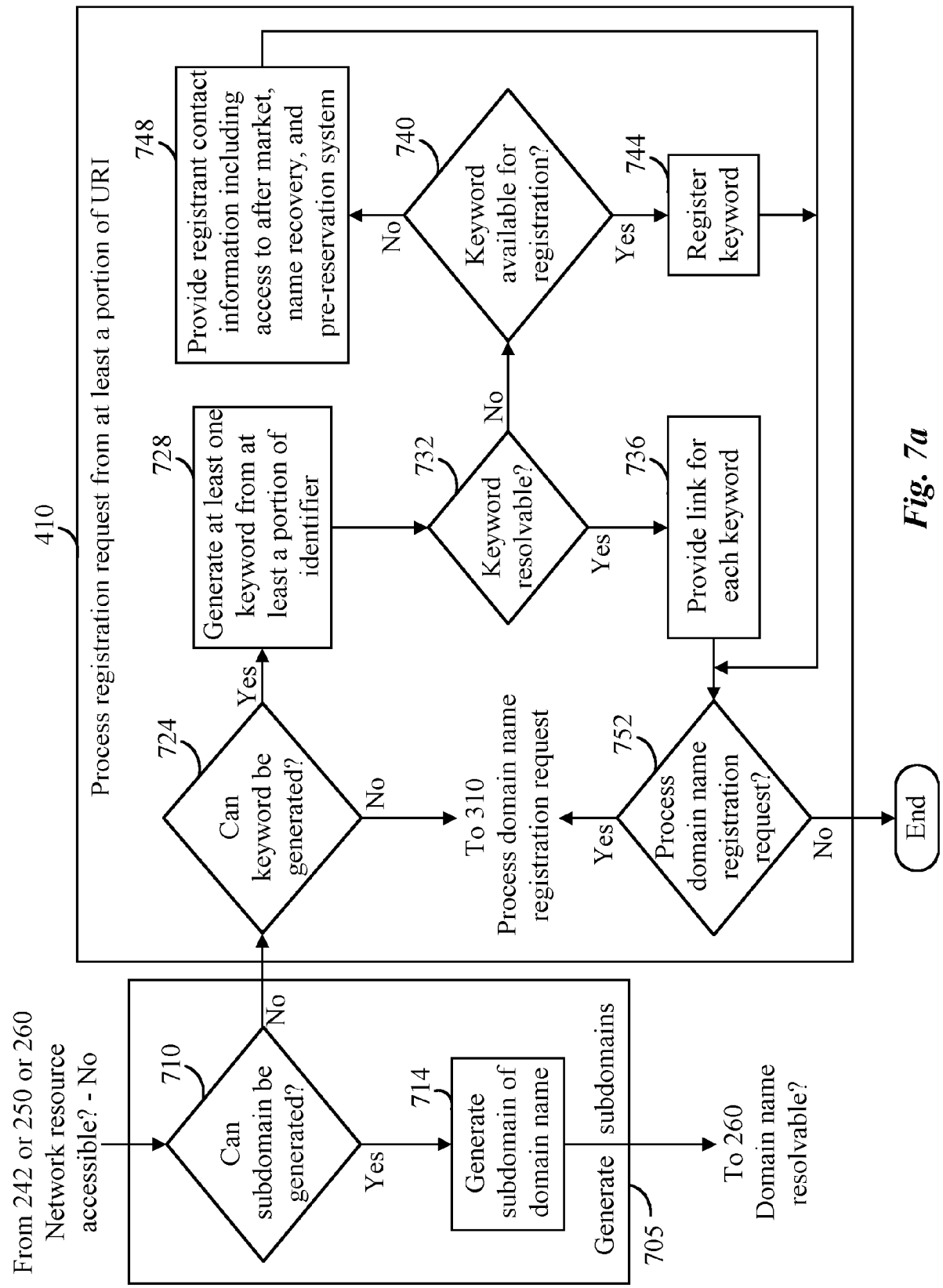
FIG. 7a is a flowchart illustrating the steps performed for further processing a network resource request and/or processing a registration request in accordance with the present invention.

FIG. 7a illustrates the steps performed for further processing a network resource request and/or processing a registration request in accordance with the present invention. When a network resource can not be accessed (step 242), can not be located (step 250), or particularly when a domain name can not be resolved (step 260), it may be further determined in step 705 if subdomains of the domain name are generated. For instance, a name server corresponding to the network resource is found but does not include a corresponding IP address in the domain name zone file for the domain name. However, IP addresses may be found for subdomains of the domain name. For instance, the network resource corresponding to the identifier "http://example.com" can not be accessed nor an IP address found for "example.com" in the example.com zone file, but an IP address can be found instead for "www.example.com" in the example.com zone file.

First, it may be determined in step 710 whether subdomains of the domain name can be generated. If not, then a registration request may be processed in step 410. However, when a can be generated, at least one subdomain of the domain name is generated in step 714 (discussed in more detail in conjunction with FIG. 7b). For each subdomain that is generated, it is then further determined in step 260 whether the generated subdomain of the domain name is resolvable. These steps are repeated until a generated subdomain is resolvable or another subdomain can not be generated.

Further steps are illustrated for processing a registration request (step 410). First it is determined whether at least one keyword can be generated in step 724 from the received domain name or subdomain of a domain name. If so, then at least one keyword is generated in step 728 from at least a portion of identifier. For each generated keyword, it is determined in step 732 whether the keyword is resolvable. A generated hyperlink may then be provided in step 736 for each resolvable keyword. May it be noted that a keyword resolution request may be performed (not shown) by activating the generated hyperlink. In the case, where only one keyword is resolvable, the keyword resolution request may be automatically process instead of displaying a generated hyperlink. For all keywords that are not resolvable, it is determined in step 740 whether such keywords are available for registration. For any keywords that are determined available for registration, a keyword registration form is provided in step 744 by a keyword registration provider. However, for all keywords that are not available for registration, keyword registrant contact information is provided in step 748 including access to keyword after market information, keyword recovery, and a keyword pre-reservation system. When keyword links are provided (step 736), a keyword registration form is provided and processed (step 744), or keyword registrant contact information is provided (step 748), then it may be further determined in step 752 whether to process the domain name as a registration request. If so, or when a keyword can not be generated (step 724), then a domain name registration request is processed in step 310.

Figure 7B:
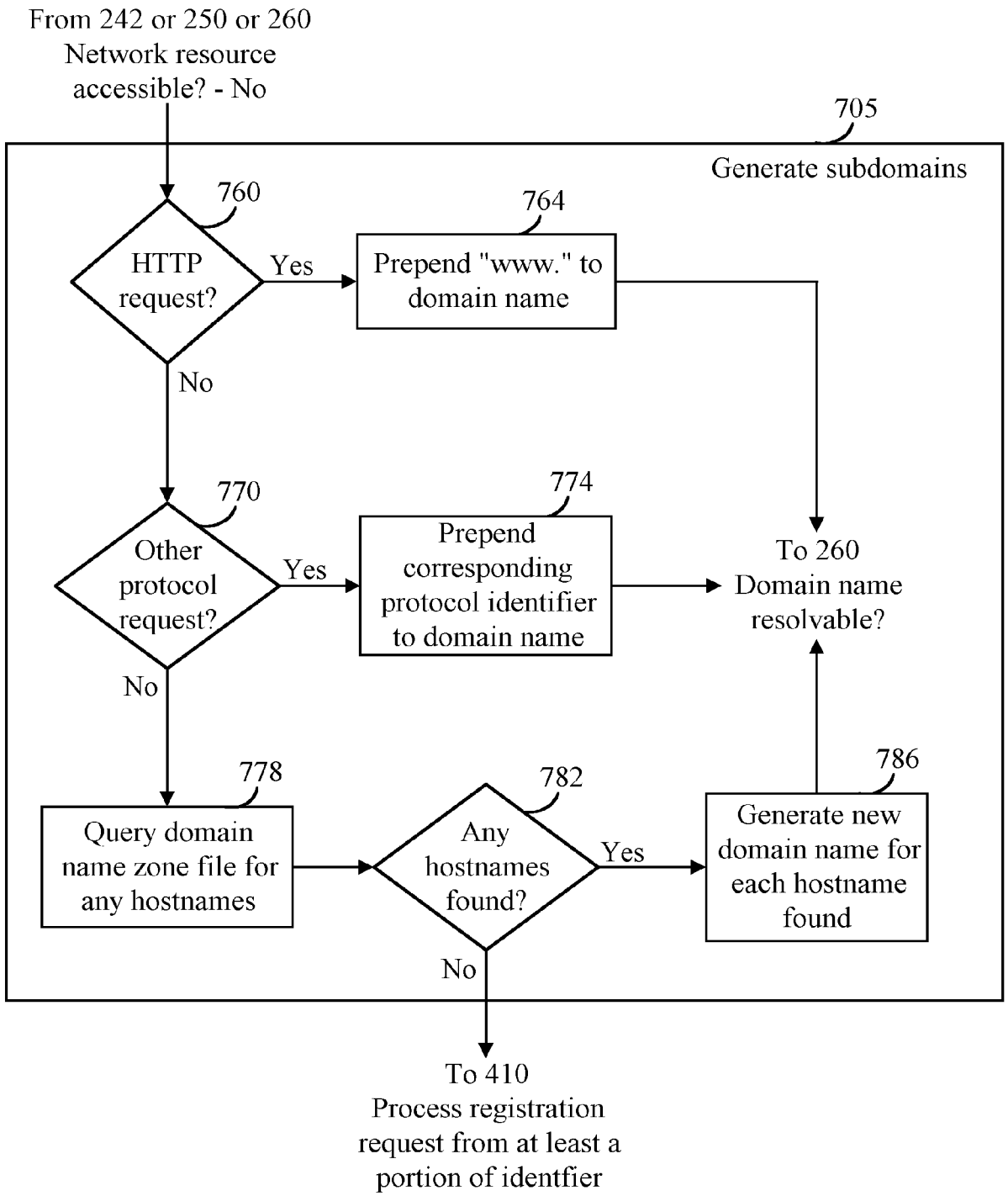
FIG. 7b is a flowchart illustrating the steps performed for generating subdomains of a domain name in accordance with the present invention.

FIG. 7b illustrates the steps performed for generating subdomains of a domain name in accordance with the present invention. First it is determined in step 760 whether the identifier or URI includes the HTTP protocol identifier. If so, then a "www." is prepended in step 764 to the domain name. If not, then it is determined in step 770 what other protocol request had been used. For any other protocol request, a protocol identifier that corresponds to a given hostname is prepended in step 774 to the domain name. For example, when a network resource can not be accessed from a FTP request of the URI "ftp://example.com", a "ftp" hostname is prepended to form a new URI "ftp://ftp.example.com" and then determined whether a network resource can be accessed from the new URI. When no network resource can be found from the above methods, a domain name zone file may be queried in step 778 for any hostnames. If no hostnames have been found in step 782 then a registration request is processed (step 410) otherwise a new domain name may be generated in step 786 for each hostname that is found. After a new domain name has been generated that is a subdomain of the previous domain name, it is then determined whether the new generated domain name is resolvable in step 260.

Figure 8A:
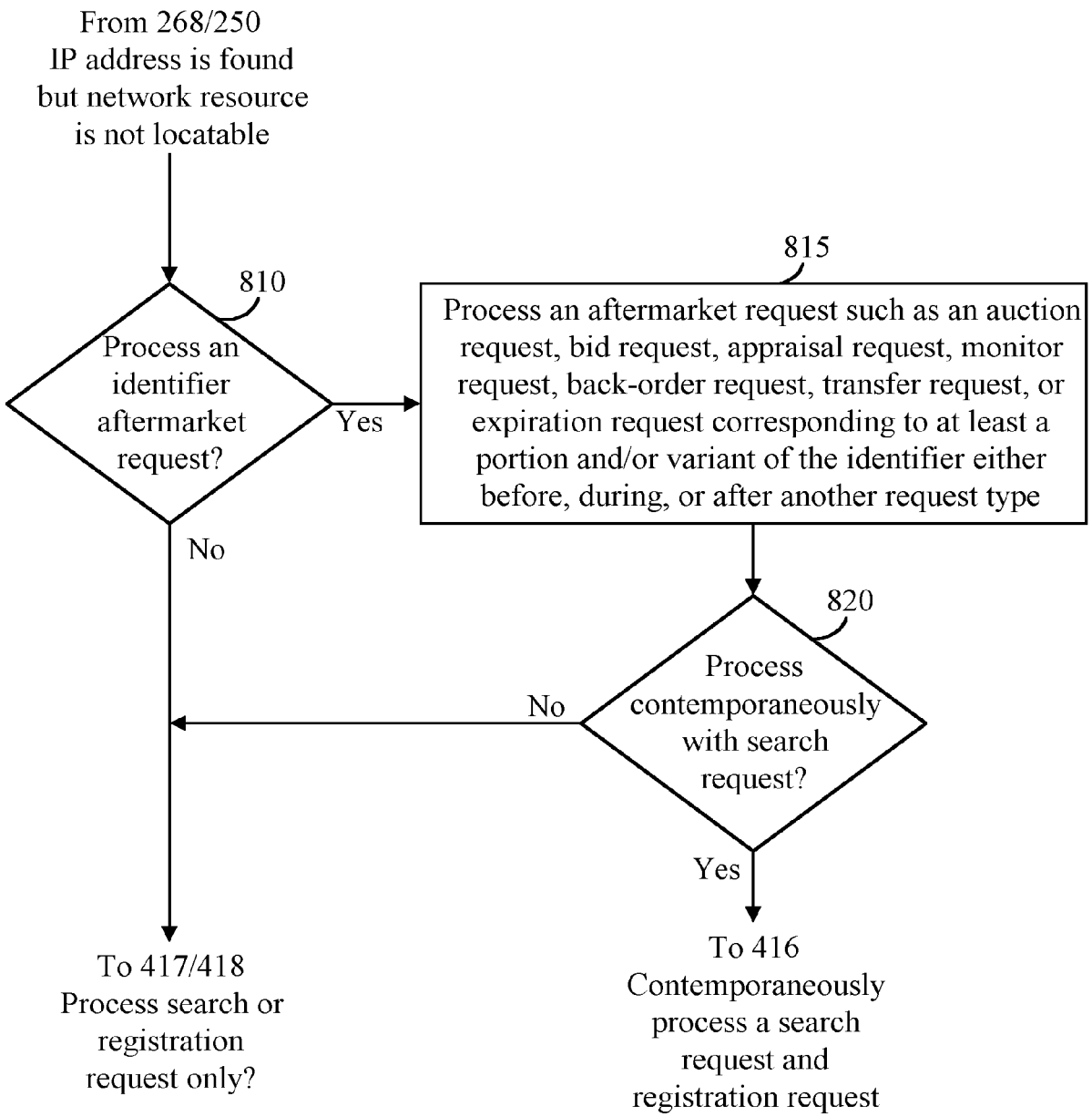
FIG. 8a is a flowchart illustrating the steps performed for determining whether to process a domain name aftermarket request in response to requesting an inaccessible network resource in accordance with the present invention.

FIG. 8a is a flowchart illustrating the steps performed for determining whether to process an identifier aftermarket request in response to requesting an inaccessible network resource in accordance with the present invention. When an IP address is found (step 268) but the network resource is not locatable (step 250), it can be determined in step 810 whether to process an aftermarket request. When it is determined that an aftermarket request is to be processed, at least one aftermarket request such as an auction request, bid request, appraisal request, registrar transfer request, identifier monitoring request, pre-order request, WHOIS request, and/or expiry time request corresponding to at least a portion and/or variant of the identifier can be processed in step 815 either before during or after another request type. It may then be determined in step 820 whether to contemporaneously process such requests with other request types such as a search request and/or registration request. If so, then a search request and/or registration request can be contemporaneously processed (step 416). When it is determined (step 810) that an aftermarket request is not processed or when it is determined (step 820) that an aftermarket request is not contemporaneously processed in conjunction with another request, then it may be determined whether to process the identifier with a search request only (step 417) or registration request only (step 418).

Figure 8B:
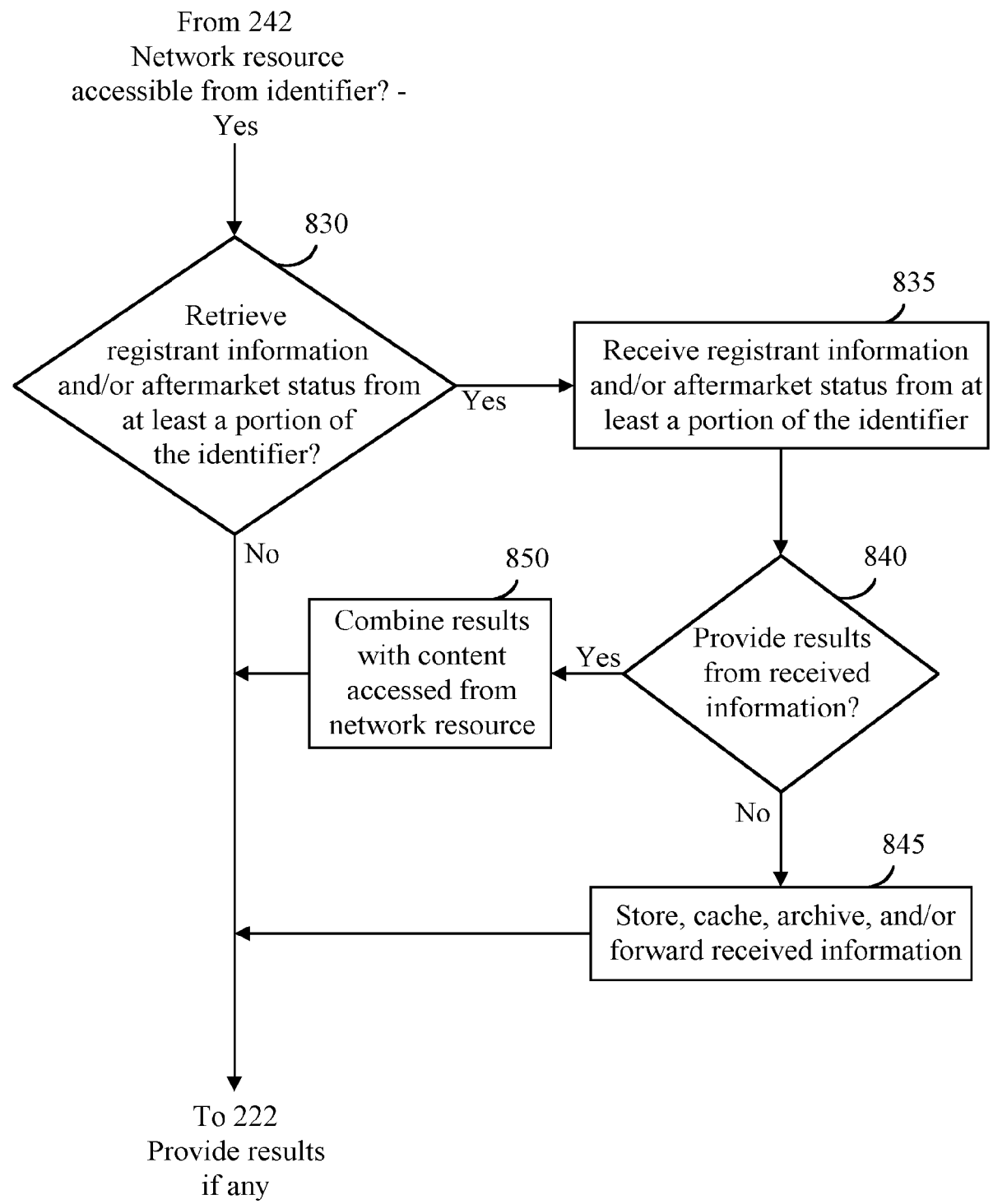
FIG. 8b is a flowchart illustrating the steps performed for determining whether to process a domain name aftermarket request in response to accessing a network resource in accordance with the present invention.

FIG. 8b is a flowchart illustrating the steps performed for determining whether to process an identifier aftermarket request in response to accessing a network resource in accordance with the present invention. When it is determined (step 242) that a network resource is accessible from an identifier, it can be determined in step 830 whether registrant information and/or aftermarket status from at least a portion of the identifier is to be retrieved. If so, then registrant information and/or aftermarket information including identifier status can be retrieved/received in step 835 from at least a portion and/or variant of the identifier. It can then be determined in step 840 whether results are provided from the received information. When results are not provided, such received information can be stored, cached, archived, and/or forwarded in step 845. When results are provided (step 840), then such results can be combined in step 850 with content accessed from the network resource.

As explained in U.S. patent application Ser. No. 09/650,827 filed Aug. 30, 2000, now U.S. Pat. No. 6,901,436 by Schneider, the availability of an identifier such as a domain name may be determined across other naming systems such as a keyword registry 168 (or vice-versa) operated by a resolution service provider (e.g., RealNames or Netword) or operated by the search services of a portal web site or the like (e.g., Alta Vista, Lycos, Netscape, AOL, etc.) or by any other entity that registers keywords for the purpose of directory placement or advertising. For instance, the search for the availability of a RealNames Internet Keyword called "examtrant to choose from. Keywords or descriptors including identifiers representative of competitive interests may be provided 940 by the registrant/subscriber to be put in a watch list 187 to inform the subscriber of any available identifiers that may become available in the future. Such descriptors may also include any geographic, psychographic, and/or demographic information or those words that may be used to inform the subscriber of identifiers of interest to competitors. In addition, such descriptors or keywords may be suggested through the registration form 177 by accessing a link 945 which generates similar identifiers to help the subscriber select a desirable watch list/subscriber profile 187. Such registrant/subscriber information may be submitted to a registration provider of choice at any time.

In another example, when the domain name "example.com" is available for registration, the additional selection of available TLDA names (e.g., "example.news", "example.sitemap", "example.411", etc.) may be concurrently displayed for an entity to register a final selection from the list of valid and/or fictitious domain names. Other identifiers such as keywords, phone numbers, etc. may also be concurrently displayed as part of a final selection. Examples of concurrent registration may further include the search of a domain name based on the existing username or handle of an e-mail address (e.g., "myemailaddress.com" is suggested in response to the existing identifier "myemailaddress@example.com").

Figure 9A:
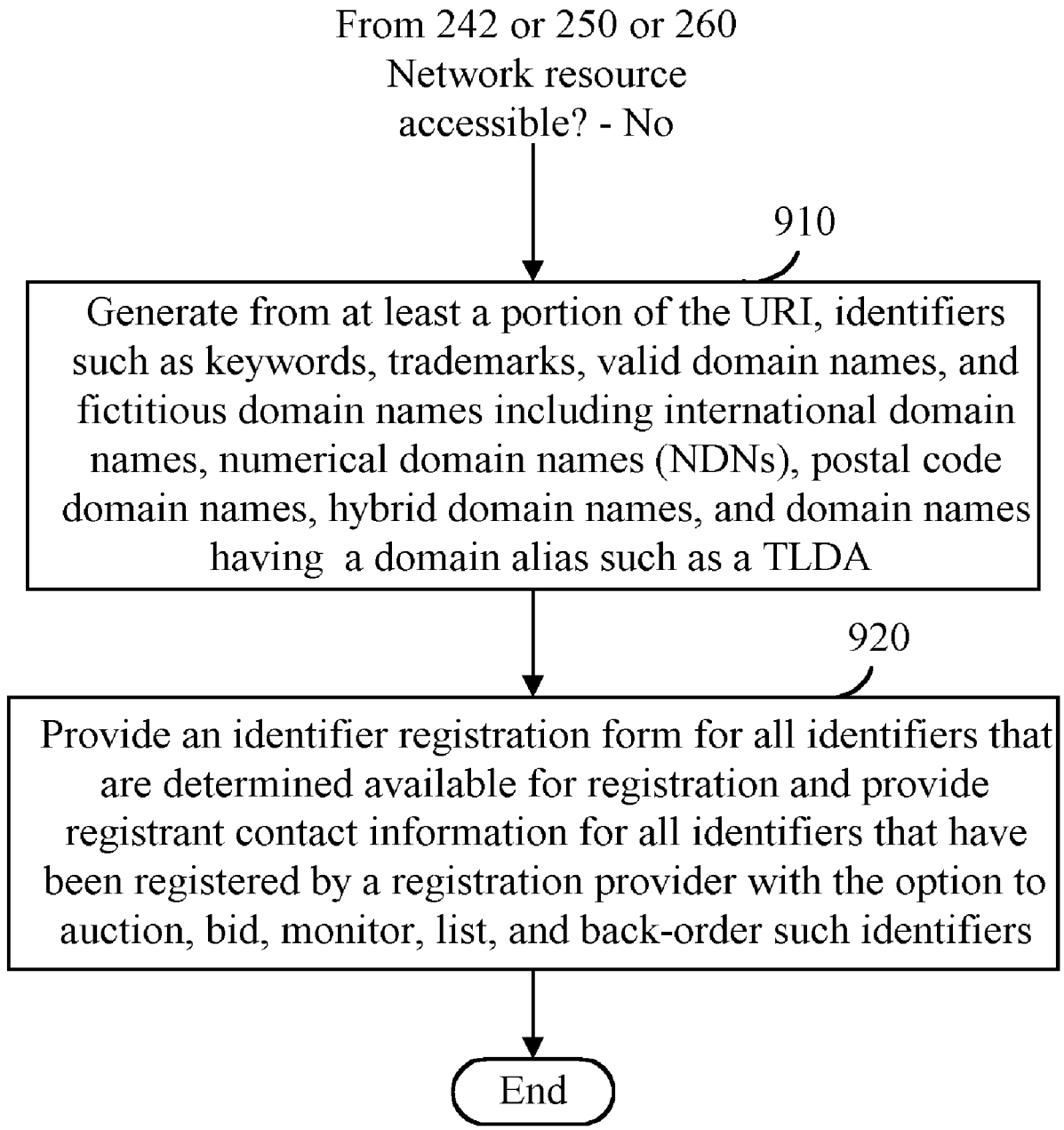
FIG. 9a is a flowchart illustrating the steps performed for integrating the contemporaneous registration of domain names and other identifiers such as keywords in accordance with the present invention.

FIG. 9a illustrates the steps performed for generating and contemporaneously determining the availability of identifiers across many naming systems. Whenever a network resource can not be accessed (step 242), can not be located (step 250), or when a domain name can not be resolved (step 260) from a URI, in response to performing a navigation request such as a resource identification and/or location request, identifiers such as keywords, trademarks, valid domain names, and fictitious domain names (e.g., international domain names, numerical domain names [216.555.2345], postal code domain names [example.44106], hybrid domain names, and domain names having a domain alias such as a TLDA [name.game]) may also be generated in step 910 from at least a portion of the URI. An identifier registration form 177 of all identifiers that are determined available for registration with access to registrant contact information of all identifiers that have been registered by a registration provider may then be provided in step 920 with the option to auction, bid, monitor, list, and back-order such identifiers.

Also, as discussed the present invention is by no means limited to the registration of identifiers such as domain names (e.g., valid domain names, fictitious domain names including TLDA names, and multilingual domain names), phone numbers (e.g., cell, fax, telecopier, pager, voice, data, etc.), and keywords (e.g., search term, RealName, Netword, Internet keyword, AOL keyword, etc.), but can include the registration of any registerable identifier across any one or more naming systems and/or namespaces.

Other registerable naming systems having one or more registerable namespaces may include identifiers such as but not limited to Publisher Item Identifier (PII), Digital Object Identifier (DOI), Inter Deposit Digital Number (IDDN), International Standard Book Number (ISBN), International Standard Technical Report Number (ISRN), International Standard Serial Number (ISSN), Serial Item and Contribution Identifier (SICI), Book Item and Component Identifier (BICI), European Article Number (EAN), Universal Product Code (UPC), Standard Address Number (SAN), International Standard Audiovisual Number (ISAN), International Standard Work Code (ISWC), International Standard Music Number (ISMN), International Standard Recording Code (ISRC), Intellectual Property Identification (IPI), Uniform File Identifier (UFI), Uniform Resource Identifier (URI), Persistent Uniform Resource Locator (PURL), Universally Unique Identifier (UUID), Globally Unique Identifier (GUID), Namespace Identifier (NID), Bank Identification Number (BIN), Personal Identification Number (PIN), Mod 10 Number, credit card number, Electronic Serial Number (ESN), Mobile Identification Number (MIN), Automatic Number Identification (ANI), Social Security Number (SSN), Employer Identification Number (EIN), Taxpayer Identification Number (TIN), Vehicle Identification Number (VIN), World manufacturer identifier (WMI), Manufacturer Identification Number (MIN), Market Identifier Code (MIC), Standard Industrial Classification (SIC), Standard Occupational Classification (SOC), Stock Keeping Unit number (SKU), International Business Entity Identifier (IBEI), Institution Identification Code (IIC), National Provider Identifier (NPI), Dunn and Bradstreet Number (DUNS), SEC file number, patent number, trademark number, serial number, charter number, policy number, certification number, document identifier, reference number, invoice number, transaction identifier, validation code, account number, merchant code, reseller code, affiliate code, authorization code, network identifier, user identifier, PGP key, digital certificate, driver license number, license plate number, trademark, servicemark, tradename, fictitious name, company name, DBA, AKA, stock symbol, station identifier, broadcast station call letters, ham radio call letters, broadcast frequency number, street name, street address, ZIP code, IP address, host, e-mail address, ICQ number, nickname, screen name, username, alias, handle, document title, book title, song title, movie title, phrase, slogan, machine readable code, glyph, image, icon, animation, sequence of musical notes, date, time, name, abbreviation, mnemonic, moniker, label, alphanumeric, string, character, symbol, emoticon, token, integer, and number, etc.

Some naming systems may include a domain name system, fictitious domain name system, multilingual naming system, keyword system, telephone naming and numbering system, user naming system, address system, date/time system, language system, Dewey decimal system, catalog naming system, document system, resource naming system, image naming system, geographic naming system, identification naming system, and/or any other naming system that supports any listed identifier. Other examples of naming systems may include languages. Name generating programs may further include language translation as a means for selecting similar identifiers. The mapping of delimiters across all naming systems (not shown) may also be used as a means for similar identifier selection. Each naming system may be the primary registrar with respect to registering on behalf of registrars of other naming systems for concurrent registration. An open architecture system is implemented such that existing or future-naming systems may be easily integrated into alternate embodiments of the present invention. Each integrated system remains highly configurable to the specific context of the application.

Furthermore, each naming system may readily be integrated into a registration interface having a universal identifier registration form 177 assuring a robust system for registrants to easily register multiple identifiers from a single form 177. In effect, the registration form 177 may include a plurality of registration user interface elements for selecting from one of a plurality of identifiers and a plurality of naming systems. In addition, naming system providers may supply metadata to authorize their namespace/naming system to couple with the registration form 177 to enable users to register available identifiers through their naming system.

Identifier generation may be provided from the identifier generator 175, which is configured to select and generate identifiers from a number of criteria by consulting from one of a word generation method 180, category of interest 181, dictionary 181, thesaurus 181, prefix 182, suffix 182, word root 182, word stem 182, set of heuristic naming rules 183, namespace syntax 183, identifier equivalents 184, language translation 185, phonetic spelling 186, phonemes 186, identifier watch list 187, list of desirable descriptors 187, personal identifier portfolio 187, competitor identifier portfolio 187, mnemonic method 188, abbreviation 188, namespace mapping 189, identifier mapping 190, delimiter mapping 191, rhyming method 192, name-to-number conversion 193, number-to-name conversion 193, and identifier history 194.

FIG. 9b illustrates one aspect of a registration form 177. A registrant may access a link 930 which may provide a registrant an information window to input a previous registrant handle or current contact information. A list of identifiers that are currently available across many naming systems/namespaces may also be provided 935 (e.g., via identifier generator 175 or templates 172) for the registrant to choose from. Keywords or descriptors including identifiers representative of competitive interests may be provided 940 by the registrant/subscriber to be put in a watch list 187 to inform the subscriber of any available identifiers that may become available in the future. Such descriptors may also include any geographic, psychographic, and/or demographic information or those words that may be used to inform the subscriber of identifiers of interest to competitors. In addition, such descriptors or keywords may be suggested through the registration form 177 by accessing a link 945 which generates similar identifiers to help the subscriber select a desirable watch list/subscriber profile 187. Such registrant/subscriber information may be submitted to a registration provider of choice at any time.

As explained in U.S. patent application Ser. No. 09/598,134 filed Jun. 21, 2000, now U.S. Pat. No. 6,895,430 by Schneider, registrant contact information such as the WHOIS record of a domain name registrant can be modified to provide additional results including metalinks. For instance, when it is determined that a domain name is not available for registration, a record from the WHOIS database may be displayed including metalinks for accessing <META> tag informanames", a system can be integrated to process both registration requests and resolution requests of valid and fictitious domain names. Furthermore, as explained in U.S. patent application Ser. No. 09/525,350 filed Mar. 15, 2000, now U.S. Pat. No. 6,338,082 by Schneider, entitled "Method, product, and apparatus for requesting a network resource" and U.S. patent application Ser. No. 09/532,500 filed Mar. 21, 2000, by Schneider, still pending, entitled "Fictitious domain name method, product, and apparatus", an autosearch can be used to process registration requests or resolution requests of valid domain names and fictitious domain names.

FIG. 9c illustrates a methodology for extending functionality of WHOIS results by modifying the page source of a typical WHOIS request. For instance, the domain name "example.com" may be converted into a hyperlink reference and/or metalink 960 so that a user may readily visit the homepage and/or sitemap of "example.com". Also illustrated are hyperlinks 965 for accessing geographic information (e.g. maps) that corresponds to the domain name, and hyperlinks for dialing the telephone 970 so that the source or registrant of the domain name may be readily contacted if so desired. Furthermore, a hyperlink reference may be added to indicate that the domain name is available for sale 975 enabling access to an auction site, listing service, domain name broker, or the like to make a bid or offer on the domain name. In addition, one or more links 980 may be provided to enable access to other services such as bidding, locking, protecting, back-ordering and monitoring a domain name in the event of any future change in status of the current domain name.

Those skilled in the art may make and use a computer program product separate from all others. In addition, the program may be integrated as part of an operating system or may be a plug-in for a web browser 112. Such a program may be downloaded and installed for integration into the command line of a device or location field 140 of a browser program 112. Program installation may be activated in response to accessing a web site or any resource corresponding to a URI. Modifying the source code of the browser program 112 itself may be more desirable, in effect, enabling tens of millions of users to take advantage of resource identification/location services and registration services.

In the case of MSIE, modifications can be made to the script on the server "auto.search.msn.com" that generates the "response.asp" web page and all identifiers of network resources than can not be accessed or located, or any unresolved domain names can be redirected to a registration provider rather than processed as a search request. An extra template 172 can be created and used in the registry of the MSIE autosearch feature. The template 172 can further include the selection of which server to access for transparently performing a WHOIS, EPP, or RRP request and/or access the server of a desired registration service of a registration provider such as an accredited registrar to perform such a registration request.

By using an extra template 172, the browser program does not have to be modified, thereby eliminating distribution costs for a browser or plug-in version update. For instance, when input having only "." delimiters such as a domain name (e.g., thisnameisprobablyavailable.com) is determined unresolvable, an extra name/value pair is passed generating the following URI:

"http://auto.search.msn.com/response.asp?MT=thisname isprobablyavailable.com&srch=3&prov=&utf8&reg= licensedregistrar.com"

A specific template is accessed when the name/value pair "reg=licensedregistrar.com" is parsed and passed as a variable. The accessed network resource from the URI performs a WHOIS, RRP, EPP or like request transparent to the user to determine domain name availability. When the domain name is determined available, the domain name is inserted into the accessed template to generate the URI:

"http://www.licensedregistrar.com/cgi-bin/purchase/regi ster.cgi?name=thisnameisprobablyavailable.com&refer=m sie"

The name/value pair "refer=msie" is parsed and passed as a variable to determine the source of the URI redirection for the purposes of billing, tracking, and accounting. For instance, price discounts can be applied to those registrants who purchase domain names from a registration provider as a result of redirection, instead of purchasing directly from the same registrar at the regular price. In effect, such a price discount offers incentive for potential registrants to learn about this new method of registering domain names. Other name/value pairs can also be passed to determine whether the output is redirected to registration services, resolution services, search services, or like services, either alone or in any combination thereof.

As explained in U.S. Provisional Application Ser. No. 60/157,075 filed Oct. 1, 1999, by Schneider, entitled "Method and apparatus for integrating resource location and registration services of valid and fictitious domain names", a system can be integrated to process both registration requests and resolution requests of valid and fictitious domain names. Furthermore, as explained in U.S. patent application Ser. No. 09/525,350 filed Mar. 15, 2000, by Schneider, entitled "Method, product, and apparatus for requesting a network resource" and U.S. patent application Ser. No. 09/532,500 filed Mar. 21, 2000, by Schneider, entitled "Fictitious domain name method, product, and apparatus", an autosearch can be used to process registration requests or resolution requests of valid domain names and fictitious domain names.

Domain names offered by traditional domain name registries have been restricted to the ASCII character set: A to Z, a to z, 0 to 9, and hyphen. In addition, the maximum character length of a SLD is 63 characters. Any domain name that is not valid (e.g., SLD is greater than 63 characters, characters other than that of A to Z, a to z, 0 to 9, and hyphen, and/or non-ASCII character sets used to represent multilingual domain names) or any domain name having a domain alias such as a TLDA is called a fictitious domain name (FDN). Valid International Domain Names (VIDNs), Fictitious International Domain Names (FIDNs), Zip Code Domain Names, Numeric Domain Names (NDNs) property either before, during or in response to an event such as a reference request, search request, navigation request, and the like. The extracted domain name can be passed as a parameter for retrieving contact and/or status information from a corresponding registry such as an aftermarket registry 166, auction registry 164, back-order registry 160, or any domain name status database 199, or identifier status cache 197.

Figure 10A:
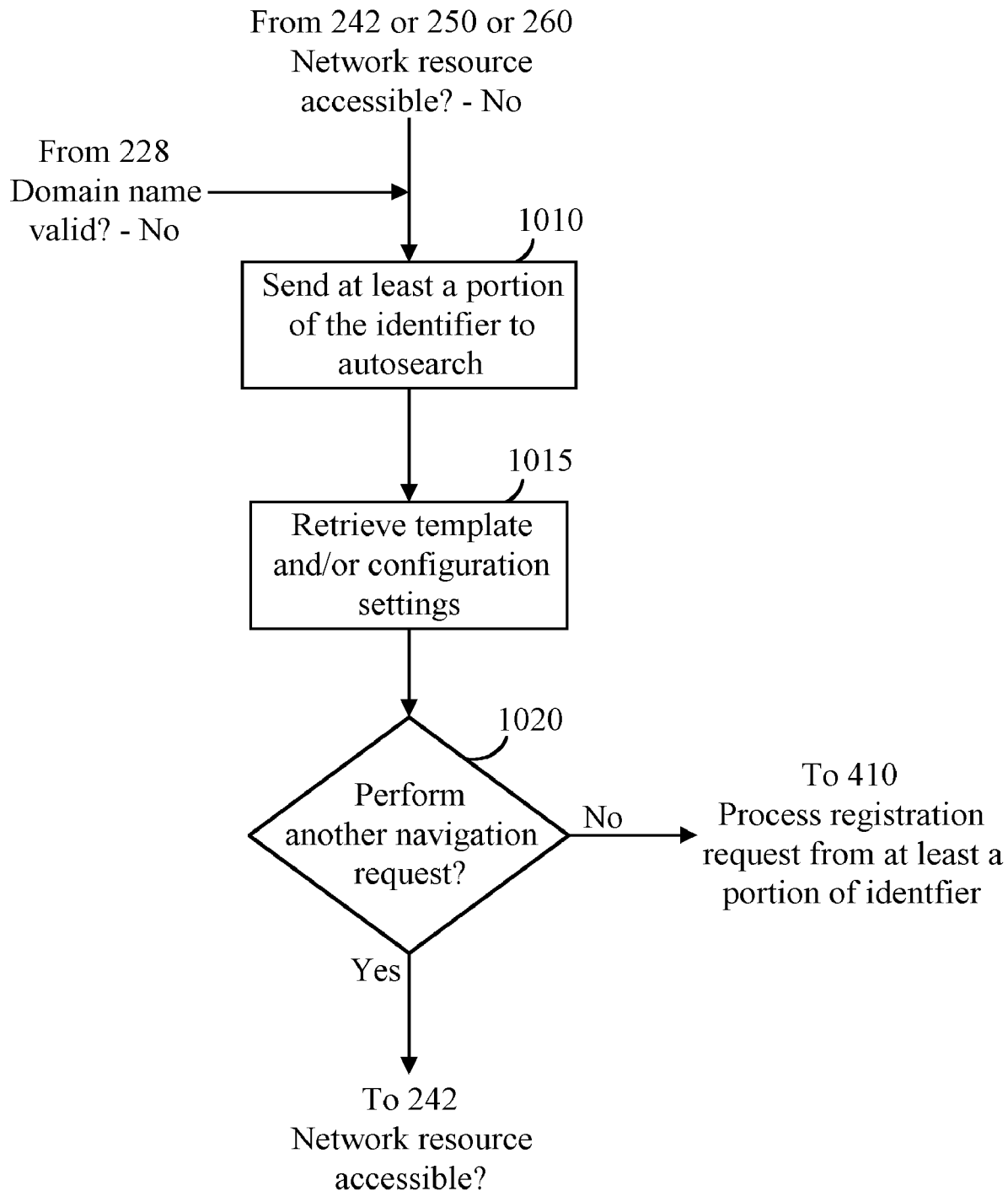
FIG. 10a is a flowchart illustrating the steps performed for processing a navigation request with an autosearch in accordance with the present invention.

FIG. 10a illustrates the steps performed for processing a navigation request with an autosearch. When a domain name is determined not valid (step 228) or when a network resource can not be accessed (step 242), can not be located (step 250), or particularly when a domain name can not be resolved (step 260), the domain name or at least a portion of an identifier can be passed or sent in step 1010 to an autosearch for further processing. A template 172 and/or configuration settings 174 may then be retrieved in step 1015 to determine how to further process the autosearch (e.g., determine how to construct another identifier). For instance, an identifier generation and registration form template 172 may be retrieved for the purpose of generating several identifiers across several naming systems. A registration form may be provided in response to determining the availability of registration for all such generated identifiers.

If it is determined in step 1020 that another navigation request is to be performed then a resolvable URI is generated (not shown) and it may be further determined whether the newly generated URI is accessible (step 242). URI generation from the domain name passed to the autosearch may be accomplished by finding subdomains (as discussed in conjunction with FIG. 7a) or by generating a valid domain name from a fictitious domain name as discussed in co-pending applications noted above. When it is determined in step 1020 that another navigation request is not to be performed and a resolvable URI is not generated then the autosearch may redirect at least a portion of the identifier (step 410) to be processed as a registration request.

Figure 10B:
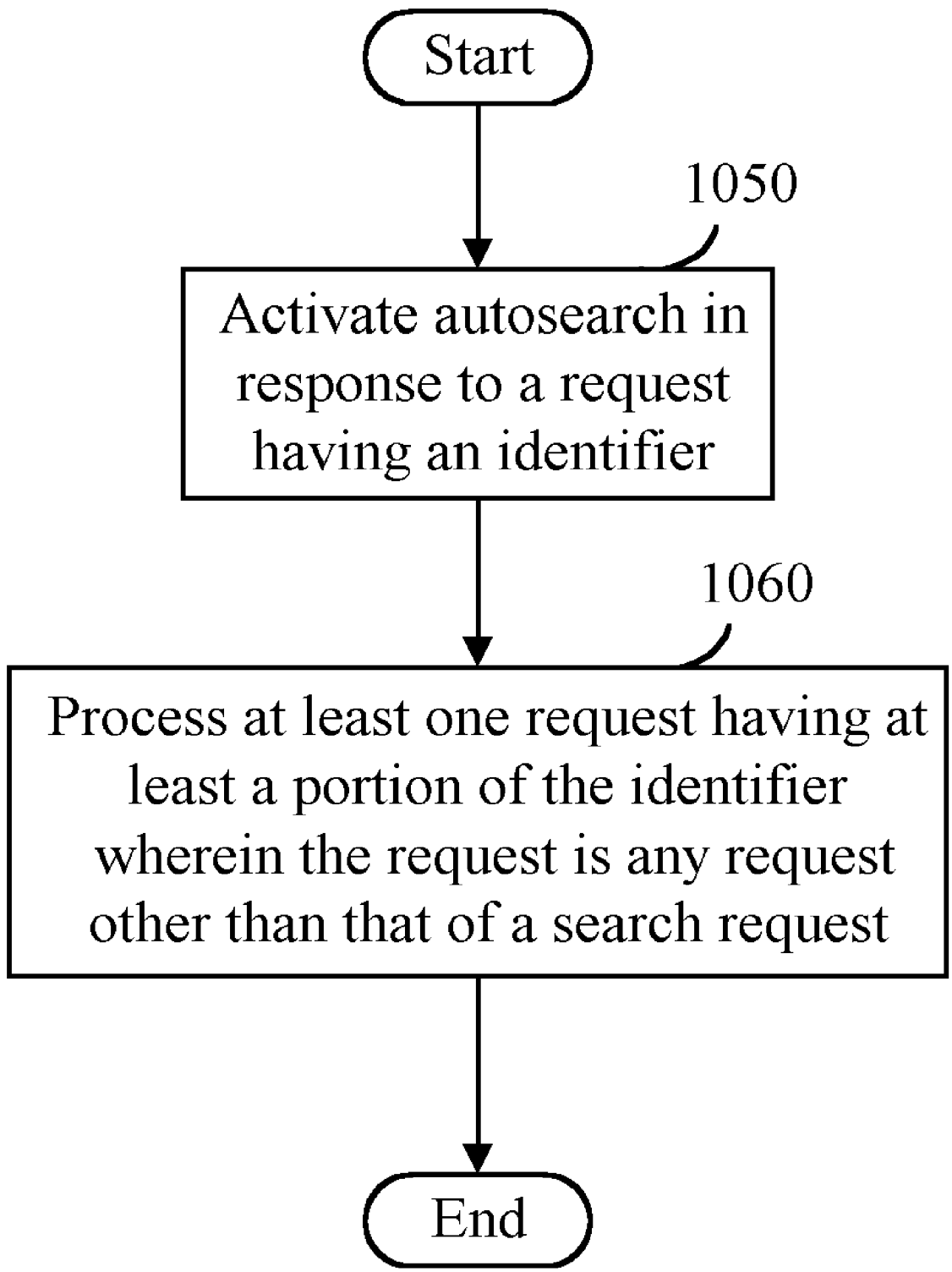
FIG. 10b is a flowchart illustrating the steps performed for processing any non-search request with an autosearch in accordance with the present invention.

FIG. 10b illustrates a top-level flowchart of the steps performed for processing any request with an autosearch. To date, the autosearch feature has been used to further process search requests only and has not been used in conjunction with processing any other request type. When an autosearch is activated in step 1050 in response to a request having an identifier, at least one request is constructed and processed in step 1060 having at least a portion of the identifier wherein the request is any request other than that of a search request. Some request types may include a command request, resolution request, redirection request, identifier registration request, commerce request, subscription request, navigation request, dialing request, messaging request, conferencing request, vendor request, service request, login request, status request, authorization request, reference request, etc.

Because of the extended functionality provided in one aspect of the present invention, a user can now determine domain name availability directly from the command line of a network access device 110 or location field 140 of a browser program 112. Though domain name availability can also be determined by processing a WHOIS, EPP, or RRP request before the step of determining domain name resolvability, this is not a preferred method because it requires the utilization of unnecessary bandwidth. Standard network utility packages such as PING, NSLOOKUP, DIG, HOST to name a few can also be used to determine domain name resolvability. These tools can be modified to provide other means for host/address translation.

Because DNS lookups and WHOIS, EPP, or RRP requests are so heavily relied on, methods for minimizing network bandwidth of these services are considered preferable. For instance, the resolver library and/or client browser 112 may be configured to first access a zone file or similar file cache 176 to increase host/address translation lookup performance. A domain name that can not be translated into an IP address implies that a domain name is available and therefore the step of performing a WHOIS, EPP, or RRP request does not have to be relied on. However, due to DNS server time-outs or the propagation of DNS record updates, the results of retrieving if at all, a corresponding translated IP address may be affected. Therefore it is desired to rely on the step of performing a WHOIS, EPP, or RRP request for the purpose of verification in real-time that a domain name determined unresolvable is truly available.

Modifications for URI redirection to registration services such as an accredited registrar may be made to either the resolver library, client browser, or any server or name-server that processes an identifier resolution request (e.g., Registry name server, RealNames or Netword resolver/server). Also, the determination of domain name availability and/or the processing of a registration request may occur either automatically or manually in response to the determination of an unresolvable domain name. There may further be included any number of other steps that may be performed between the step of determining that a domain name is unresolvable and determining that the unresolvable domain name may be available for registration. Furthermore, redirection to registration services is not limited to the redirection of only registrars, but further includes redirection to registries, resellers, affiliates, and the like.

The invention does not rely upon the browser's location field 140. For instance, the location field 140 of the web browser can be suppressed and a web page based location field 140 can be displayed. A CGI script is then used to process the input in step 210 and redirect the browser 112 to the appropriate registrar. In lieu of either exclusive, user selected, least cost, or random registrar redirection of services, the completed NIC registration form can be sent to such a registrar and processed in a way that is transparent to the user and does not interfere with the current user's on-line navigational session.

The same teachings can be applied to those skilled in the art by providing a text box object as input that can be located anywhere and on any web page including a text box that is embedded or part of an on-line advertisement. The text box object can be used in a stand-alone application and stored on magnetic and/or optical media that is either non-volatile, writable, removable, or portable. The text box object can be incorporated as an applet or servlet and embedded in other applications. The text box can be integrated in the task bar or any part of the GUI's OS, or the OS bypassed and overlaid as a graphic on a display device based on modifications to a video card and/or it's associated firmware or software drivers. The command line text box can be further overlaid as an interactive object in other embodiments such as Internet television, cable television, digital television, or interactive television through an Internet appliance or set top box.

To date, wildcard redirection in TLD zone files has only been used for the purpose of enabling a TLD registry to also become the registrar by offering domain name registration services. Because of registrar competition in the gTLDs, wildcard redirection in a gTLD zone file has never been considered. In fact, wildcard redirection has never been used in ccTLD, alternative root TLD, and any other domain name zone files, for the purpose of creating competition between registration providers.

Figure 11A:
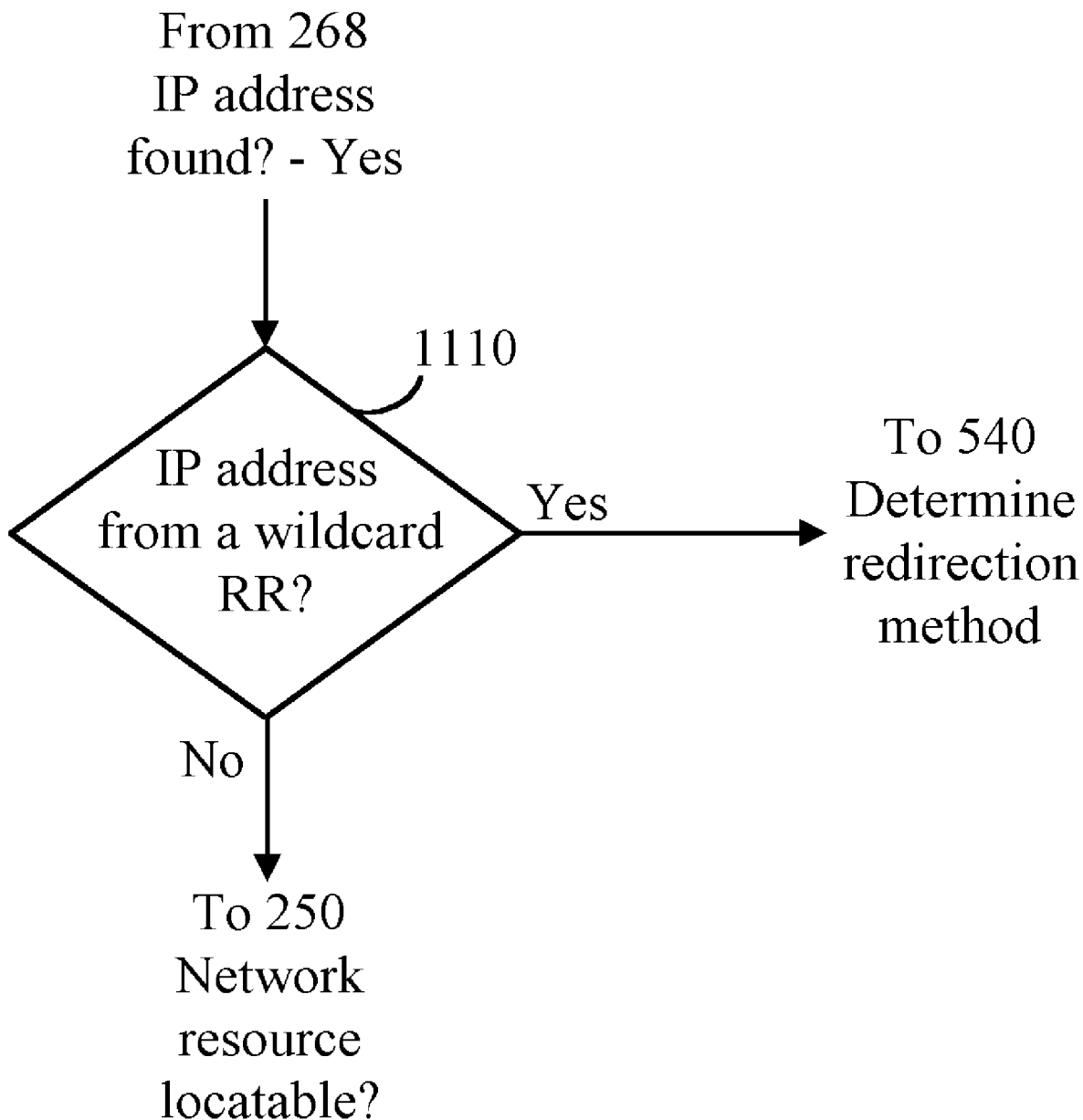
FIG. 11a is a flowchart illustrating the steps performed for determining a redirection method in response to detecting a wildcard resource record in accordance with the present invention.

FIG. 11a illustrates the steps performed for determining a redirection method in response to detecting a wildcard resource record in accordance with the present invention. When an IP address is found (step 268), it is determined in step 1110 whether the IP address was retrieved from a wildcard resource record. If not, it is determined in step 250 whether a network resource can be located from the IP address. When an IP address is retrieved from a wildcard resource record, the option of determining a redirection method (step 540) may be provided enabling a user to select a registration provider from a plurality of registration providers.

FIG. 11b presents an exemplary file in accordance with the present invention of a zone file having a wildcard resource record. A portion of the .NET (TLD) zone file 1115 includes the addition of a wildcard RR 1120 for the purpose of redirecting domain names that would otherwise be considered unresolvable to a market driven registration provider system in this case called "registrarportal.com". When the above TLD zone file is queried to resolve "isthisnameavailable.net", it is determined that there is no SLD called "isthisnameavailable". The wildcard RR is detected and passes the query value of "isthisnameavailable.net" to a server labeled "registrarportal.com". In effect, the wildcard RR treats the query as resolvable and redirects "isthisnameavailable.net" to "registrarportal.com" for further processing.

Figure 12:
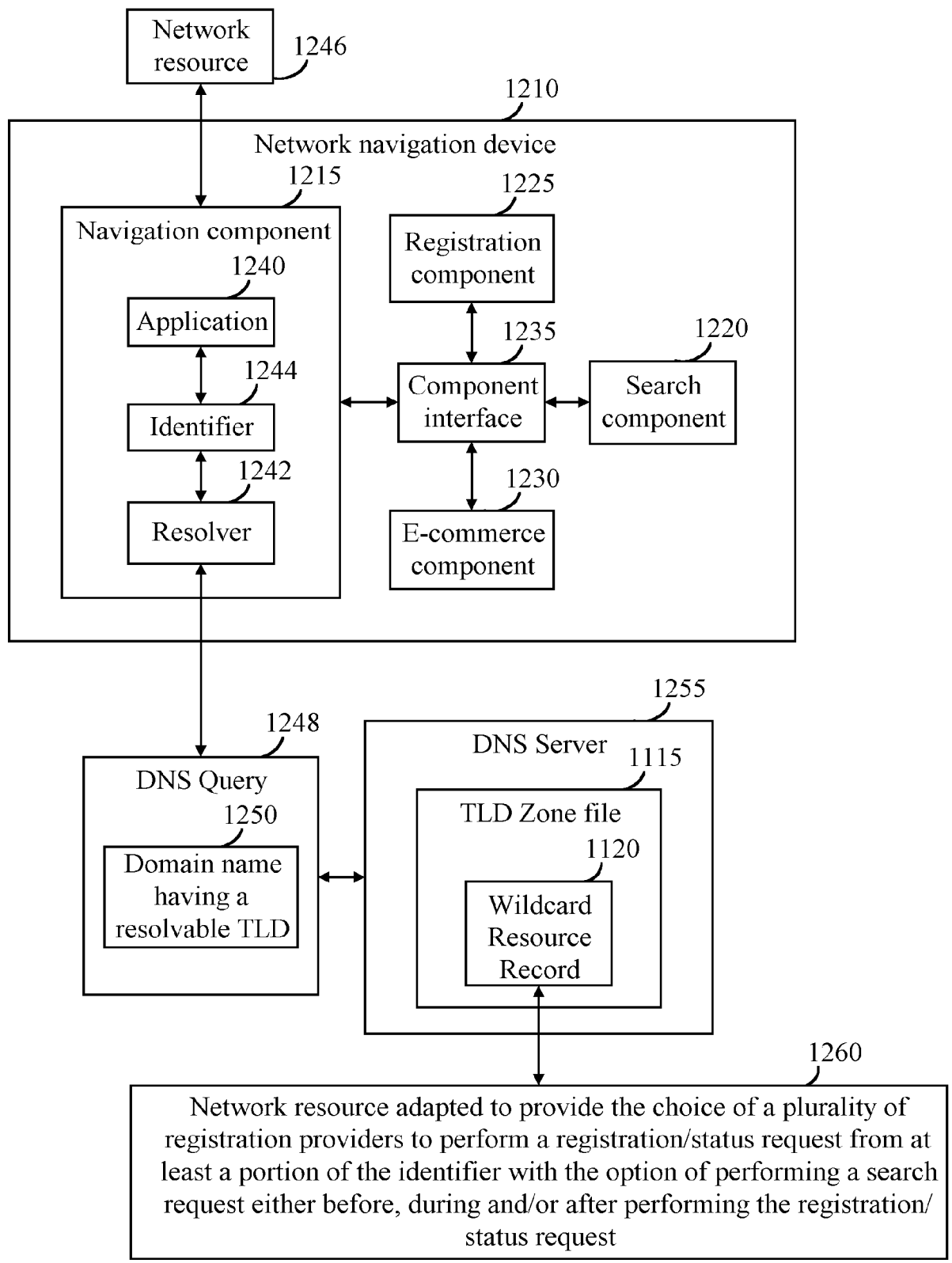
FIG. 12 is a block diagram illustrating a network navigation device in communication with a DNS server in accordance with the present invention.

FIG. 12 illustrates a block diagram of a network navigation device in communication with the DNS server. A network navigation device 1210 includes multiple components such as a navigation component 1215, a search component 1220, a registration component 1225, a e-commerce component 1230, and a component interface 1235 in operative association with the above or any other components. Each component may include (not shown) an Application Programming Interface (API) for interfacing with any combination of other device and/or other components. The navigation component further includes subcomponents such as an application 1240, a DNS resolver 1242, and a resource identifier 1244 stored in component memory. To locate and/or access a network resource 1246 from the identifier 1244, the navigation component passes the identifier 1244 from the application 1240 to the resolver 1242. The identifier includes a domain name having a resolvable TLD 1248. The resolver 1242 provides a DNS query 1250 with the domain name having a resolvable TLD 1248. A hierarchy of nameservers in the DNS system 120' are successfully queried until an authoritative DNS TLD server 1255 is accessed. The DNS server 1255 includes a TLD zone file 1115 having a wildcard resource record 1120. The wildcard RR 1120 redirects all domain names that have a resolvable TLD 1248 to a network resource 1260 adapted to provide the choice from a plurality of registration providers to perform a non-search request such as one of a registration request and identifier status request (e.g., aftermarket, auction, bid, monitoring, back-order request, etc.) from at least a portion of the identifier with the option of performing a search request either before, during and/or after performing the non-search request.

Various terms have emerged in the art to capture various aspects of "object-oriented" approaches. These terms include the words encapsulation, classes, inheritance, message-passing, and polymorphism. The term "classes" relates to objects of similar types. Objects of the same class are grouped together and have certain properties, attributes, or behaviors in common. Classes may be organized into hierarchies of subclasses in which the procedures and attributes of the class are inherited by its subclasses. Thus, a "subclass" is a group of objects that have some properties, attributes, behaviors, or procedures with other groups of objects, but could have other properties, attributes, behaviors, or procedures that are different. The term "attribute" or "property" relates to data items or information or behavior that relates to a particular object. The term "inheritance" means the sharing of properties, and in some cases, attributes and behaviors, that characterizes a subclass by its parent class. The notion of inheritance purportedly allows for easier maintenance and extension of computer programs since creation of subclasses purportedly allows the program code used to created the parent class to be readily modified and reused for subclasses. An object's "procedures" or "methods" are operations upon data items, attributes, and/or properties so as to cause a computing result and provide a response. Certain aspects of object-oriented programming techniques are utilized in the present invention so as to provide extended functionality to the user interface as applied to network systems.

There is a specific model called document object model (DOM) that defines a set of classes used for the manipulation of document objects. JavaScript is a scripting language that relies on DOM when making function calls for Internet related applications. Most of these objects are directly related to characteristics of the Web page or browser. There is a class of objects specifically applied to the manipulation of URLs, which for the purposes of discussion is called a URI object.

FIG. 13a is a block diagram illustrating the components of a MetaURI object in accordance with the present invention. A new object can be instantiated called a MetaURI Object 1310, which inherits the properties 1315, events 1320, and methods 1325 from a subclass of the URI object. In addition, other objects such as a WHOIS Object 1330, HLD Object 1335, AfterMarket Object 1340, BackOrder Object 1345, ExpiryCountdown Object 1350, and the like can be instantiated, as subclasses of the MetaURI object 1310. It is desirable for a user to obtain meta-information at any given time during a user's navigation experience whether connected to a network such as the Internet or in a stand-alone directory service, file system, offline web cache and the like. As each URI is accessed the properties 1315 of the MetaURI object 1310 are updated including any other related objects such as the WHOIS object 1330 to reflect values corresponding with the current navigated URI. In turn, any associated document objects are automatically updated as well.

There are many applications for using the WHOIS object. For instance, the WHOIS object 1330 may be integrated into bookmarks 195 (including favorites folder), URL history folder 194, or even as part of the location field 140. In addition, by using any user interface element such as an icon or a menu and the like (e.g., right-click menu, acution menu, etc.), an extra option can be listed to retrieve WHOIS information based on the URI properties of the selected object. A modified WHOIS function is programmed to extract a domain name from the URI property to be passed as a parameter for retrieving contact information from the proper WHOIS database. For example, a user has just navigated to content corresponding to the URI "http://example.com/sitemap.htm". The user then right clicks on a rendered web page corresponding to the navigation request. A menu appears with the option of selecting WHOIS. Upon selection, a WHOIS Object 1330 extracts "example.com" from the URI to perform a WHOIS request to receive and present contact information such as the registrant of the domain name "example.com".

Bookmarks in Netscape are stored in an HTML file having an anchor reference tag for maintaining the properties of a given bookmark when used in conjunction with a bookmark viewer. The following is an example of one such reference:

<A HREF="http://164.195.100.11/netahtml/search-adv. htm" ADD_DATE="952124784" LAST_VISIT="25920000" LAST_MODIFIED="25920000">USPTO</A>

In another aspect of the present invention modifications may be made to the bookmark viewer so that an extra WHOIS field may be added to the anchor reference when a page is bookmarked.

<A HREF=""ADD_DATE=http://164.195.100.11/netahtml/search-adv. htm"952124784" LAST_VISIT="25920000" LAST_MODIFIED="25920000" WHOIS="http://www.networksolutions. com/cgi-bin/whois/whois?uspto.gov">USPTO</A>

The history folder 194, domain name status database 199, or identifier status cache 197 may be modified in a similar manner except that due to its size such data is saved in a compressed format. For instance, by enabling the history folder 194 to correspond metalinks in real-time while surfing the network, a MetaURI cache with WHOIS 196 may be generated as each URI is being requested. This information may be used for reviewing registrant information while offline from the network, for example.

FIG. 13*b* is a flowchart illustrating the steps performed for retrieving MetaURI object information in accordance with the present invention. A MetaURI object is requested in step 1360 either directly or in response to another request type such as a navigation or search request and the like. At least one property can be retrieved in step 1365 from requested MetaURI object and one or more requests having at least a portion of retrieved property can be generated in step 1370. The generated request may then be processed in step 1375.

For instance, aftermarket requests and back-order requests have to be initiated by a requestor or may be conditionally performed in response to providing a WHOIS record. Independence can be achieved from such conditions by instantiating an aftermarket object or back-order object. In another aspect of the present invention, an aftermarket object and/or back-order object may be adapted to extract a domain name from the current URI property either before, during or in response to an event such as a reference request, search request, navigation request, and the like. The extracted domain name can be passed as a parameter for retrieving contact and/or status information from a corresponding registry such as an aftermarket registry 166, auction registry 164, back-order registry 160, or any domain name status database 199, or identifier status cache 197.

Methods for notifying a user of soon to be available domain names are explained in U.S. patent application Ser. No. 09/598,134 filed Jun. 21, 2000, now U.S. Pat. No. 6,895,430 by Schneider, entitled "Method and apparatus for integrating resolution services, registration services, and search services." Domain names that are soon to be available may be distributed in advance to a user so that domain names of interest may be selected and reserved in a pre-ordering queue on either the client or server side. Registration information is completed and a registration form is submitted to or by a registrar when the soon to be available domain name that is selected does become available. In turn, an Expirycountdown Object 1350 which can be a subclass of the WHOIS object 1330, AfterMarket Object 1340, or BackOrder Object 1345 can be used while navigating caption text. Upon identifier generation, identifier status may be performed including the determination of whether such generated identifiers may be available for registration, back-order, and auction, (e.g., keywords, FDNs, VDNs, MDNs, telephone numbers, etc). When a registration request is performed, for example, all such generated identifiers that are available for registration/back-order may be simultaneously registered/ordered with respect to the naming systems of all the selected identifiers. Simultaneous registration of identifiers across naming systems is explained in U.S. Provisional Application Ser. No. 60/175,825 filed Jan. 13, 2000, by Schneider, and U.S. patent application Ser. No. 09/650,827 filed Aug. 30, 2000, now U.S. Pat. No. 6,901,436 by Schneider.

Figure 13C:
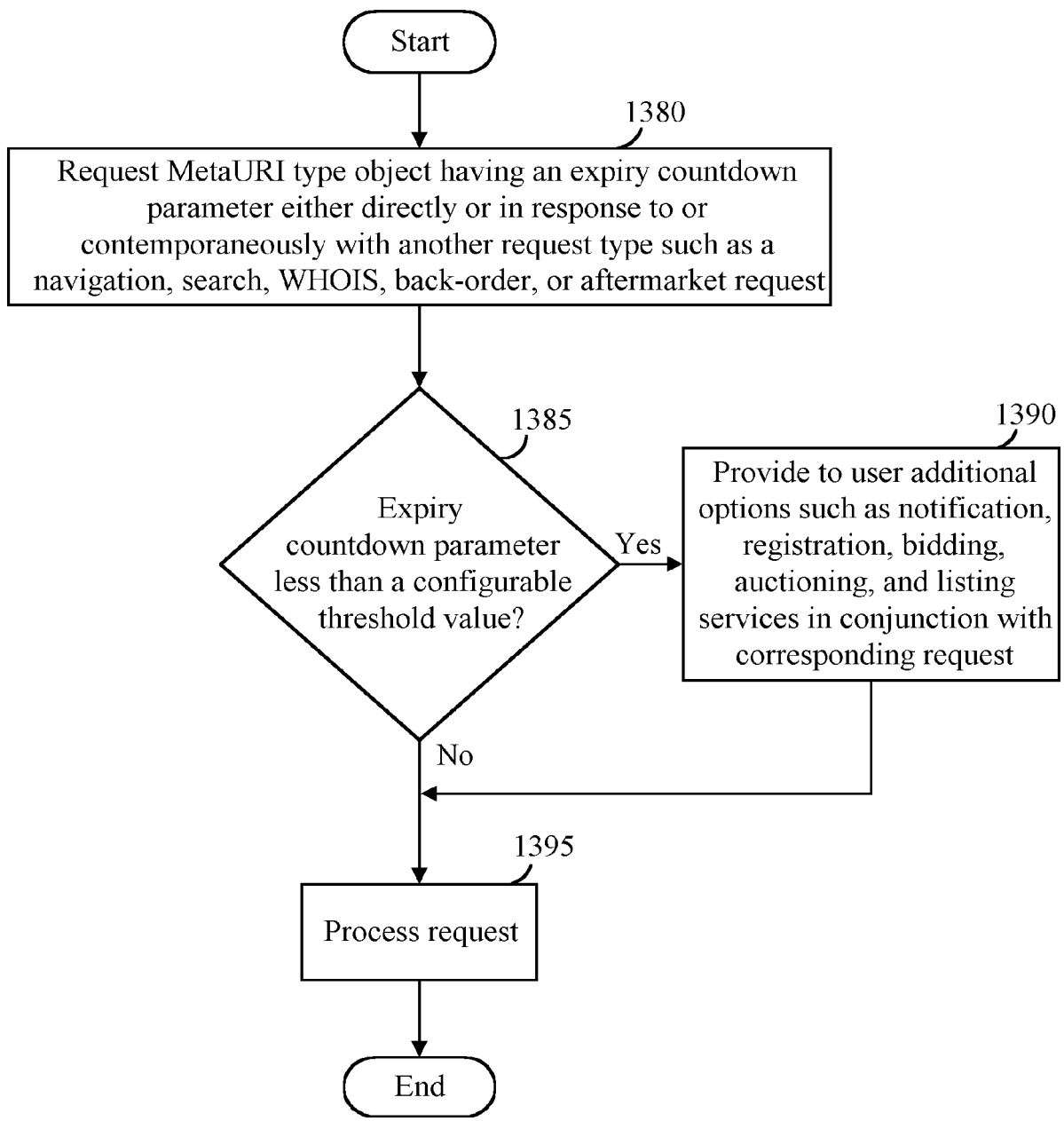
FIG. 13c is a flowchart illustrating the steps performed for using an ExpiryCountdown object in accordance with the present invention.

FIG. 13*c* is a flowchart illustrating the steps performed for using an ExpiryCountdown object in accordance with the present invention. When a MetaURI type object having an expiry countdown parameter is requested in step 1380 either directly, or in response to or contemporaneously with another request type such as a navigation, search, WHOIS, back-order, or aftermarket request, it can be determined in step 1385 whether an ExpiryCountdown parameter is less than a configurable threshold value. If so, then the user is provided in step 1390 with additional options such as notification, registration, bidding, auctioning, and listing services in conjunction with the corresponding request otherwise the request is processed in step 1395.

For instance, the MetaURI type object is a WHOIS object having an ExpiryCountdown object and a WHOIS record may be retrieved by initiating a WHOIS request or retrieved in response to processing a resolution request, search request, and registration request. Whatever the case, whenever a WHOIS record is retrieved, the ExpiryCountdown object can extract the expiration date for the domain name of the WHOIS record and compared it to the current date. When the difference between the expiration date and current date is determined (step 1385) to be less than a configurable threshold value (e.g., 90 days), a client may be notified that the domain name may soon be available. Upon notification, the client may determine whether to add the domain name to a watch list for further notification upon domain name availability. If so, then the domain name is stored in a watch list and monitored for domain name availability. Metalinks may be included with any notification for accessing the WHOIS record of the domain name and corresponding URI. When the difference is determined to be greater than the threshold, the WHOIS record may be stored and/or displayed. The threshold value (not shown) may be modified in the configuration settings 174.

Another aspect of the present invention detects and/or generates identifiers (e.g., via the identifier generator 175) in real time from input sources such as instant messaging, chat rooms, web conferencing, interactive television, any television broadcast, cable, satellite, video tape, DVD, and other sources that have a digital, analog or digital/analog signal where text can be decoded from. U.S. Provisional Application Ser. No. 60/153,336 filed Sep. 10, 1999, by Schneider entitled "Method and apparatus for generating hyperlink references and/or performing an operative function in response to detected indicia", explains how such input sources may be used generate identifiers.

There are a variety of systems available for multiplexing and transmitting character and graphic information during the vertical retrace line period of video signals, such as television signals. This type of system includes, for instance, the character information broadcasting system in Japan; the world standard teletext (WST); the extended version of the United Kingdom teletext system; the closed caption system of the U.S.A., etc.

Video data frequently includes data, such as closed caption text data, that is transmitted during the vertical-blanking interval (VBI). The closed caption text data is typically transmitted during line 21 of either the odd or even field of the video frame in a National Television Standards Committee (NTSC) format. Closed caption decoders strip the text data from the video signal, decode the text data, and reformat the data for display, concurrent with the video data, on a television screen. Such closed caption decoders process the text data separately from a video signal. The closed caption data is displayed substantially in real time.

The associated data encoded in the vertical blanking period of the NTSC signal comprises digital data. The digital data may include ASCII text, any alpha numeric coding, or graphical information. Because the digital data is encoded in the vertical blanking period, the audio/video content in the NTSC signal is not disturbed. The associated data may comprise a wide variety of information pertaining to the audio/video content, such as news headlines, programming details, captioning for the associated audio/video, classified advertisements, and weather.

In a conventional TV set, teletext information is decoded from the broadcast video signal with the use of dedicated hardware that processes the data and displays it on the TV screen. In a teletext capable PC, this same dedicated teletext hardware is used to extract and process the teletext information from the video stream and then store it until the processed teletext information is sent to the host computer. The host computer then runs a software application that receives the processed data and formats it for display on the computer screen.

Currently, many PC-TV products allow a user to view TV on a computer monitor. Some products allow information to be viewed with the addition of appropriate hardware, typically a module that plugs into the TV card. Typically, a TV tuner receives a signal from either an antenna or cable connection. The selected channel is output from the tuner to the TV decoder chip and to the teletext decoder chip.

Advancements have been made to enable decoding to extend beyond that of a dedicated chip or processor to include software drivers to perform this task. A client application running on PC calls closed caption decoder driver in order to enable and disable the displaying of closed caption data. All application calls are made to closed caption capture layer (CCC) by client application. Capture layer extracts the Line 21 data from video processor hardware using hardware driver and notifies decoding layer that there is data available to process. Decoding layer then processes the data retrieved by capture layer and displays the closed caption text on the monitor in a window specified by client application.

Figure 14A:
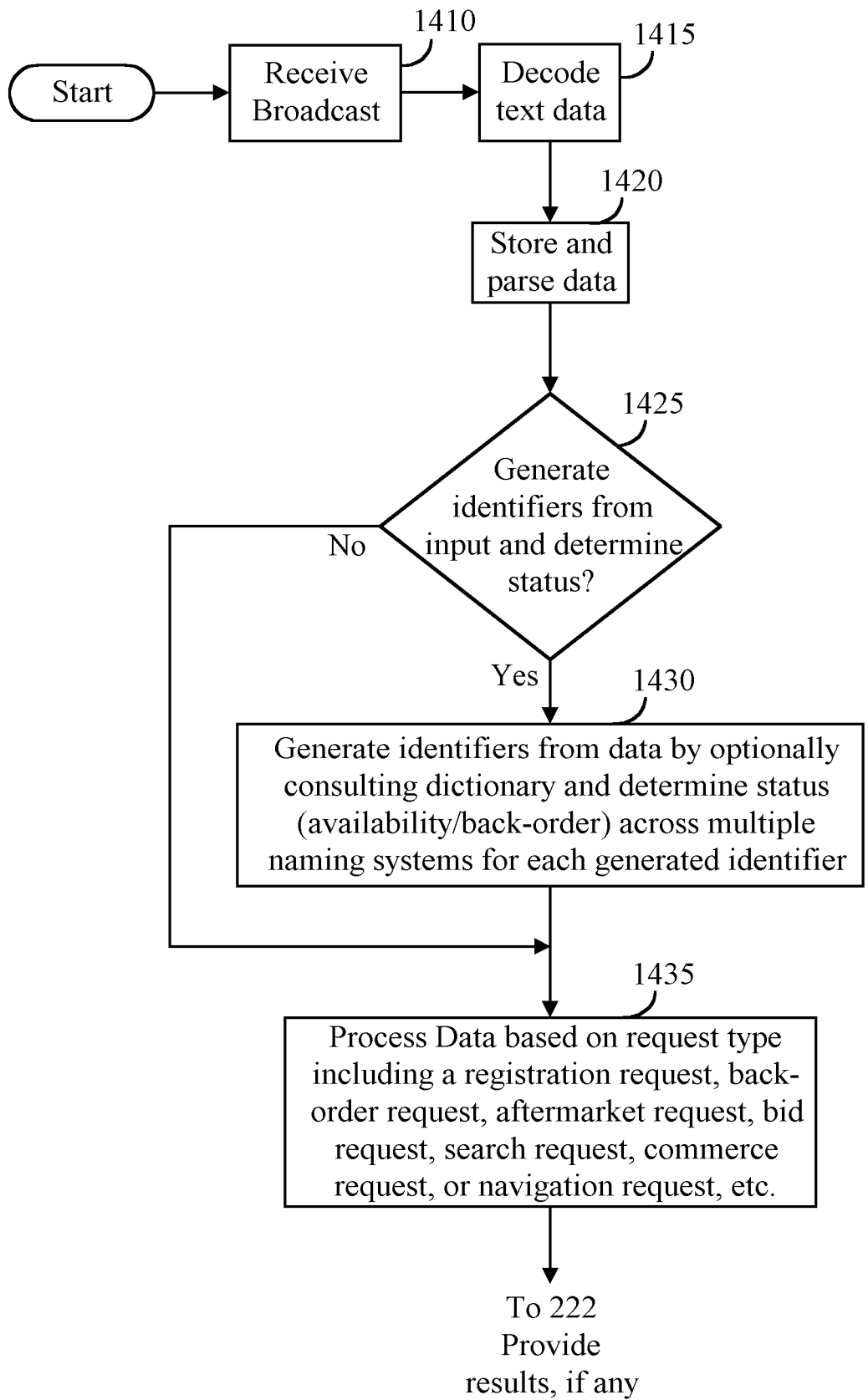
FIG. 14a is a flowchart illustrating the steps performed for processing requests in response to decoding text data from a broadcast in accordance with the present invention.

FIG. 14a is a flowchart illustrating the steps performed for processing requests in response to decoding text data from a broadcast. A device receives a broadcast in step 1410 and decodes text data in step 1415 from the broadcast signal. Data is then stored and parsed in step 1420. It may then be determined in step 1425 from configuration settings 174 whether to retrieve the status (e.g., identifier availability, back-order status) for each identifier from the stored data. If so, then identifiers may be generated (e.g., via templates 172, identifier generator 175 including subcomponents (see FIG. 1d), etc.) across multiple naming systems from input and their status determined in step 1430. Data may then be processed in step 1435 based on request type including a prefix request, suffix request, command request, resolution request, search request, registration request, commerce request, subscription request, navigation request, dialing request, messaging request, conferencing request, service request, authorization request, back-order request, aftermarket request, bid request, and/or reference request and the like.

Data request results if any, may then be provided in step 222. For instance, as closed caption text is decoded, domain names and/or identifiers across multiple namespaces may be generated (e.g., via an identifier generator 175 or templates 172) in response to receiving the closed caption text. Upon identifier generation, identifier status may be performed including the determination of whether such generated identifiers may be available for registration, back-order, and auction, (e.g., keywords, FDNs, VDNs, MDNs, telephone numbers, etc). When a registration request is performed, for example, all such generated identifiers that are available for registration/back-order may be simultaneously registered/ordered with respect to the naming systems of all the selected identifiers. Simultaneous registration of identifiers across naming systems is explained in U.S. Provisional Application Ser. No. 60/175,825 filed Jan. 13, 2000, by Schneider, and U.S. patent application Ser. No. 09/650,827 filed Aug. 30, 2000, by Schneider.

By applying this method to an interactive television application, a viewer may select a list box for display. Upon display, all identifiers that have an available status, for example, may be dynamically populated within the selected list box as a hyperlink reference for each available identifier to access registration/back-order services. In effect, available identifiers may be generated across multiple naming systems in response to real-time data streams and pushed across various media to help users When metalinks are to be integrated then at least one metalink may be generated in step 1620 and included with any search results as a result of processing the search request in step 1625. Such metalinks may access any permutation of the following; URI of the domain name, WHOIS of the domain name, page source of the URI, HEAD request of URI, sitemap of URI, e-mail of URI, dial request for URI, geographic map of URI with directions, and domain name status or the like. Domain name status may indicate whether the domain name is available for back-order, sale, license, or lease by the registrant or through an auction and/or listing service. If metalinks are not integrated, then search request may be immediately processed in step 1625 without including such metalinks. Autosearch templates 172 may be used to generate such metalinks, for example.

Figure 14B:
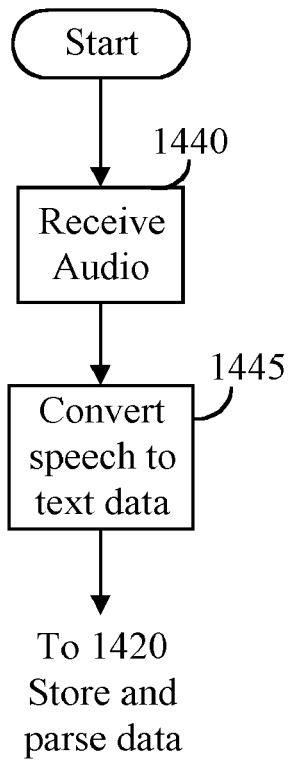
FIG. 14b is a flowchart illustrating the steps performed for how identifiers may be generated in response to audio input in accordance with the present invention.

FIG. 14b is a flowchart illustrating the steps performed for how identifiers may be generated in response to audio input. When an audio stream is received as input in step 1440, speech from the audio source may be converted into text in step 1445 by a speech to text conversion program with such converted data stored and parsed in step 1420. It may then be determined in step 1425 from configuration settings 174 whether to retrieve the status (e.g., identifier availability, back-order status) for each identifier from the stored data as shown in FIG. 14a.

Figure 14C:
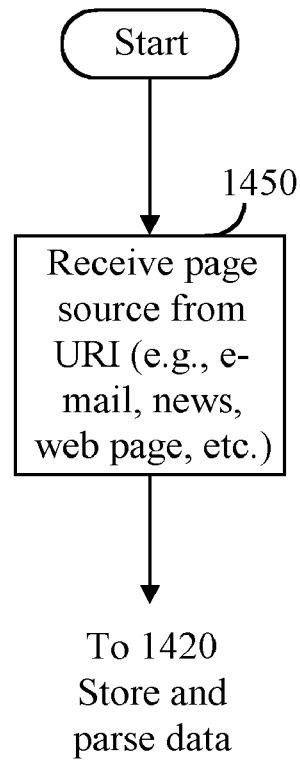
FIG. 14c is a flowchart illustrating the steps performed for how identifiers may be generated in response to receiving the page source of a URI in accordance with the present invention.

FIG. 14c is a flowchart illustrating the steps performed for how identifiers may be generated in response to receiving the page source of a URI. When a page source of a URI (e.g., e-mail, news, web page, etc.) is received as input in step 1450, such input is then stored and parsed in step 1420. It may then be determined in step 1425 from configuration settings 174 whether to retrieve the status (e.g., identifier availability, back-order status) for each identifier from the stored data as shown in FIG. 14a.

Figure 14D:
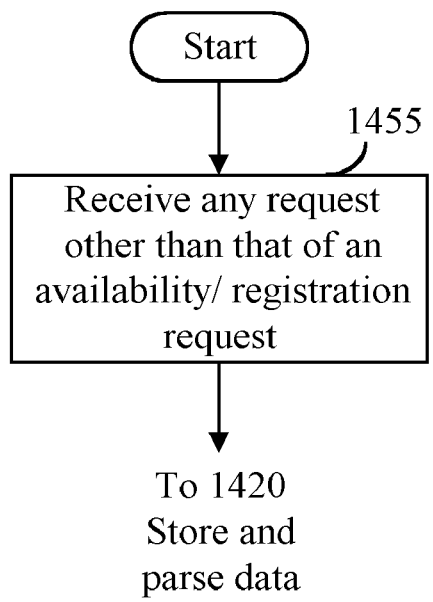
FIG. 14d is a flowchart illustrating the steps performed for how identifiers may be generated in response to receiving any request other than that of a registration request in accordance with the present invention.

FIG. 14d is a flowchart illustrating the steps performed for how identifiers may be generated in response to receiving any request other than that of a registration request. When any request other than that of an availability/registration request is received in step 1455, such input is then stored and parsed in step 1420. Furthermore, decoded closed caption text and speech to text conversion from an audio source may also be used in interactive television applications as an input source to navigation services such as Flyswat, GuruNet, Annotate.com, and Third Voice. Furthermore, these third party applications can be adapted to provide both registration and back-order requests from any received or generated identifiers including domain names and keywords, for example.

Figure 15A:
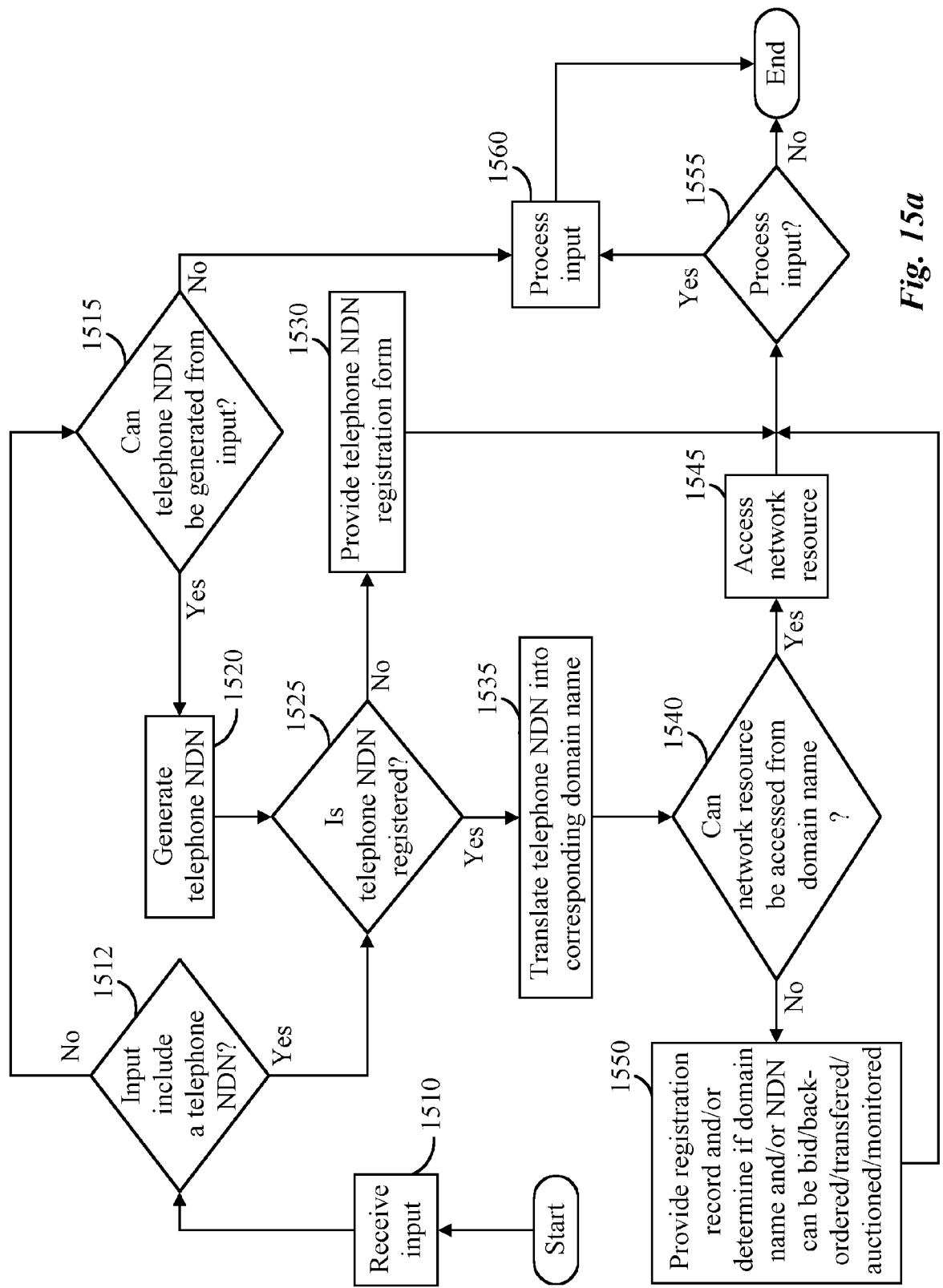
FIG. 15a is a flowchart illustrating the steps performed for processing a NDN in accordance with the present invention.

FIG. 15a is a flowchart illustrating the steps performed for processing a NDN in accordance with the present invention. Input can be received as a result of parsing text such as web pages, instant messaging, and the like or from input forms particularly such forms that request contact information. Additionally, input can be obtained or received from the initiation of virtually any request type such as that of a search or navigation request, for example. Though a NDN can be detected by determining that the HLD is a numeric TLDA or more specifically that the domain name labels include only numbers, a specific use of NDN detection would be for the case of telephone NDNs (e.g., "555.1234", "216.555.4321", etc.).

When input is received in step 1510 it can be determined in step 1512 whether input includes a telephone NDN. If not, then it can be determined in step 1515 whether a telephone NDN can be generated from input. If so, then the telephone NDN is generated in step 1520. It can be further determined in step 1525 whether the received or generated telephone NDN is registered by consulting a FDN registry 162 that includes NDN information. If the telephone NDN is not registered, then a telephone NDN registration form is provided in step 1530 otherwise the telephone NDN is translated into a corresponding domain name in step 1535 and then determined in step 1540 whether a network resource can be accessed from the domain name. If so, then the network resource is accessed from the domain name in step 1545 otherwise a registration record is provided in step 1550 with the option of determining if the domain name and/or telephone NDN can be bid, monitored, back-ordered, transferred, and auctioned. At this point, it can be determined in step 1555 whether to process input. If so, or when the telephone NDN can not be generated (step 1515), input can then be processed in step 1560.

Figure 15B:
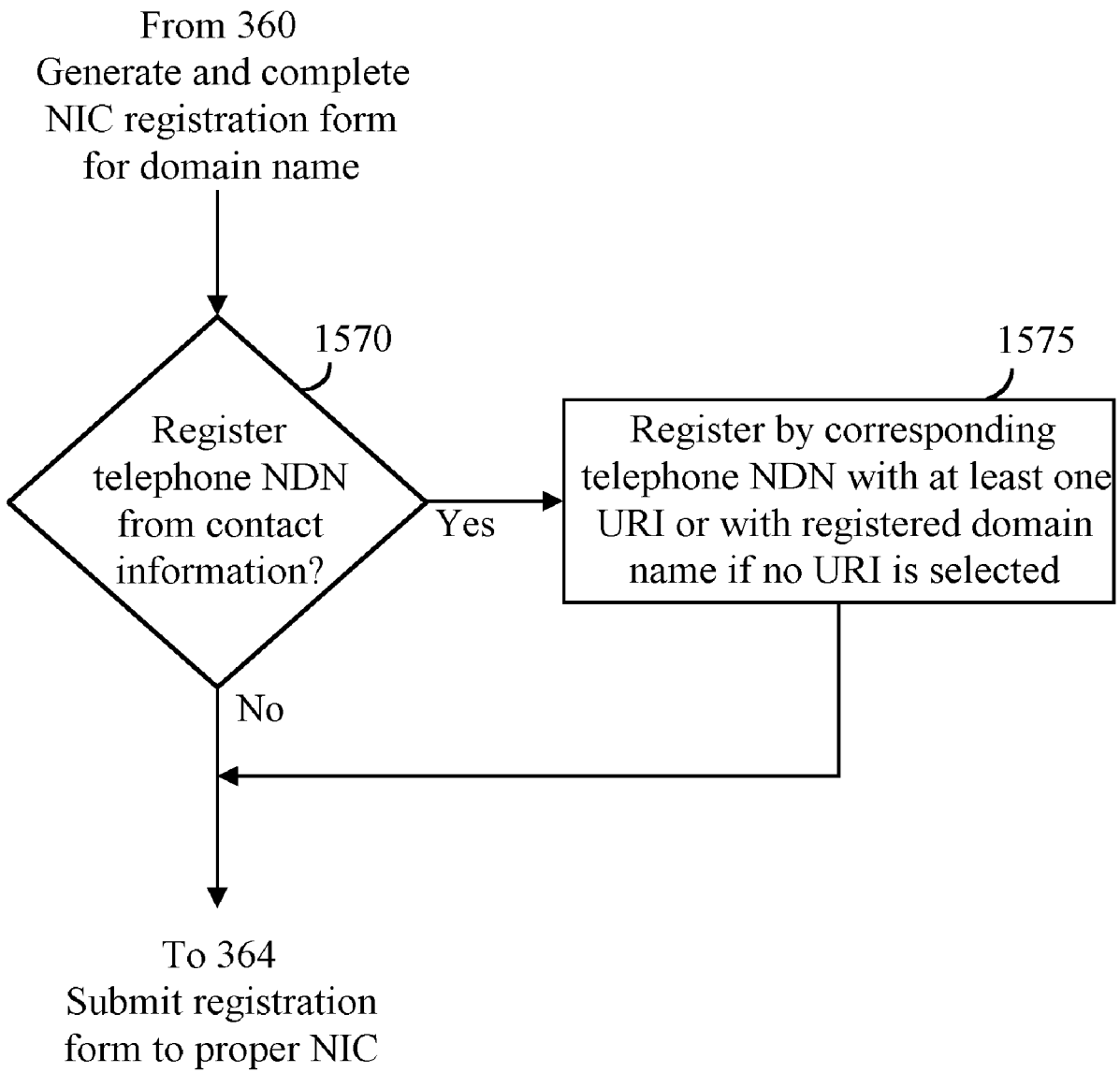
FIG. 15b is a flowchart illustrating the steps performed for registering a telephone NDN in accordance with the present invention.

FIG. 15b is a flowchart illustrating the steps performed for registering a telephone NDN in accordance with the present invention. When it is determined (step 322) that the user would like to register the domain name, the user can complete (step 360) a NIC registration form. The form can be adapted to include the option of also contemporaneously registering a telephone NDN when registering the domain name. It can then be determined in step 1570 whether the potential registrant wishes to register the telephone NDN from supplied from contact information of the NIC registration form. If so, the telephone NDN can be registered in step 1575 by corresponding telephone NDN with at least one URI or with the soon to be registered domain name in the event that no URI is selected. In either case, the completed form can then be submitted in step 364 to the proper NIC authority for processing.

Figure 16:
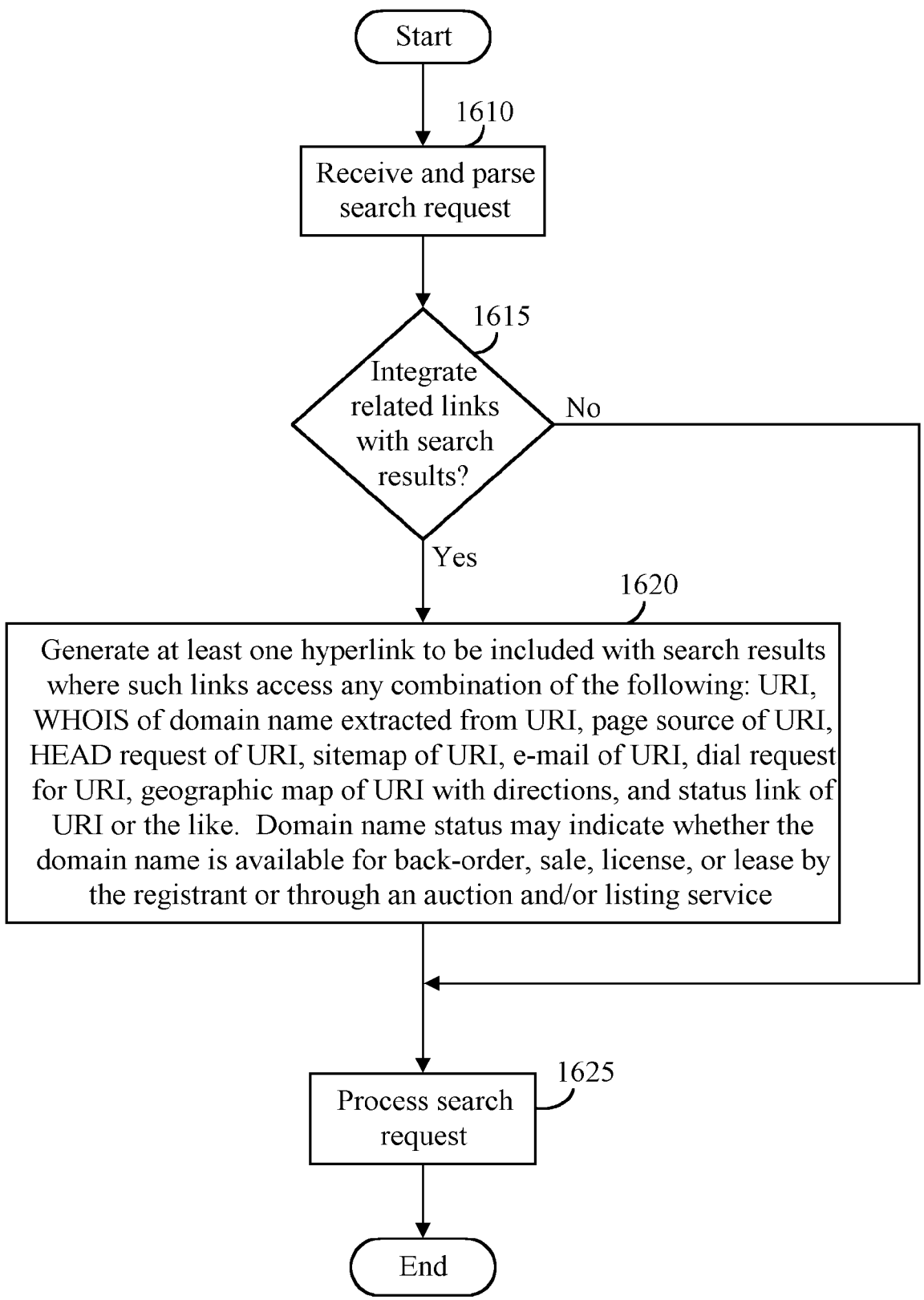
FIG. 16 is a flowchart illustrating the steps performed for integrating metalinks as part of search results in accordance with the present invention.

FIG. 16 is a flowchart illustrating the steps performed for integrating metalinks as part of search results in accordance with the present invention. When a search request is received/obtained and parsed in step 1610, it can be determined in step 1615 whether to integrate links of meta-information or "metalinks" as part of search results. When metalinks are to be integrated then at least one metalink may be generated in step 1620 and included with any search results as a result of processing the search request in step 1625. Such metalinks may access any permutation of the following; URI of the domain name, WHOIS of the domain name, page source of the URI, HEAD request of URI, sitemap of URI, e-mail of URI, dial request for URI, geographic map of URI with directions, and domain name status or the like. Domain name status may indicate whether the domain name is available for back-order, sale, license, or lease by the registrant or through an auction and/or listing service. If metalinks are not integrated, then search request may be immediately processed in step 1625 without including such metalinks. Autosearch templates 172 may be used to generate such metalinks, for example.

As explained in U.S. patent application Ser. No. 09/598,134 filed Jun. 21, 2000, now U.S. Pat. No. 6,895,430 by Schneider, entitled "Method and apparatus for integrating resolution services, registration services, and search services", identifier prefixes may be used as a command language by entering such a prefix in conjunction with an identifier and/or other parameters into a user interface element such as a microphone with speech to text translation, a web browser location field 140, a web page search text box 146, or command line of a computing device, etc. Such prefixes may also be selected from a list of prefixes as a means for processing an identifier as input. A prefix/suffix database 170 may be used in conjunction with autosearch templates 172 to generate a URI that may be used for processing an operative function upon the identifier that corresponds to the selected prefix. The following are examples of how prefixes may be used for domain names.

"Edit example.com" may enable a registrant of the domain name "example.com" to edit contact information stored in the registrar database. "Handle example.com" may enable a user to list or edit any handles that may correspond to the domain name "example.com". "List example.com" may enable a user to display all records that may correspond to "example.com". "Status example.com" may enable a user to review the current status of "example.com". "History example.com" may enable a user to review the transaction history of "example.com". "Watch example.com" may enable a user to add "example.com" to a watch list for notifying the user as to similar domain names registered or to notify that "example.com" is available or may soon be available for registration. "Renew example.com" enables a registrant to extend the expiry date of "example.com" and provide the option of transferring from one registrar to another. "Transfer example.com RegistrarA to RegistrarB" may enable a registrant to transfer "example.com" from a current registrarA to a new registrarB. "Escrow example.com" may enable a registrant to hold "example.com" in escrow for the purposes of transferring the domain name. "Consolidate example.com" may enable a registrant to list all of the registered domain names of a registrant or given handle for the purpose of minimizing renewal payments across a portfolio of domain names.

"Auction example.com" may enable a registrant to list "example.com" for auction". "Bid example.com" may enable an entity to make a bid on "example.com". "Value domain name" may enable a user to receive an estimate of the book value or inventory value for "example.com". "Buy example.com" may enable an entity to make a solicitation for purchase or to purchase "example.com" from the current registrant. "Sell example.com" may enable a registrant to list "example.com" for sale. "Lease example.com" may enable an entity to make a solicitation for leasing or to lease "example.com" from the current registrant.

"Generate example.com" may generate a variety of related domain names that are available (e.g., "firstexample.com", "anotherexample.com", etc.). "WHOIS example.com" may enable a user to list the WHOIS record for "example.com". "Expire example.com" may enable a user to list the expiration date for "example.com". "Registrar example.com" may enable a user to list which registrar "example.com" is registered with. "Tools example.com" may enable an entity to use online tools to find more information on "example.com" such as zone files, nameservers, subdomains, and the like. An example of such online tools may be accessed from a URL such as "http://domtools.com/domtools/". "Redirect example.com" may enable a registrant to configure "example.com" to redirect to another URL. "Lock example.com" may enable a registrant to assure that "example.com" may not be transferred to another registrar until the registrant unlocks the domain name.

"Email example.com" may enable a registrant to sign up for email services for "example.com". "Webhost example.com" may enable a registrant to sign up for web hosting services for "example.com". "Inc example.com" or "LLC example.com" may enable a registrant to submit articles or incorporation/organization and form a business entity for "example.com". "Trademark example.com" may enable a registrant to file a trademark for "example.com". "Geo example.com" may enable a user to receive GPS coordinates from a GPS system or the current latitude/longitude for "example.com". "Dial example.com" may enable a user to make a telephone call to a phone number designated by the registrant of "example.com". For instance, the URL "http://example.com/index.html" may launch a dialer program or redirect to an Internet telephone protocol for contacting the registrant instead of or in addition to accessing a web site. Domain names are generally used as identifiers to access a web site or the like. There are no such domain names used for the explicit purpose of dialing a telephone number instead of accessing a web site. Specification of an Internet telephone protocol is provided in A. Vaha-Sipila, "Informational RFC (Request for Comment) 2806: URLs for Telephone Calls", Internet Engineering Task Force (IETF), April 2000, "http://www.faqs.org/rfcs/rfc2806.html".

Figure 17:
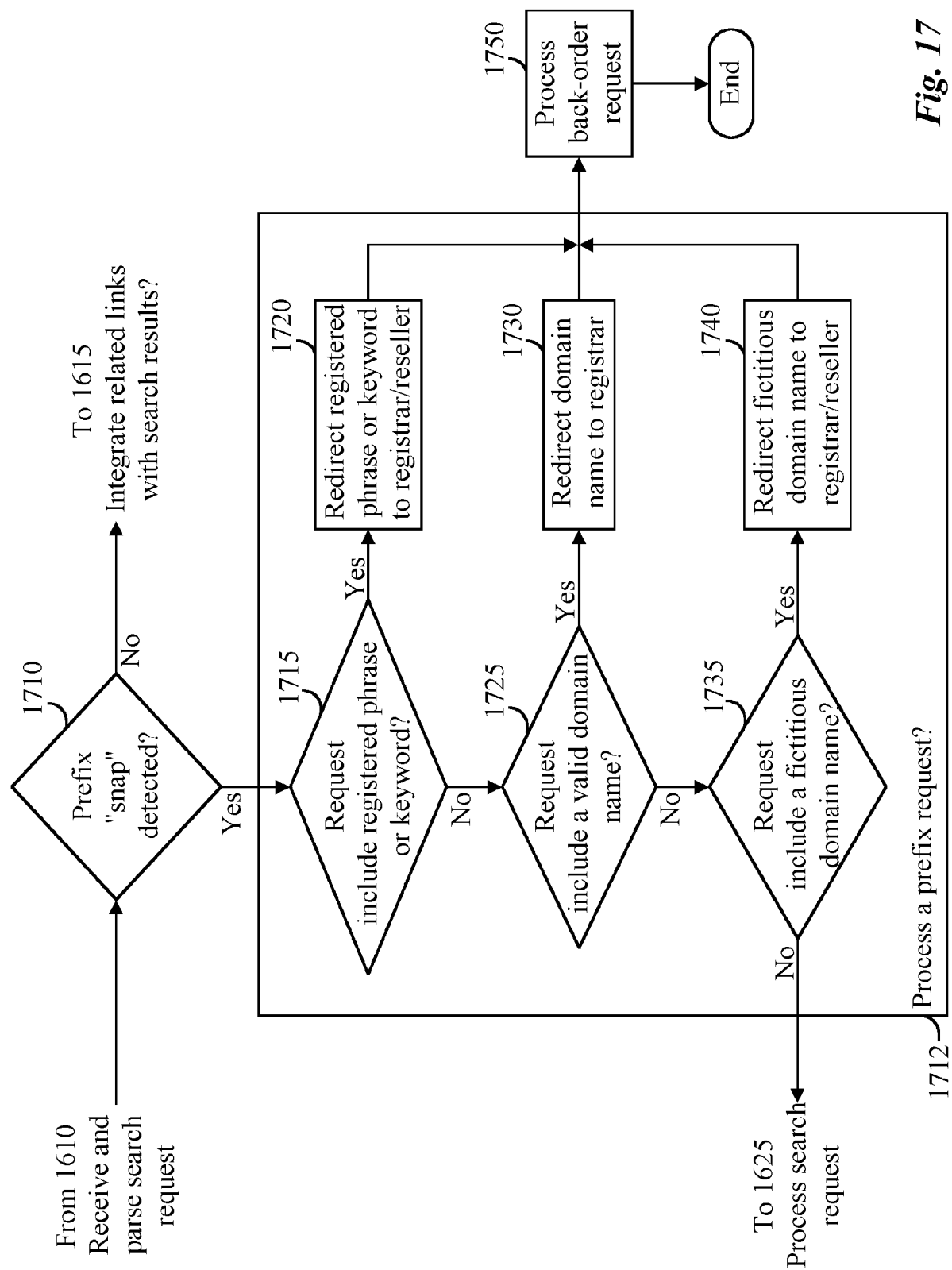
FIG. 17 is a flowchart illustrating the steps performed for processing a back-order request in response to detecting a "snap" or like domain name prefix from an input request in accordance with the present invention.

FIG. 17 is a flowchart illustrating the steps performed for processing a back-order request in response to detecting a "snap" or "back-order" related domain name prefix from an input request in accordance with the present invention. After a search request is received and parsed (step 1610), it is then determined in step 1710 whether the prefix "snap" was parsed/detected by consulting a prefix/suffix database 170. If not, then it may be determined in step 1615 as to whether to integrate related links with search results. When the prefix "snap" was parsed, it can then be determined in step 1712 how the prefix request is processed. First, it may be determined in step 1715 whether the request includes a registered phrase or keyword. If so, then the registered phrase or keyword is redirected in step 1720 to registration services such as a registrar or reseller for the purpose of processing in step 1750 a back-order request. When the request does not include a registered phrase or keyword, then it may be determined in step 1725 whether the request includes a valid domain name. If so, then the valid domain name is redirected in step 1730 to a registrar or reseller for the purpose of processing in step 1750 the back-order request. When the request does not include a valid domain name, then it may be determined in step 1735 whether the request includes a FDN. If so, then the FDN is redirected in step 1740 to a registrar or reseller for the purpose of processing in step 1750 the back-order request. When the search request does not include a FDN, then search results may be retrieved by processing the search request in step 1625.

FIG. 18a is an illustration of prior art for the typical output of a search request. The search request used is the phrase "software patent". For illustrative purposes, only the first four search results are shown. The first line of each given result may be underlined 1810 indicating a hyperlink reference. The hyperlink accesses a network resource corresponding to the URI that is displayed in the last line of each given search result.

FIG. 18b is an illustration of modifications to the output of the search request to extend functionality of the search results in accordance with the present invention. A second line of metalinks 1820 may be added to each search result enabling the user of a system to retrieve meta-information corresponding to the URI such as WHOIS information, Homepage of the URI (when the search result is not a homepage), e-mail address to contact URI registrant, a link to perform a dial request to the URI registrant, and a geographic map with directions to the URI registrant. These methods of contacting the link owner can include parsing the WHOIS record of the domain name corresponding to the URI and generating links from parsed information such as e-mail, telephone number, city, state, and zip code. Similarly, metalinks 1825 may also be added for accessing <META> tag Information, Page Source of the network resource corresponding to the URI, and sitemap information corresponding to the domain name. For instance, the URI for a sitemap may be determined from a variety of methods including access to a sitemap database 198, which may be compiled from a web site such as "sitemap.net" or maintained by having a "crawler" program interrogate the web site of the URI by searching for a sitemap link on the homepage or any other accessible web page or by finding a directory called "sitemap" or a filename called "sitemap.htm" (or ".html"). In addition, metalinks 1830 may also be added for monitoring, bidding, auctioning, back-ordering, and determining after market status. The after market domain name status may be determined in a manner similar to that of a sitemap. A domain name status database 199 may be maintained by having a "crawler" program interrogate a myriad of after market web sites that list and/or auction domain names.

Figure 19:
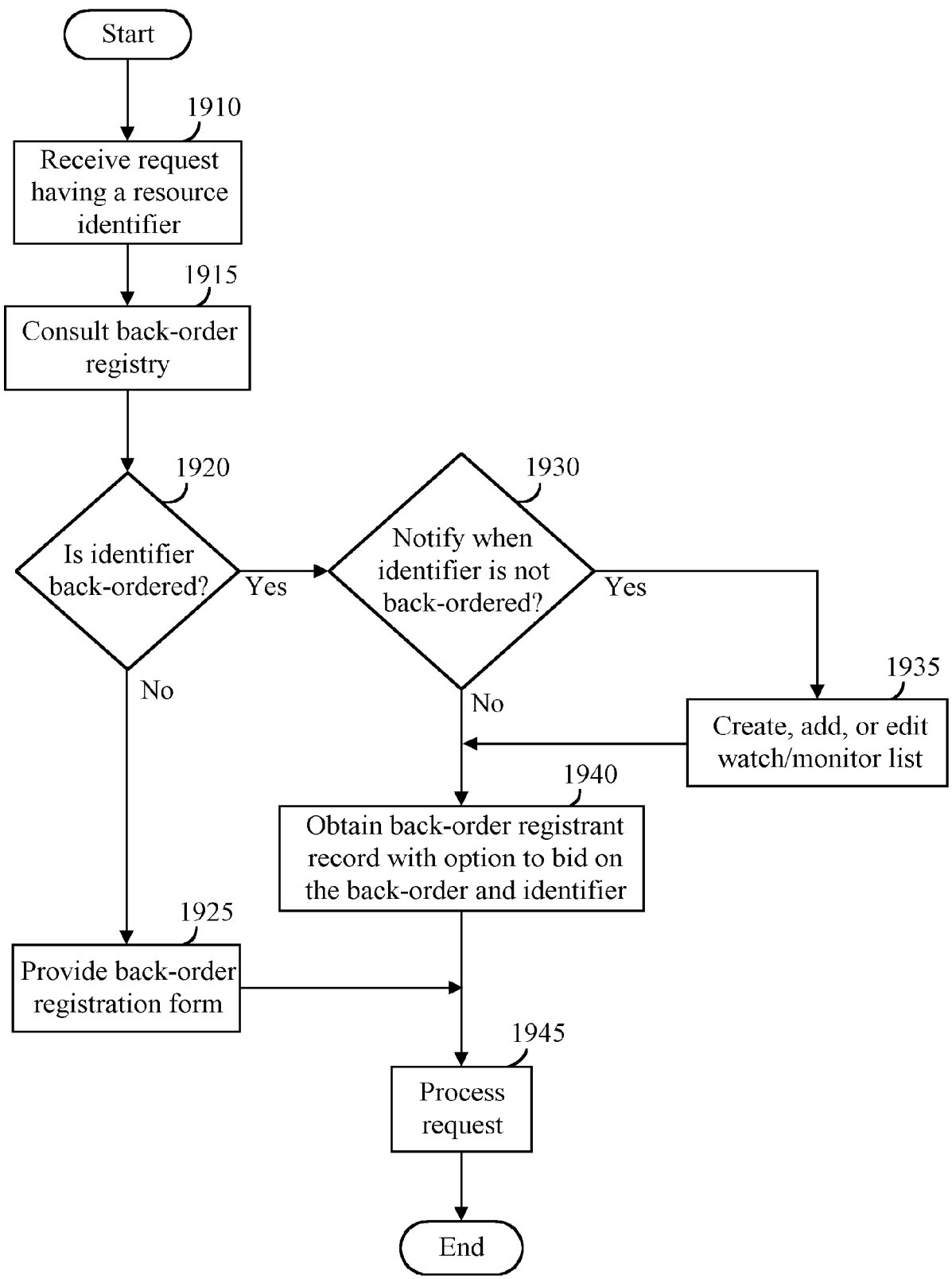
FIG. 19 is a flowchart illustrating the steps performed for determining the back-order status of a resource identifier in accordance with the present invention.

FIG. 19 is a flowchart illustrating the steps performed for determining the back-order status of a resource identifier in accordance with the present invention. When a request having a resource identifier is received in step 1910, a back-order registry 160 is consulted in step 1915 and it is determined in step 1920 whether the identifier has been back-ordered. If not, then a back-order registration form is provided in step 1925 otherwise it can be further determined in step 1930 whether to provide notification when the identifier is no longer back-ordered. If notification is requested then the identifier can be added in step 1935 to an identifier watch/monitor list 177 for such notifications at a later date. After the option of notification or when notification is not required, a back-order registration record can be retrieved in step 1940 with the option to bid on the back-order and/or resource identifier. The received request can then be processed in step 1945 after either a back-order registration form or a back-order registration record is provided.

At least a portion of the registration request can be processed from an autosearch. Autosearch templates may be adapted to determine the availability of registration in response to generating many identifiers across many naming systems. The registration request can be processed in response to determining that the network resource can not be accessed. A network resource that can not be accessed can be determined by attempting to access the network resource from the identifier and determining that the access attempt is unsuccessful or by determining whether the network resource can be located. A network resource that can not be located can be determined by attempting to locate the network resource and determining that the location attempt is unsuccessful or by determining whether the domain name is resolvable. Network bandwidth required to determine that the network resource can not be accessed/located can be minimized. Network bandwidth required to determine whether a domain name is resolvable can be minimized.

When it is determined that the first domain name is resolvable it can be determined whether the network resource can be located and when it is determined that the first domain name is not resolvable, a registration request can be processed. When it is determined that the network resource can be located it can be determined whether the network resource can be accessed and when it is determined that the network resource can not be located, a registration request can be processed.

A domain name can be translated into an IP address by accessing at least one resource record from at least one zone file or file cache. A resource record can be a wildcard resource record having an IP address corresponding to a network resource adapted to determine which domain name registration provider of a plurality of domain name registration providers can process the registration request when it is determined that the first domain name is available for registration.

The registration request can be a domain name registration request and/or keyword registration request. The domain name registration request and keyword registration request can be contemporaneously processed. Domain name registration provider can be a domain name registrar, domain name reseller, or domain name affiliate. Keyword registration provider can be a keyword registrar, keyword reseller, and keyword affiliate. A keyword registration provider of a plurality of keyword providers can be selected to process the keyword registration request.

In a keyword registration request, at least one keyword can be generated from the identifier and determined whether the at least one keyword is resolvable. A keyword resolution request can be processed from the at least one keyword when the at least one keyword is determined resolvable. It can be determined whether the at least one keyword is available for keyword registration when the at least one keyword is determined not resolvable.

The keyword resolution request can be processed by accessing at least one network resource from the at least one keyword. At least one of a keyword resolver system and file cache can be queried to determine whether the at least one keyword is resolvable. A keyword registration form can be generated when the at least one keyword is determined available for registration and keyword registrant information can be provided when the at least one keyword is determined not available for registration. The keyword registration form can include a domain name registration form.

Related domain names may be generated from a first domain name and determined whether such generated domain names are available for registration by performing a WHOIS request on the first domain name and any the related domain names when processing a domain name registration request. A domain name registration form may be generates for each domain name determined available for registration and registrant information may be provided for each domain name determined not available for registration. A domain name registration form also includes a keyword registration form or may include any other identifier registration form.

The domain name registration provider is at least one of a domain name registrar, domain name reseller, and domain name affiliate. It can be determined which domain name registration provider of a plurality of domain name registration providers will process the domain name registration request by retrieving one of a default named domain name registration provider and a method of selecting a domain name registration provider from one of an autosearch template and modifiable configuration settings. The method of selecting a domain name registration provider is chosen from the least cost domain name registration provider, a preselected list of domain name registration provider, and a random choice of domain name registration provider. The method of selecting the least cost domain name registration provider can include the step of consulting a table of registration cost information updated in real time.

A second domain name can be generated from the first domain name wherein the second domain name is a subdomain of the first domain name. The identifier includes a protocol identifier, the network resource request includes a protocol request, the subdomain corresponds to the protocol identifier, and the step of determining whether the second domain name can be generated includes the step of generating the second domain name. The protocol identifier can be "http" and the subdomain can be "www". The protocol identifier and the subdomain can be from a group consisting of ftp, telnet, news, and gopher.

It can be determined whether the second domain name can be generated by determining whether at least one hostname of the first domain name can be identified. The second domain name can be generated by prepending a hostname to the first domain name. The second domain name can be generated in response to determining that the second domain name can be generated. It can be determined whether the network resource can be accessed from the second domain name. The network resource can be accessed in response to determining that the network resource can be accessed from the second domain name. A registration request can be processed when it is determined that that the second domain name can not be generated. When the network resource can not be accessed from the second domain name, it can be determined whether another subdomain of the first domain name can be generated until it is determined that the another subdomain of the first domain name can not be generated.

The first domain name can be a FDN and a valid domain name can be generated from at least a portion of the identifier and determined whether the network resource can be accessed from the valid domain name. A registration request having the FDN can be processed when it is determined that said valid domain name can not be accessed. The valid domain name can be generated from an autosearch.

A NDN registration form can be provided after determining that the NDN is available for registration. A domain name and IP address corresponding to NDN can be generated after determining that NDN is not available for registration. A network resource is accessed after determining that the network resource can be accessed and a NDN registrant record can be provided after determining that the network resource can not be accessed. The NDN registration record can include the option to one of a bid, monitor, auction, transfer, and back-order the NDN. When the identifier does not include the NDN it can be determined whether the NDN can be generated from the identifier. The NDN can be a telephone NDN.

When a search request is processed, a URI can be provided in the form of a metalink with each result of the search request. The metalink can be one of a WHOIS of domain name extracted from URI, page source of network resource corresponding to URI, HEAD request of network resource corresponding to URI, sitemap of domain name extracted from URI, e-mail corresponding to domain name extracted from URI, dial request of network resource corresponding to URI, geographic map with directions to domain name extracted from URI, and status link of domain name extracted from URI. The status link can include one of a bid link, monitor link, back-order link, auction link, aftermarket link, and transfer link.

A back-order registrant record can further include the option to bid on the identifier and the identifier back-order position after determining that the identifier is backordered.

The MetaURI object can include one of a WHOIS object, HLD object, AfterMarket Object, BackOrder Object, and ExpiryCountdown object. At least one property of the MetaURI object can include a expiry countdown parameter further including determining that the expiry countdown parameter is less than a configurable threshold value with provided options for one of a notification, registration, bidding, auctioning, listing, monitoring, and back-ordering.

Though methods for identifier registration and aftermarket services while or after processing different request types have been shown, there are a myriad of other identifier services that can be included when processing a request such as a failed navigation request or search request, for example. Some of these services include but are not limited to domain name hosting (e-mail services, web hosting), digital trust services, forwarding services (URL forwarding, e-mail forwarding), site building services (site promotion, search engine submittal), international brand protection, business services (Brand Monitoring, online incorporation), trademark services (monitoring, searching, and filing) value added domain services (transfer, renewal, auction, escrow, listing, monitoring, parking, billing, recovery), account management, identity promotion services, directory services, Internet Keywords, Global Voice Registry, ENUM, and Multilingual web addresses.

The identifier can be a uniform resource identifier (URI). The URI can be a uniform resource locator. A search request from the identifier can be constructed, processed, and presented. It can be determined whether to process a search request after processing the registration request. The identifier can be received from internal automation, external automation, activation of a hyperlink, network resource redirection, and input such as a user interface element. Inputting the identifier into a user interface element may include the step of inputting the identifier into one of a browser location field, text box, command line, speech to text interface, optical recognition interface, and magnetic recognition interface. A user interface element may include one of a web page, hyperlink, message box, and prompt and is presented to determine whether to process the registration request particularly when a network resource can not be accessed.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (i.e., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention.

I claim:

1. A network request method comprising:
receiving a network request to process input including a resource identifier, wherein said network request is one of a resource location request, search engine request, and primary market request, said primary market request including one of a resource identifier registration request, WHOIS request, and resource identifier availability request;
determining whether said resource identifier is unavailable for registration;
providing a user with an interface to one of a perform at least one resource identifier aftermarket request and one of an access and display aftermarket status of said resource identifier through one or more resource identifier aftermarket services in response to said determining that said resource identifier is unavailable for registration, wherein said aftermarket status is indicative of whether said resource identifier is available for back-order, sale, license, or lease by one of a listing service, auction service, and registrant of said resource identifier and wherein said aftermarket request is at least one of a back-order request, auction request, bid request, appraisal request, transfer of ownership request, escrow request, offer request, aftermarket listing request, and identifier aftermarket status monitoring and notification request; and,
performing said network request at any time after said receiving said network request independent of said providing said user with said interface to said one of a perform said at least one said resource identifier aftermarket request and one of said access and display said aftermarket status of said resource identifier through said one or more resource identifier aftermarket services.

2. A method, as set forth in claim 1, further including inputting said resource identifier from a user interface element.

3. A method, as set forth in claim 2, wherein said inputting said resource identifier from a user interface element includes inputting said resource identifier into one of a one of a browser location field, text box object, command line, speech to text interface, optical recognition interface, and magnetic recognition interface.

4. A method, as set forth in claim 1, further including one of a performing said resource identifier aftermarket request and automatically performing said resource identifier aftermarket request.

5. A method, as set forth in claim 1, wherein said providing said user with said interface includes providing results of said performing said network request as part of said interface.

6. A method, as set forth in claim 1, wherein said providing said user with said interface includes automatically providing said user with said interface in response to said receiving said network request to process said input.

7. A method, as set forth in claim 1, wherein said resource identifier is one of a domain name, fictitious domain name, telephone number, and keyword.

8. A network request method comprising:
receiving a network request to process input including a resource identifier;
determining whether said resource identifier is unavailable for registration;

determining whether the resource identifier is back-ordered in response to said determining that said resource identifier is unavailable for registration;

a registration back-order service providing a back-order registration form to a user upon said determining that the resource identifier is not back-ordered, wherein said registration back-order service can automatically register or compete to register the resource identifier on behalf of said user when the resource identifier is available for registration;

determining whether to notify said user when the resource identifier is no longer back-ordered or will no longer be back-ordered upon said determining that the resource identifier is back-ordered; and, performing said network request at any time after said receiving said network request independent of said determining whether the resource identifier is back-ordered.

9. A method, as set forth in claim 8, further including retrieving a back-order registration record upon said determining that the resource identifier is back-ordered.

10. A method, as set forth in claim 8, further including adding the resource identifier to a back-order watch list of said user when it is determined to notify said user when the resource identifier is not back-ordered.

11. A method, as set forth in claim 8, wherein said receiving said network request to process said input includes receiving one of a resource location request, search engine request, resource identifier registration request, WHOIS request, and resource identifier availability request.

12. A method, as set forth in claim 8, wherein said determining whether the resource identifier is back-ordered includes determining from a back-order registry whether the resource identifier is back-ordered in response to determining that said resource identifier is unavailable for registration.

13. A method, as set forth in claim 8, wherein said resource identifier is one of a domain name, fictitious domain name, telephone number, and keyword.

\* \* \* \* \*

UNITED STATES PATENT AND TRADEMARK OFFICE
CERTIFICATE OF CORRECTION

| | | |
|---|---|---|
| PATENT NO. | : 7,188,138 B1 | Page 1 of 2 |
| APPLICATION NO. | : 10/604626 | |
| DATED | : March 6, 2007 | |
| INVENTOR(S) | : Eric Schneider | |

It is certified that error appears in the above-identified patent and that said Letters Patent is hereby corrected as shown below:

ON TITLE PAGE, please delete:

"(63) Continuation of application No. 09/683,481, filed on Jan. 5, 2002, now abandoned."

ON TITLE PAGE, please insert:

--(63)  Continuation of application No. 09/683,481 filed Jan. 5, 2002, now abandoned, which is a continuation-in-part of application No. 09/682,351 filed Aug. 23, 2001, now abandoned, and is a continuation-in-part of application No. 09/682,133 filed Jul. 25, 2001, now U.S. Pat. No. 7,194,552, and is a continuation-in-part of application No. 09/653,100 filed Aug. 31, 2000, now U.S. Pat. No. 6,760,746, and is a continuation-in-part of application No. 09/650,827 filed Aug. 30, 2000, now U.S. Pat. No. 6,901,436, and is a continuation-in-part of application No. 09/598,134 filed Jun. 21, 2000, now U.S. Pat. No. 6,895,430 and is a continuation-in-part of application No. 09/532,500 filed Mar. 21, 2000, now U.S. Pat. No. 7,136,932, and is a continuation-in-part of application No. 09/525,350 filed Mar. 15, 2000, now U.S. Pat. No. 6,338,082.

(60)  Provisional application No. 60/175,825 filed Jan. 13, 2000, provisional Application No. 60/160,125 filed Oct. 18, 1999, provisional application No. 60/157,075 filed Oct. 1, 1999, provisional application No. 60/130,136 filed Apr. 20, 1999, provisional application No. 60/125,531 filed Mar. 22, 1999.--

At Column 1, Lines 8-37, please delete:

"This application is a continuation application of U.S. patent application Ser. No. 09/683,481 filed Jan. 5, 2002, by Schneider, now abandoned, which also claims the benefit of U.S. patent application Ser. No. 09/682,351 filed Aug. 23, 2001, by Schneider, now abandoned, which claims the benefit of U.S. patent application Ser. No. 09/682,133 filed Jul. 25, 2001, by Schneider, still pending, which claims the benefit of U.S. patent application Ser. No. 09/525,350 filed Mar. 15, 2000, by Schneider, now U.S. Pat. No. 6,338,082, and claims the benefit of U.S. patent application Ser. No. 09/653,100 filed Aug.

Signed and Sealed this
Fourth Day of January, 2011

David J. Kappos
*Director of the United States Patent and Trademark Office*

CERTIFICATE OF CORRECTION (continued)
U.S. Pat. No. 7,188,138 B1

31, 2000, by Schneider, now U.S. Pat. No. 6,760,746, and claims the benefit of U.S. patent application Ser. No. 09/650,827 filed Aug. 30, 2000, by Schneider, now U.S. Pat. No. 6,901,436, and claims the benefit of U.S. patent application Ser. No. 09/598,134 filed Jun. 21, 2000, by Schneider, now U.S. Pat. No. 6,895,430 and claims the benefit of U.S. patent application Ser. No. 09/532,500 filed Mar. 21, 2000, by Schneider, still pending, claims the benefit of U.S. patent application Ser. No. 09/525,350 filed Mar. 15, 2000, by Schneider, now U.S. Pat. No. 6,338,082 which claims the benefit of U.S. Provisional Application Ser. No. 60/175,825 filed Jan. 13, 2000, by Schneider, now abandoned, U.S. Provisional Application Ser. No. 60/160,125 filed Oct. 18, 1999, by Schneider, now abandoned, U.S. Provisional Application Ser. No. 60/157,075 filed Oct. 1, 1999, by Schneider, now abandoned, U.S. Provisional Application Ser. No. 60/130,136 filed Apr. 20, 1999, by Schneider, now abandoned, and U.S. Provisional Application Ser. No. 60/125,531 filed Mar. 22, 1999, by Schneider, now abandoned."

and please insert the following:

-- This application is a continuation application of U.S. patent application Ser. No. 09/683,481 filed Jan. 5, 2002, by Schneider, now abandoned, which is a continuation-in-part of U.S. patent application Ser. No. 09/682,351 filed Aug. 23, 2001, by Schneider, now abandoned, and U.S. patent application Ser. No. 09/683,481 is a continuation-in-part of U.S. patent application Ser. No. 09/682,133 filed Jul. 25, 2001, by Schneider, now U.S. Pat. No. 7,194,552, and U.S. patent application Ser. No. 09/683,481 is a continuation-in-part of U.S. patent application Ser. No. 09/653,100 filed Aug. 31, 2000, by Schneider, now U.S. Pat. No. 6,760,746, and U.S. patent application Ser. No. 09/683,481 is a continuation-in-part of U.S. patent application Ser. No. 09/650,827 filed Aug. 30, 2000, by Schneider, now U.S. Pat. No. 6,901,436, and U.S. patent application Ser. No. 09/683,481 is a continuation-in-part of U.S. patent application Ser. No. 09/598,134 filed Jun. 21, 2000, by Schneider, now U.S. Pat. No. 6,895,430 and U.S. patent application Ser. No. 09/683,481 is a continuation-in-part of U.S. patent application Ser. No. 09/532,500 filed Mar. 21, 2000, by Schneider, now U.S. Pat. No. 7,136,932, and U.S. patent application Ser. No. 09/683,481 is a continuation-in-part of U.S. patent application Ser. No. 09/525,350 filed Mar. 15, 2000, by Schneider, now U.S. Pat. No. 6,338,082 which claims the benefit of U.S. Provisional Application Ser. No. 60/175,825 filed Jan. 13, 2000, by Schneider, now abandoned, U.S. Provisional Application Ser. No. 60/160,125 filed Oct. 18, 1999, by Schneider, now abandoned, U.S. Provisional Application Ser. No. 60/157,075 filed Oct. 1, 1999, by Schneider, now abandoned, U.S. Provisional Application Ser. No. 60/130,136 filed Apr. 20, 1999, by Schneider, now abandoned, and U.S. Provisional Application Ser. No. 60/125,531 filed Mar. 22, 1999, by Schneider, now abandoned.--